US010521065B2

(12) United States Patent
Hotelling et al.

(10) Patent No.: US 10,521,065 B2
(45) Date of Patent: Dec. 31, 2019

(54) TOUCH SCREEN STACK-UPS

(71) Applicant: Apple Inc., Cupertino, CA (US)

(72) Inventors: Steven P. Hotelling, Los Gatos, CA (US); Brian R. Land, Woodside, CA (US); Mark Arthur Hamblin, San Francisco, CA (US); Tang Yew Tan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 15/275,254

(22) Filed: Sep. 23, 2016

(65) Prior Publication Data

US 2017/0010750 A1 Jan. 12, 2017

Related U.S. Application Data

(62) Division of application No. 11/818,395, filed on Jun. 13, 2007.

(Continued)

(51) Int. Cl.
*G06F 3/044* (2006.01)
*B32B 7/12* (2006.01)
(Continued)

(52) U.S. Cl.
CPC .............. *G06F 3/0445* (2019.05); *B32B 7/12* (2013.01); *G02F 1/13338* (2013.01);
(Continued)

(58) Field of Classification Search
CPC ............................. G06F 3/0412; G06F 3/044
See application file for complete search history.

(56) References Cited

U.S. PATENT DOCUMENTS 2,751,555 A 6/1956 Kirkpatrick
3,333,160 A 7/1967 Gorski
(Continued)

FOREIGN PATENT DOCUMENTS

AU 2005246219 12/2005
CA 1243096 A 10/1988
(Continued)

OTHER PUBLICATIONS

Notice of Allowance dated Nov. 17, 2016, for U.S. Appl. No. 15/273,487, filed Sep. 22, 2016, eight pages.
(Continued)

*Primary Examiner* — Patrick F Marinelli
(74) *Attorney, Agent, or Firm* — Kubota & Basol LLP

(57) ABSTRACT

A multi-touch sensor panel is disclosed that can include a glass subassembly having a plurality of column traces of substantially transparent conductive material that can be formed on the back side, wherein the glass subassembly can also act as a cover that can be touched on the front side. Row traces of the same or different substantially transparent conductive material can then be located near the column traces, and a layer of dielectric material can be coupled between the column traces and the row traces. The row and column traces can be oriented to cross over each other at crossover locations separated by the dielectric material, and the crossover locations can form mutual capacitance sensors for detecting one or more touches on the front side of the glass subassembly.

18 Claims, 42 Drawing Sheets

Related U.S. Application Data

(60) Provisional application No. 60/878,783, filed on Jan. 5, 2007.

(51) Int. Cl.
  *G02F 1/1333* (2006.01)
  *G06F 3/041* (2006.01)
  *B32B 37/12* (2006.01)
  *G02F 1/1335* (2006.01)

(52) U.S. Cl.
  CPC ........ *G02F 1/133345* (2013.01); *G06F 3/044* (2013.01); *G06F 3/0412* (2013.01); *G06F 3/0416* (2013.01); *G06F 3/0446* (2019.05); *B32B 37/12* (2013.01); *B32B 2307/202* (2013.01); *B32B 2307/412* (2013.01); *B32B 2367/00* (2013.01); *B32B 2457/208* (2013.01); *G02F 1/133308* (2013.01); *G02F 1/133528* (2013.01); *G02F 2001/133302* (2013.01); *G02F 2001/133331* (2013.01); *G02F 2202/28* (2013.01); *G06F 2203/04103* (2013.01); *G06F 2203/04104* (2013.01); *G06F 2203/04111* (2013.01); *H04M 2250/22* (2013.01)

(56) References Cited

U.S. PATENT DOCUMENTS

| | | |
|---|---|---|
| 3,541,541 A | 11/1970 | Englebart |
| 3,644,835 A | 2/1972 | Thompson |
| 3,662,105 A | 5/1972 | Hurst et al. |
| 3,798,370 A | 3/1974 | Hurst |
| 3,875,472 A | 4/1975 | Schermerhorn |
| 3,974,332 A | 8/1976 | Abe et al. |
| 4,194,083 A | 3/1980 | Abe et al. |
| 4,233,522 A | 11/1980 | Grummer et al. |
| 4,246,452 A | 1/1981 | Chandler |
| 4,250,495 A | 2/1981 | Beckerman et al. |
| 4,266,144 A | 5/1981 | Bristol |
| 4,268,815 A | 5/1981 | Eventoff et al. |
| 4,277,517 A | 7/1981 | Smith, Jr. |
| 4,290,052 A | 9/1981 | Eichelberger et al. |
| 4,307,383 A | 12/1981 | Brienza |
| 4,313,108 A | 1/1982 | Yoshida |
| 4,342,460 A | 8/1982 | Eng |
| 4,345,000 A | 8/1982 | Kawazoe et al. |
| 4,363,027 A | 12/1982 | Brienza |
| 4,370,697 A | 1/1983 | Haberl et al. |
| 4,394,643 A | 7/1983 | Williams |
| 4,516,112 A | 5/1985 | Chen |
| 4,526,043 A | 7/1985 | Boie |
| 4,550,221 A | 10/1985 | Mabusth |
| 4,587,378 A | 5/1986 | Moore |
| 4,618,989 A | 10/1986 | Tsukune et al. |
| 4,623,757 A | 11/1986 | Marino |
| 4,639,720 A | 1/1987 | Rympalski et al. |
| 4,672,364 A | 6/1987 | Lucas |
| 4,672,558 A | 6/1987 | Beckes et al. |
| 4,675,569 A | 6/1987 | Bowman et al. |
| 4,686,332 A | 8/1987 | Greanias et al. |
| 4,692,809 A | 9/1987 | Beining et al. |
| 4,695,827 A | 9/1987 | Beining et al. |
| 4,707,845 A | 11/1987 | Krein et al. |
| 4,723,056 A | 2/1988 | Tamaru et al. |
| 4,733,222 A | 3/1988 | Evans |
| 4,734,685 A | 3/1988 | Watanabe |
| 4,740,781 A | 4/1988 | Brown |
| 4,746,770 A | 5/1988 | McAvinney |
| 4,771,276 A | 9/1988 | Parks |
| 4,772,885 A | 9/1988 | Uehara et al. |
| 4,788,384 A | 11/1988 | Bruere-Dawson et al. |
| 4,806,709 A | 2/1989 | Evans |
| 4,806,846 A | 2/1989 | Kerber |
| 4,839,634 A | 6/1989 | More et al. |
| 4,853,493 A | 8/1989 | Schlosser et al. |
| 4,898,555 A | 2/1990 | Sampson |
| 4,908,710 A | 3/1990 | Wakai et al. |
| 4,910,504 A | 3/1990 | Eriksson |
| 4,914,624 A | 4/1990 | Dunthorn et al. |
| 4,916,308 A | 4/1990 | Meadows |
| 4,954,823 A | 9/1990 | Binstead |
| 4,964,302 A | 10/1990 | Grahn et al. |
| 4,968,877 A | 11/1990 | McAvinney et al. |
| 5,003,519 A | 3/1991 | Noirjean |
| 5,010,772 A | 4/1991 | Bourland et al. |
| 5,017,030 A | 5/1991 | Crews |
| 5,062,198 A | 11/1991 | Sun |
| 5,073,950 A | 12/1991 | Colbert et al. |
| 5,105,186 A | 4/1992 | May |
| 5,105,288 A | 4/1992 | Senda et al. |
| 5,113,041 A | 5/1992 | Blonder et al. |
| 5,117,071 A | 5/1992 | Greanias et al. |
| 5,142,912 A | 9/1992 | Frische |
| 5,159,323 A | 10/1992 | Akira et al. |
| 5,178,477 A | 1/1993 | Gambaro |
| 5,189,403 A | 2/1993 | Franz et al. |
| 5,194,862 A | 3/1993 | Edwards |
| 5,209,126 A | 5/1993 | Grahn |
| 5,224,861 A | 7/1993 | Glass et al. |
| 5,239,152 A | 8/1993 | Caldwell et al. |
| 5,241,308 A | 8/1993 | Young |
| 5,252,951 A | 10/1993 | Tannenbaum et al. |
| 5,281,966 A | 1/1994 | Walsh |
| 5,293,430 A | 3/1994 | Shiau et al. |
| 5,305,017 A | 4/1994 | Gerpheide |
| 5,343,064 A | 8/1994 | Spangler et al. |
| 5,345,543 A | 9/1994 | Capps et al. |
| 5,345,807 A | 9/1994 | Butts et al. |
| 5,353,135 A | 10/1994 | Edwards |
| 5,374,787 A | 12/1994 | Miller |
| 5,376,948 A | 12/1994 | Roberts |
| 5,381,160 A | 1/1995 | Landmeier |
| 5,386,219 A | 1/1995 | Greanias et al. |
| 5,392,058 A | 2/1995 | Tagawa |
| 5,398,310 A | 3/1995 | Tchao et al. |
| 5,432,671 A | 7/1995 | Allavena |
| 5,442,742 A | 8/1995 | Greyson et al. |
| 5,447,074 A | 9/1995 | Polaert et al. |
| 5,457,289 A | 10/1995 | Huang et al. |
| 5,459,463 A | 10/1995 | Gruaz et al. |
| 5,463,388 A | 10/1995 | Boie et al. |
| 5,463,696 A | 10/1995 | Beernink et al. |
| 5,483,261 A | 1/1996 | Yasutake |
| 5,488,204 A | 1/1996 | Mead et al. |
| 5,495,077 A | 2/1996 | Miller et al. |
| 5,499,026 A | 3/1996 | Liao et al. |
| 5,510,813 A | 4/1996 | Makinwa et al. |
| 5,513,309 A | 4/1996 | Meier et al. |
| 5,523,775 A | 6/1996 | Capps |
| 5,530,455 A | 6/1996 | Gillick et al. |
| 5,534,892 A | 7/1996 | Tagawa |
| 5,543,588 A | 8/1996 | Bisset et al. |
| 5,543,589 A | 8/1996 | Buchana et al. |
| 5,543,590 A | 8/1996 | Gillespie et al. |
| 5,543,591 A | 8/1996 | Gillespie et al. |
| 5,550,659 A | 8/1996 | Fujieda et al. |
| 5,552,787 A | 9/1996 | Schuler et al. |
| 5,553,500 A | 9/1996 | Grahn et al. |
| 5,563,632 A | 10/1996 | Roberts |
| 5,563,727 A | 10/1996 | Larson et al. |
| 5,563,996 A | 10/1996 | Tchao |
| 5,565,658 A | 10/1996 | Gerpheide et al. |
| 5,572,205 A | 11/1996 | Caldwell et al. |
| 5,574,262 A * | 11/1996 | Petty .................. G06F 3/0418 178/18.02 |
| 5,576,070 A | 11/1996 | Yaniv |
| 5,579,036 A | 11/1996 | Yates, IV |
| 5,581,681 A | 12/1996 | Tchao et al. |
| 5,583,946 A | 12/1996 | Gourdol |
| 5,589,856 A | 12/1996 | Stein et al. |
| 5,590,219 A | 12/1996 | Gourdol |
| 5,592,566 A | 1/1997 | Pagallo et al. |
| 5,594,806 A | 1/1997 | Colbert |
| 5,594,810 A | 1/1997 | Gourdol |

(56) References Cited

U.S. PATENT DOCUMENTS

| | | |
|---|---|---|
| 5,596,694 A | 1/1997 | Capps |
| 5,612,719 A | 3/1997 | Beernink et al. |
| 5,623,280 A | 4/1997 | Akins et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,638,093 A | 6/1997 | Takahashi et al. |
| 5,642,108 A | 6/1997 | Gopher et al. |
| 5,644,657 A | 7/1997 | Capps et al. |
| 5,648,642 A | 7/1997 | Miller et al. |
| 5,650,597 A | 7/1997 | Redmayne |
| 5,666,113 A | 9/1997 | Logan |
| 5,666,502 A | 9/1997 | Capps |
| 5,666,552 A | 9/1997 | Greyson et al. |
| 5,673,041 A | 9/1997 | Chatigny et al. |
| 5,675,361 A | 10/1997 | Santilli |
| 5,677,710 A | 10/1997 | Thompson-Rohrlich |
| 5,677,744 A | 10/1997 | Yoneda et al. |
| 5,680,160 A | 10/1997 | LaPointe |
| 5,686,973 A | 11/1997 | Lee |
| 5,689,253 A | 11/1997 | Hargreaves et al. |
| 5,710,844 A | 1/1998 | Capps et al. |
| 5,729,250 A | 3/1998 | Bishop et al. |
| 5,730,165 A | 3/1998 | Philipp |
| 5,734,742 A | 3/1998 | Asaeda et al. |
| 5,734,751 A | 3/1998 | Saito |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,748,269 A | 5/1998 | Harris et al. |
| 5,760,857 A | 6/1998 | Yanagawa et al. |
| 5,764,218 A | 6/1998 | Bona et al. |
| 5,764,818 A | 6/1998 | Capps et al. |
| 5,767,457 A | 6/1998 | Gerpheide et al. |
| 5,767,842 A | 6/1998 | Korth |
| 5,777,596 A | 7/1998 | Herbert |
| 5,790,104 A | 8/1998 | Shieh |
| 5,790,106 A | 8/1998 | Hirano et al. |
| 5,790,107 A | 8/1998 | Kasser et al. |
| 5,801,340 A | 9/1998 | Peter |
| 5,802,516 A | 9/1998 | Shwarts et al. |
| 5,805,144 A | 9/1998 | Scholder et al. |
| 5,808,567 A | 9/1998 | McCloud |
| 5,809,166 A | 9/1998 | Huang et al. |
| 5,809,267 A | 9/1998 | Moran et al. |
| 5,815,141 A | 9/1998 | Phares |
| 5,821,690 A | 10/1998 | Martens et al. |
| 5,821,930 A | 10/1998 | Hansen |
| 5,823,782 A | 10/1998 | Marcus et al. |
| 5,825,351 A | 10/1998 | Tam |
| 5,825,352 A | 10/1998 | Bisset et al. |
| 5,831,170 A | 11/1998 | Sokn |
| 5,835,079 A | 11/1998 | Shieh |
| 5,838,308 A | 11/1998 | Knapp et al. |
| 5,841,078 A | 11/1998 | Miller et al. |
| 5,841,415 A | 11/1998 | Kwon et al. |
| 5,844,506 A | 12/1998 | Binstead |
| 5,847,690 A | 12/1998 | Boie et al. |
| 5,852,487 A | 12/1998 | Fujimori et al. |
| 5,854,450 A | 12/1998 | Kent |
| 5,854,625 A | 12/1998 | Frisch et al. |
| 5,856,822 A | 1/1999 | Du et al. |
| 5,861,583 A | 1/1999 | Schediwy et al. |
| 5,861,875 A | 1/1999 | Gerpheide |
| 5,867,151 A | 2/1999 | Nakai |
| 5,869,790 A | 2/1999 | Shigetaka et al. |
| 5,869,791 A | 2/1999 | Young |
| 5,880,411 A | 3/1999 | Gillespie et al. |
| 5,889,236 A | 3/1999 | Gillespie et al. |
| 5,898,434 A | 4/1999 | Small et al. |
| 5,914,465 A | 6/1999 | Allen et al. |
| 5,915,285 A | 6/1999 | Sommer |
| 5,917,165 A | 6/1999 | Platt et al. |
| 5,920,298 A | 7/1999 | McKnight |
| 5,920,309 A | 7/1999 | Bisset et al. |
| 5,923,319 A | 7/1999 | Bishop et al. |
| 5,926,161 A | 7/1999 | Furuhashi et al. |
| 5,929,834 A | 7/1999 | Inoue et al. |
| 5,933,134 A | 8/1999 | Shieh |
| 5,940,055 A | 8/1999 | Lee |
| 5,940,064 A | 8/1999 | Kai et al. |
| 5,942,733 A | 8/1999 | Allen et al. |
| 5,943,043 A | 8/1999 | Furuhata et al. |
| 5,943,044 A | 8/1999 | Martinelli et al. |
| 5,945,980 A | 8/1999 | Moissev et al. |
| 5,952,998 A | 9/1999 | Clancy et al. |
| 5,955,198 A | 9/1999 | Hashimoto et al. |
| 5,977,562 A | 11/1999 | Hirakata et al. |
| 5,977,957 A | 11/1999 | Miller et al. |
| 5,982,352 A | 11/1999 | Pryor |
| 5,986,723 A | 11/1999 | Nakamura et al. |
| 6,002,389 A | 12/1999 | Kasser |
| 6,002,808 A | 12/1999 | Freeman |
| 6,008,800 A | 12/1999 | Pryor |
| 6,020,881 A | 2/2000 | Naughton et al. |
| 6,020,945 A | 2/2000 | Sawai et al. |
| 6,023,265 A | 2/2000 | Lee |
| 6,028,581 A | 2/2000 | Umeya |
| 6,029,214 A | 2/2000 | Dorfman et al. |
| 6,031,524 A | 2/2000 | Kunert |
| 6,037,882 A | 3/2000 | Levy |
| 6,050,825 A | 4/2000 | Nichol et al. |
| 6,052,339 A | 4/2000 | Frenkel et al. |
| 6,057,903 A * | 5/2000 | Colgan ............ G02F 1/134309 345/173 |
| 6,061,177 A | 5/2000 | Fujimoto |
| 6,072,494 A | 6/2000 | Nguyen |
| 6,079,282 A | 6/2000 | Lanter |
| 6,081,259 A | 6/2000 | Teterwak |
| 6,084,576 A | 7/2000 | Leu et al. |
| 6,107,654 A | 8/2000 | Yamazaki |
| 6,107,997 A | 8/2000 | Ure |
| 6,124,848 A | 9/2000 | Ballare et al. |
| 6,128,003 A | 10/2000 | Smith et al. |
| 6,131,299 A | 10/2000 | Raab et al. |
| 6,133,906 A | 10/2000 | Geaghan |
| 6,135,958 A | 10/2000 | Mikula-Curtis et al. |
| 6,137,427 A | 10/2000 | Binstead |
| 6,144,380 A | 11/2000 | Shwarts et al. |
| 6,163,313 A | 12/2000 | Aroyan et al. |
| 6,172,667 B1 | 1/2001 | Sayag |
| 6,177,918 B1 | 1/2001 | Colgan et al. |
| 6,188,391 B1 | 2/2001 | Seely et al. |
| 6,191,828 B1 | 2/2001 | Kim et al. |
| 6,198,515 B1 | 3/2001 | Cole |
| 6,204,897 B1 | 3/2001 | Colgan et al. |
| 6,208,329 B1 | 3/2001 | Ballare |
| 6,211,585 B1 | 4/2001 | Sato et al. |
| 6,222,465 B1 | 4/2001 | Kumar et al. |
| 6,222,528 B1 | 4/2001 | Gerpheide et al. |
| 6,239,389 B1 | 5/2001 | Allen et al. |
| 6,239,788 B1 | 5/2001 | Nohno et al. |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,250,863 B1 | 6/2001 | Kamentser et al. |
| 6,259,490 B1 | 7/2001 | Colgan et al. |
| 6,271,835 B1 | 8/2001 | Hoeksma |
| 6,285,428 B1 | 9/2001 | Kim et al. |
| 6,288,707 B1 | 9/2001 | Philipp |
| 6,289,326 B1 | 9/2001 | LaFleur |
| 6,292,178 B1 | 9/2001 | Bernstein et al. |
| 6,297,811 B1 | 10/2001 | Kent |
| 6,310,610 B1 | 10/2001 | Beaton et al. |
| 6,317,248 B1 | 11/2001 | Agrawal et al. |
| 6,323,846 B1 | 11/2001 | Westerman et al. |
| 6,323,849 B1 | 11/2001 | He et al. |
| 6,333,768 B1 | 12/2001 | Kawashima et al. |
| 6,337,678 B1 | 1/2002 | Fish |
| 6,342,938 B1 | 1/2002 | Song et al. |
| 6,347,290 B1 | 2/2002 | Bartlett |

(56) References Cited

U.S. PATENT DOCUMENTS

| | | |
|---|---|---|
| 6,377,009 B1 | 4/2002 | Philipp |
| 6,380,931 B1 | 4/2002 | Gillespie et al. |
| 6,395,863 B2 | 5/2002 | Geaghan |
| 6,411,287 B1 | 6/2002 | Scharff et al. |
| 6,414,671 B1 | 7/2002 | Gillespie et al. |
| 6,417,846 B1 | 7/2002 | Lee |
| 6,421,039 B1 | 7/2002 | Moon et al. |
| 6,421,234 B1 | 7/2002 | Ricks et al. |
| 6,425,289 B1 | 7/2002 | Igel et al. |
| 6,452,514 B1 | 9/2002 | Philipp |
| 6,456,350 B1 | 9/2002 | Ashizawa et al. |
| 6,457,355 B1 | 10/2002 | Philipp |
| 6,459,424 B1 | 10/2002 | Resman |
| 6,466,036 B1 | 10/2002 | Philipp |
| 6,483,498 B1 | 11/2002 | Colgan et al. |
| 6,489,952 B1 | 12/2002 | Tanaka et al. |
| 6,492,599 B1 | 12/2002 | Sugihara |
| 6,501,528 B1 | 12/2002 | Hamada |
| 6,501,529 B1 | 12/2002 | Kurihara et al. |
| 6,504,530 B1 | 1/2003 | Wilson et al. |
| 6,504,713 B1 | 1/2003 | Pandolfi et al. |
| 6,515,669 B1 | 2/2003 | Mohri |
| 6,522,772 B1 | 2/2003 | Morrison et al. |
| 6,525,547 B2 | 2/2003 | Hayes |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,545,495 B2 | 4/2003 | Warmack et al. |
| 6,549,193 B1 | 4/2003 | Huang et al. |
| 6,568,275 B2 | 5/2003 | Scholz et al. |
| 6,570,557 B1 | 5/2003 | Westerman et al. |
| 6,593,916 B1 | 7/2003 | Aroyan |
| 6,602,790 B2 | 8/2003 | Kian et al. |
| 6,610,936 B2 | 8/2003 | Gillespie et al. |
| 6,624,833 B1 | 9/2003 | Kumar et al. |
| 6,624,835 B2 | 9/2003 | Willig |
| 6,627,918 B2 | 9/2003 | Getz et al. |
| 6,628,268 B1 | 9/2003 | Harada et al. |
| 6,639,577 B2 | 10/2003 | Eberhard |
| D482,368 S | 11/2003 | DenToonder et al. |
| 6,650,319 B1 | 11/2003 | Hurst et al. |
| 6,658,994 B1 | 12/2003 | McMillan |
| 6,670,894 B2 | 12/2003 | Mehring |
| 6,670,951 B2 | 12/2003 | Clough et al. |
| 6,677,932 B1 | 1/2004 | Westerman |
| 6,677,934 B1 | 1/2004 | Blanchard |
| 6,680,448 B2 | 1/2004 | Kawashima et al. |
| 6,690,032 B1 | 2/2004 | Umetsu |
| 6,690,387 B2 | 2/2004 | Zimmerman et al. |
| 6,721,375 B1 | 4/2004 | Hammel |
| 6,723,929 B2 | 4/2004 | Kent |
| 6,724,366 B2 | 4/2004 | Crawford |
| 6,757,002 B1 | 6/2004 | Oross et al. |
| 6,762,752 B2 | 7/2004 | Perski et al. |
| 6,774,971 B2 | 8/2004 | Shirato et al. |
| 6,784,948 B2 | 8/2004 | Kawashima et al. |
| 6,785,578 B2 | 8/2004 | Johnson et al. |
| 6,803,906 B1 | 10/2004 | Morrison et al. |
| 6,825,833 B2 | 11/2004 | Mulligan et al. |
| 6,842,672 B1 | 1/2005 | Straub et al. |
| 6,846,579 B2 | 1/2005 | Anderson et al. |
| 6,856,259 B1 | 2/2005 | Sharp |
| 6,876,355 B1 | 4/2005 | Ahn et al. |
| 6,888,536 B2 | 5/2005 | Westerman et al. |
| 6,900,795 B1 | 5/2005 | Knight, III et al. |
| 6,906,692 B2 | 6/2005 | Ishiyama |
| 6,909,532 B2 | 6/2005 | Chung et al. |
| 6,924,789 B2 | 8/2005 | Bick |
| 6,927,761 B2 | 8/2005 | Badaye et al. |
| 6,927,763 B2 | 8/2005 | LaMonica |
| 6,942,571 B1 | 9/2005 | McAllister et al. |
| 6,943,779 B2 | 9/2005 | Satoh |
| 6,947,102 B2 | 9/2005 | den Boer et al. |
| 6,961,049 B2 | 11/2005 | Mulligan et al. |
| 6,963,335 B2 | 11/2005 | Tanaka et al. |
| 6,965,375 B1 | 11/2005 | Gettemy et al. |
| 6,970,160 B2 | 11/2005 | Mulligan et al. |
| 6,972,401 B2 | 12/2005 | Akitt et al. |
| 6,977,666 B1 | 12/2005 | Hedrick |
| 6,982,432 B2 | 1/2006 | Umemoto et al. |
| 6,985,801 B1 | 1/2006 | Straub et al. |
| 6,992,659 B2 | 1/2006 | Gettemy |
| 6,995,752 B2 | 2/2006 | Lu |
| 7,006,064 B2 | 2/2006 | Enomoto et al. |
| 7,009,663 B2 | 3/2006 | Abileah et al. |
| 7,015,894 B2 | 3/2006 | Morohoshi |
| 7,023,427 B2 | 4/2006 | Kraus et al. |
| 7,030,860 B1 | 4/2006 | Hsu et al. |
| 7,031,228 B2 | 4/2006 | Born et al. |
| 7,038,659 B2 | 5/2006 | Rajkowski |
| 7,042,444 B2 | 5/2006 | Cok |
| 7,046,235 B2 | 5/2006 | Katoh |
| 7,068,330 B2 | 6/2006 | Song et al. |
| 7,088,342 B2 | 8/2006 | Rekimoto |
| 7,088,343 B2 | 8/2006 | Smith |
| 7,098,127 B2 | 8/2006 | Ito |
| 7,098,897 B2 | 8/2006 | Vakil et al. |
| 7,109,978 B2 | 9/2006 | Gillespie et al. |
| 7,129,935 B2 | 10/2006 | Mackey |
| 7,133,032 B2 | 11/2006 | Cok |
| 7,138,984 B1 | 11/2006 | Miles |
| 7,151,528 B2 | 12/2006 | Taylor et al. |
| 7,154,481 B2 | 12/2006 | Cross et al. |
| 7,177,001 B2 | 2/2007 | Lee |
| 7,184,064 B2 | 2/2007 | Zimmerman et al. |
| 7,190,416 B2 | 3/2007 | Paukshto et al. |
| 7,202,856 B2 | 4/2007 | Cok |
| 7,205,969 B2 | 4/2007 | Song |
| 7,230,608 B2 | 6/2007 | Cok |
| 7,254,775 B2 | 8/2007 | Geaghan et al. |
| 7,268,770 B1 | 9/2007 | Takahata et al. |
| 7,274,353 B2 | 9/2007 | Chiu et al. |
| 7,280,167 B2 | 10/2007 | Choi et al. |
| 7,292,229 B2 | 11/2007 | Morag et al. |
| 7,307,231 B2 | 12/2007 | Matsumoto et al. |
| 7,319,448 B2 | 1/2008 | Kim et al. |
| RE40,153 E | 3/2008 | Westerman et al. |
| 7,339,579 B2 | 3/2008 | Richter et al. |
| 7,355,592 B2 | 4/2008 | Jong et al. |
| 7,362,313 B2 | 4/2008 | Geaghan et al. |
| 7,372,455 B2 | 5/2008 | Perski et al. |
| 7,379,054 B2 | 5/2008 | Lee |
| 7,453,444 B2 | 11/2008 | Geaghan |
| 7,463,246 B2 | 12/2008 | Mackey |
| 7,483,016 B1 | 1/2009 | Gettemy et al. |
| 7,511,702 B2 | 3/2009 | Hotelling |
| 7,538,760 B2 | 5/2009 | Hotelling et al. |
| 7,554,624 B2 | 6/2009 | Kusuda et al. |
| 7,633,484 B2 | 12/2009 | Ito |
| 7,663,583 B2 | 2/2010 | Lee et al. |
| 7,663,607 B2 | 2/2010 | Hotelling et al. |
| 7,683,888 B1 | 3/2010 | Kennedy |
| 7,688,315 B1 | 3/2010 | Gettemy et al. |
| 7,692,729 B2 | 4/2010 | Pak et al. |
| 7,705,813 B2 | 4/2010 | Hong |
| 7,705,834 B2 | 4/2010 | Swedin |
| 7,730,401 B2 | 6/2010 | Gillespie et al. |
| 7,737,957 B2 | 6/2010 | Lee et al. |
| 7,742,041 B2 | 6/2010 | Lee et al. |
| 7,746,326 B2 | 6/2010 | Sato |
| 7,755,683 B2 | 7/2010 | Sergio et al. |
| 7,800,589 B2 | 9/2010 | Hurst et al. |
| 7,812,828 B2 | 10/2010 | Westerman et al. |
| 7,843,439 B2 | 11/2010 | Perski et al. |
| 7,868,875 B2 | 1/2011 | Park et al. |
| 7,920,129 B2 | 4/2011 | Hotelling et al. |
| 7,924,253 B2 | 4/2011 | Huang et al. |
| 8,031,180 B2 | 10/2011 | Miyamoto et al. |
| 8,040,326 B2 | 10/2011 | Hotelling et al. |
| 8,125,463 B2 | 2/2012 | Hotelling et al. |
| 8,130,209 B2 | 3/2012 | Chang |
| 8,228,274 B2 | 7/2012 | Chung et al. |
| 8,243,027 B2 | 8/2012 | Hotelling et al. |

(56) References Cited

U.S. PATENT DOCUMENTS

| | | | |
|---|---|---|---|
| 8,253,692 B2 * | 8/2012 | Lai | G06F 3/0412 178/18.01 |
| 8,259,078 B2 | 9/2012 | Hotelling et al. | |
| 8,274,492 B2 | 9/2012 | Hotelling et al. | |
| 8,310,427 B2 | 11/2012 | Sheu | |
| 8,368,630 B2 | 2/2013 | Lee et al. | |
| 8,400,406 B1 | 3/2013 | Kurtz et al. | |
| 8,416,209 B2 | 4/2013 | Hotelling et al. | |
| 8,421,760 B2 | 4/2013 | Liu et al. | |
| 8,432,371 B2 | 4/2013 | Hotelling et al. | |
| 8,451,244 B2 | 5/2013 | Hotelling et al. | |
| 8,479,122 B2 | 7/2013 | Hotelling et al. | |
| 8,487,890 B2 | 7/2013 | Juan et al. | |
| 8,493,330 B2 | 7/2013 | Krah | |
| 8,502,799 B2 | 8/2013 | Hotelling et al. | |
| 8,508,244 B2 | 8/2013 | Seguine | |
| 8,552,989 B2 | 10/2013 | Hotelling et al. | |
| 8,553,013 B2 | 10/2013 | Kim | |
| 8,605,051 B2 | 12/2013 | Hotelling et al. | |
| 8,654,083 B2 | 2/2014 | Hotelling et al. | |
| 8,698,777 B2 | 4/2014 | Endo et al. | |
| 8,743,300 B2 | 6/2014 | Chang et al. | |
| 8,804,056 B2 | 8/2014 | Chang et al. | |
| 8,866,787 B2 | 10/2014 | Chang et al. | |
| 8,872,785 B2 | 10/2014 | Hotelling et al. | |
| 8,922,520 B2 | 12/2014 | Chen | |
| 8,928,618 B2 | 1/2015 | Hotelling et al. | |
| 8,933,351 B2 | 1/2015 | Noguchi et al. | |
| 8,982,087 B2 | 3/2015 | Hotelling et al. | |
| 9,025,090 B2 | 5/2015 | Chang et al. | |
| 9,030,452 B2 | 5/2015 | Jang et al. | |
| 9,035,202 B2 | 5/2015 | Mizuhashi et al. | |
| 9,035,907 B2 | 5/2015 | Hotelling et al. | |
| 9,146,414 B2 | 9/2015 | Chang et al. | |
| 9,244,561 B2 | 1/2016 | Hotelling et al. | |
| 9,268,429 B2 | 2/2016 | Hotelling et al. | |
| 9,454,277 B2 | 9/2016 | Hotelling et al. | |
| 9,575,610 B2 | 2/2017 | Hotelling et al. | |
| 9,710,095 B2 * | 7/2017 | Hotelling | G06F 3/044 |
| 9,971,459 B2 * | 5/2018 | Youngs | G06F 3/044 |
| 10,191,576 B2 | 1/2019 | Hotelling et al. | |
| 2001/0000961 A1 | 5/2001 | Hikida et al. | |
| 2001/0020578 A1 | 9/2001 | Baier | |
| 2001/0020986 A1 | 9/2001 | Ikeda et al. | |
| 2001/0020987 A1 | 9/2001 | Ahn et al. | |
| 2001/0023204 A1 | 9/2001 | Komata | |
| 2002/0015024 A1 | 2/2002 | Westerman et al. | |
| 2002/0018035 A1 | 2/2002 | Song et al. | |
| 2002/0021398 A1 | 2/2002 | Matsumoto | |
| 2002/0033919 A1 | 3/2002 | Sanelle et al. | |
| 2002/0041356 A1 | 4/2002 | Tanada et al. | |
| 2002/0049070 A1 * | 4/2002 | Bick | G06F 3/0202 455/550.1 |
| 2002/0063674 A1 | 5/2002 | Chiang | |
| 2002/0084922 A1 | 7/2002 | Yagi | |
| 2002/0089496 A1 | 7/2002 | Numao | |
| 2002/0101410 A1 | 8/2002 | Sakata et al. | |
| 2002/0118848 A1 | 8/2002 | Karpenstein | |
| 2002/0121146 A1 | 9/2002 | Manaresi et al. | |
| 2002/0140649 A1 | 10/2002 | Aoyama et al. | |
| 2002/0149571 A1 | 10/2002 | Roberts | |
| 2002/0150336 A1 | 10/2002 | Davis et al. | |
| 2002/0158637 A1 | 10/2002 | Warmack et al. | |
| 2002/0159015 A1 | 10/2002 | Seo et al. | |
| 2002/0167489 A1 | 11/2002 | Davis | |
| 2002/0185981 A1 | 12/2002 | Dietz et al. | |
| 2002/0185999 A1 | 12/2002 | Tajima et al. | |
| 2002/0186210 A1 * | 12/2002 | Itoh | G06F 3/0418 345/173 |
| 2002/0190964 A1 | 12/2002 | Van Berkel | |
| 2002/0191029 A1 | 12/2002 | Gillespie et al. | |
| 2002/0192445 A1 | 12/2002 | Ezzell et al. | |
| 2002/0196237 A1 | 12/2002 | Fernando et al. | |
| 2003/0006974 A1 | 1/2003 | Clough et al. | |
| 2003/0026513 A1 | 2/2003 | Deliwala | |
| 2003/0035479 A1 | 2/2003 | Kan et al. | |
| 2003/0052867 A1 | 3/2003 | Shigetaka et al. | |
| 2003/0067451 A1 | 4/2003 | Tagg et al. | |
| 2003/0069653 A1 | 4/2003 | Johnson et al. | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0085882 A1 | 5/2003 | Lu | |
| 2003/0095091 A1 | 5/2003 | Enomoto et al. | |
| 2003/0095095 A1 | 5/2003 | Pihlaja | |
| 2003/0095096 A1 | 5/2003 | Robbin et al. | |
| 2003/0098858 A1 | 5/2003 | Perski et al. | |
| 2003/0132950 A1 | 7/2003 | Surucu et al. | |
| 2003/0151600 A1 | 8/2003 | Takeuchi et al. | |
| 2003/0174128 A1 | 9/2003 | Matsufusa | |
| 2003/0174272 A1 | 9/2003 | Shirato et al. | |
| 2003/0179323 A1 | 9/2003 | Abileah et al. | |
| 2003/0201984 A1 | 10/2003 | Falvo | |
| 2003/0206162 A1 | 11/2003 | Roberts | |
| 2003/0206202 A1 | 11/2003 | Moriya | |
| 2003/0214485 A1 | 11/2003 | Roberts | |
| 2003/0214486 A1 | 11/2003 | Roberts | |
| 2003/0222857 A1 | 12/2003 | Abileah | |
| 2003/0234768 A1 | 12/2003 | Rekimoto et al. | |
| 2003/0234769 A1 | 12/2003 | Cross et al. | |
| 2003/0234770 A1 | 12/2003 | MacKey | |
| 2004/0021663 A1 | 2/2004 | Suzuki et al. | |
| 2004/0022010 A1 | 2/2004 | Shigetaka | |
| 2004/0056839 A1 | 3/2004 | Yoshihara | |
| 2004/0080501 A1 | 4/2004 | Koyama | |
| 2004/0090429 A1 | 5/2004 | Geaghan et al. | |
| 2004/0095335 A1 | 5/2004 | Oh et al. | |
| 2004/0109097 A1 | 6/2004 | Mai | |
| 2004/0119701 A1 | 6/2004 | Mulligan et al. | |
| 2004/0141096 A1 | 7/2004 | Mai | |
| 2004/0150629 A1 | 8/2004 | Lee | |
| 2004/0155871 A1 | 8/2004 | Perski et al. | |
| 2004/0155991 A1 | 8/2004 | Lowles et al. | |
| 2004/0165005 A1 | 8/2004 | Yoshikawa et al. | |
| 2004/0169625 A1 * | 9/2004 | Park | G02F 1/135 345/87 |
| 2004/0183076 A1 | 9/2004 | Yamazaki et al. | |
| 2004/0183484 A1 | 9/2004 | Ide et al. | |
| 2004/0188150 A1 | 9/2004 | Richard et al. | |
| 2004/0189587 A1 | 9/2004 | Jung et al. | |
| 2004/0189612 A1 | 9/2004 | Bottari et al. | |
| 2004/0196266 A1 * | 10/2004 | Matsuura | G06F 3/0233 345/169 |
| 2004/0206190 A1 | 10/2004 | Kawahata | |
| 2004/0217945 A1 | 11/2004 | Miyamoto et al. | |
| 2004/0227736 A1 | 11/2004 | Kamrath et al. | |
| 2004/0239650 A1 | 12/2004 | Mackey | |
| 2004/0243747 A1 | 12/2004 | Rekimoto | |
| 2004/0263484 A1 | 12/2004 | Mantysalo et al. | |
| 2004/0263743 A1 | 12/2004 | Kim et al. | |
| 2005/0005703 A1 | 1/2005 | Saito et al. | |
| 2005/0007349 A1 | 1/2005 | Vakil et al. | |
| 2005/0012723 A1 | 1/2005 | Pallakoff | |
| 2005/0017737 A1 | 1/2005 | Yakabe et al. | |
| 2005/0046621 A1 | 3/2005 | Kakikuranta | |
| 2005/0052425 A1 | 3/2005 | Zadesky et al. | |
| 2005/0052427 A1 | 3/2005 | Wu et al. | |
| 2005/0052582 A1 | 3/2005 | Mai | |
| 2005/0062620 A1 | 3/2005 | Schaefer | |
| 2005/0073507 A1 | 4/2005 | Richter et al. | |
| 2005/0083307 A1 * | 4/2005 | Aufderheide | G06F 3/044 345/173 |
| 2005/0094038 A1 | 5/2005 | Choi et al. | |
| 2005/0099402 A1 | 5/2005 | Nakanishi et al. | |
| 2005/0104867 A1 | 5/2005 | Westerman et al. | |
| 2005/0110768 A1 | 5/2005 | Marriott et al. | |
| 2005/0139837 A1 | 6/2005 | Lee et al. | |
| 2005/0140620 A1 | 6/2005 | Aoyama et al. | |
| 2005/0140634 A1 | 6/2005 | Takatori | |
| 2005/0146511 A1 | 7/2005 | Hill et al. | |
| 2005/0162402 A1 | 7/2005 | Watanachote | |
| 2005/0170668 A1 | 8/2005 | Park et al. | |
| 2005/0231487 A1 | 10/2005 | Ming | |
| 2005/0237439 A1 | 10/2005 | Mai | |

(56) References Cited

U.S. PATENT DOCUMENTS

| | | |
|---|---|---|
| 2005/0243023 A1 | 11/2005 | Reddy et al. |
| 2006/0007087 A1 | 1/2006 | Choi et al. |
| 2006/0007165 A1 | 1/2006 | Yang et al. |
| 2006/0012575 A1 | 1/2006 | Knapp et al. |
| 2006/0017710 A1 | 1/2006 | Lee et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0044259 A1 | 3/2006 | Hotelling et al. |
| 2006/0053387 A1 | 3/2006 | Ording |
| 2006/0066582 A1 | 3/2006 | Lyon et al. |
| 2006/0085757 A1 | 4/2006 | Andre et al. |
| 2006/0087482 A1 | 4/2006 | Utsumi et al. |
| 2006/0097991 A1* | 5/2006 | Hotelling ............ G06F 3/0416 345/173 |
| 2006/0109222 A1 | 5/2006 | Lee et al. |
| 2006/0114247 A1 | 6/2006 | Brown |
| 2006/0132462 A1 | 6/2006 | Geaghan |
| 2006/0145365 A1 | 7/2006 | Halls et al. |
| 2006/0145983 A1 | 7/2006 | Lee et al. |
| 2006/0145987 A1 | 7/2006 | Hong |
| 2006/0146033 A1 | 7/2006 | Chen et al. |
| 2006/0146034 A1 | 7/2006 | Chen et al. |
| 2006/0146038 A1 | 7/2006 | Parkg et al. |
| 2006/0192745 A1 | 8/2006 | Yamazaki |
| 2006/0197753 A1 | 9/2006 | Hotelling |
| 2006/0208985 A1 | 9/2006 | Hwang et al. |
| 2006/0227114 A1 | 10/2006 | Geaghan et al. |
| 2006/0232564 A1 | 10/2006 | Nishimura et al. |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0244736 A1 | 11/2006 | Tseng |
| 2006/0262100 A1 | 11/2006 | Van Berkel |
| 2006/0278444 A1 | 12/2006 | Binstead |
| 2006/0279679 A1 | 12/2006 | Fujisawa et al. |
| 2006/0284857 A1 | 12/2006 | Oh |
| 2006/0290863 A1 | 12/2006 | HoeSup |
| 2007/0013678 A1 | 1/2007 | Nakajima et al. |
| 2007/0018969 A1 | 1/2007 | Chen et al. |
| 2007/0027932 A1 | 2/2007 | Thibeault |
| 2007/0062739 A1 | 3/2007 | Philipp et al. |
| 2007/0075977 A1 | 4/2007 | Chen et al. |
| 2007/0085838 A1 | 4/2007 | Ricks et al. |
| 2007/0109274 A1 | 5/2007 | Reynolds |
| 2007/0132739 A1* | 6/2007 | Felder ................. G06F 3/0412 345/173 |
| 2007/0152976 A1 | 7/2007 | Townsend et al. |
| 2007/0159561 A1 | 7/2007 | Chien |
| 2007/0176905 A1 | 8/2007 | Shih et al. |
| 2007/0182706 A1 | 8/2007 | Cassidy et al. |
| 2007/0216657 A1 | 9/2007 | Konieck |
| 2007/0229464 A1 | 10/2007 | Hotelling et al. |
| 2007/0229479 A1* | 10/2007 | Choo ................... G06F 3/0436 345/177 |
| 2007/0236466 A1 | 10/2007 | Hotelling |
| 2007/0242055 A1* | 10/2007 | Lai ...................... G06F 3/0412 345/173 |
| 2007/0247429 A1 | 10/2007 | Westerman |
| 2007/0257890 A1 | 11/2007 | Hotelling et al. |
| 2007/0262967 A1 | 11/2007 | Rho |
| 2008/0007538 A1* | 1/2008 | Kotera ................. G06F 3/0412 345/173 |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0055270 A1 | 3/2008 | Cho et al. |
| 2008/0062140 A1 | 3/2008 | Hotelling et al. |
| 2008/0062148 A1 | 3/2008 | Hotelling et al. |
| 2008/0067528 A1 | 3/2008 | Choi et al. |
| 2008/0074401 A1 | 3/2008 | Chung et al. |
| 2008/0079697 A1 | 4/2008 | Lee et al. |
| 2008/0129317 A1 | 6/2008 | Oba |
| 2008/0129898 A1 | 6/2008 | Moon |
| 2008/0131624 A1 | 6/2008 | Egami et al. |
| 2008/0136980 A1 | 6/2008 | Rho et al. |
| 2008/0150901 A1 | 6/2008 | Lowles et al. |
| 2008/0157867 A1 | 7/2008 | Krah |
| 2008/0158167 A1 | 7/2008 | Hotelling et al. |
| 2008/0158181 A1 | 7/2008 | Hamblin et al. |
| 2008/0165158 A1* | 7/2008 | Hotelling ............... G06F 3/044 345/174 |
| 2008/0165299 A1 | 7/2008 | Huang et al. |
| 2008/0186288 A1 | 8/2008 | Chang |
| 2008/0273014 A1 | 11/2008 | Lowles et al. |
| 2008/0284927 A1 | 11/2008 | Sakamoto et al. |
| 2008/0284928 A1 | 11/2008 | Sakamoto et al. |
| 2008/0297476 A1 | 12/2008 | Hotelling et al. |
| 2008/0309627 A1 | 12/2008 | Hotelling et al. |
| 2009/0058785 A1 | 3/2009 | Kim et al. |
| 2009/0066670 A1 | 3/2009 | Hotelling et al. |
| 2009/0090694 A1 | 4/2009 | Hotelling et al. |
| 2009/0096757 A1 | 4/2009 | Hotelling et al. |
| 2009/0096759 A1* | 4/2009 | Nishiwaki ............. G06F 3/041 345/173 |
| 2009/0102991 A1 | 4/2009 | Chen et al. |
| 2009/0115743 A1 | 5/2009 | Oowaki |
| 2009/0160816 A1 | 6/2009 | Westerman et al. |
| 2009/0179875 A1 | 7/2009 | Li et al. |
| 2009/0262061 A1 | 10/2009 | Chung et al. |
| 2009/0273581 A1 | 11/2009 | Kim et al. |
| 2009/0279006 A1 | 11/2009 | Chien et al. |
| 2009/0303193 A1 | 12/2009 | Lim et al. |
| 2009/0322660 A1 | 12/2009 | Chung et al. |
| 2010/0033448 A1 | 2/2010 | Takeo et al. |
| 2010/0045632 A1* | 2/2010 | Yilmaz ................. G01D 5/2405 345/174 |
| 2010/0066650 A1 | 3/2010 | Lee et al. |
| 2010/0103121 A1 | 4/2010 | Kim et al. |
| 2010/0110057 A1 | 5/2010 | Lee et al. |
| 2010/0182273 A1 | 7/2010 | Noguchi et al. |
| 2010/0188347 A1 | 7/2010 | Mizuhashi et al. |
| 2010/0194698 A1 | 8/2010 | Hotelling et al. |
| 2010/0194699 A1 | 8/2010 | Chang |
| 2010/0238134 A1 | 9/2010 | Day et al. |
| 2010/0289770 A1 | 11/2010 | Lee et al. |
| 2011/0032241 A1 | 2/2011 | Jeong et al. |
| 2011/0139516 A1 | 6/2011 | Nirmal |
| 2012/0026132 A1 | 2/2012 | Hotelling et al. |
| 2012/0038585 A1 | 2/2012 | Kim |
| 2012/0133858 A1 | 5/2012 | Shin et al. |
| 2013/0082964 A1 | 4/2013 | Agari et al. |
| 2013/0176276 A1 | 7/2013 | Shepelev |
| 2013/0293484 A1 | 11/2013 | Singh et al. |
| 2014/0078108 A1 | 3/2014 | Hotelling |
| 2014/0240286 A1 | 8/2014 | Chang et al. |
| 2015/0192815 A1 | 7/2015 | Chang et al. |
| 2015/0199053 A1 | 7/2015 | Hotelling et al. |
| 2015/0309627 A1 | 10/2015 | Xu et al. |
| 2015/0370378 A1 | 12/2015 | Chang et al. |
| 2016/0117023 A1 | 4/2016 | Hotelling et al. |
| 2017/0010746 A1 | 1/2017 | Hotelling et al. |
| 2017/0010750 A1* | 1/2017 | Hotelling ............... G06F 3/044 |
| 2017/0147119 A1 | 5/2017 | Hotelling et al. |
| 2017/0269738 A1 | 9/2017 | Chang et al. |

FOREIGN PATENT DOCUMENTS

| | | |
|---|---|---|
| CA | 2 318 815 A1 | 7/1999 |
| CA | 2494353 A1 | 2/2004 |
| CN | 1453623 A | 11/2003 |
| CN | 101241277 A | 8/2008 |
| DE | 197 06 168 | 8/1998 |
| DE | 102 51 296 A1 | 5/2004 |
| EP | 0 156 593 A2 | 10/1985 |

(56) References Cited

FOREIGN PATENT DOCUMENTS

| | | |
|---|---|---|
| EP | 0 156 593 A3 | 10/1985 |
| EP | 0 178 590 A2 | 4/1986 |
| EP | 0 250 931 A2 | 1/1988 |
| EP | 0 250 931 A3 | 1/1988 |
| EP | 0 250 931 B1 | 1/1988 |
| EP | 0 332 365 A1 | 9/1989 |
| EP | 0 464 908 A2 | 1/1992 |
| EP | 0 464 908 A3 | 1/1992 |
| EP | 0 464 908 B1 | 1/1992 |
| EP | 0 467 562 A2 | 1/1992 |
| EP | 0 483 519 A1 | 5/1992 |
| EP | 0 288 692 A2 | 7/1993 |
| EP | 0 288 692 A3 | 7/1993 |
| EP | 0 288 692 B1 | 7/1993 |
| EP | 0 664 504 A2 | 7/1995 |
| EP | 0 770 971 A2 | 5/1997 |
| EP | 0 786 745 A2 | 7/1997 |
| EP | 0 786 745 A3 | 7/1997 |
| EP | 0 786 745 B1 | 7/1997 |
| EP | 0 932 117 A2 | 7/1999 |
| EP | 0 932 117 A3 | 7/1999 |
| EP | 0 932 117 B1 | 7/1999 |
| EP | 0 973 123 A1 | 1/2000 |
| EP | 1 014 295 A2 | 1/2002 |
| EP | 1 014 295 A3 | 1/2002 |
| EP | 1 211 633 A1 | 6/2002 |
| EP | 1 211 633 B1 | 6/2002 |
| EP | 1 322 104 A1 | 6/2003 |
| EP | 1 391 807 A1 | 2/2004 |
| EP | 1 396 812 A2 | 3/2004 |
| EP | 1 396 812 A3 | 3/2004 |
| EP | 1 418 491 A2 | 5/2004 |
| EP | 1 418 491 A3 | 5/2004 |
| EP | 1 422 601 A1 | 5/2004 |
| EP | 1 455 264 A2 | 9/2004 |
| EP | 1 455 264 A3 | 9/2004 |
| EP | 1 469 415 A2 | 10/2004 |
| EP | 2 267 584 A1 | 12/2010 |
| GB | 1 486 988 A | 9/1977 |
| GB | 2 168 816 A | 6/1986 |
| GB | 2 313 195 A | 11/1997 |
| GB | 2 330 670 A | 4/1999 |
| GB | 2 345 140 A | 6/2000 |
| GB | 2 368 483 A | 7/2004 |
| JP | 53-147626 A2 | 11/1978 |
| JP | 58-166430 A | 10/1983 |
| JP | 59-214941 A | 12/1984 |
| JP | 60-123927 A | 7/1985 |
| JP | 60-211529 A | 10/1985 |
| JP | 61-131314 A | 6/1986 |
| JP | 63-279316 A | 11/1988 |
| JP | 02-030024 A | 1/1990 |
| JP | 03-180922 A | 8/1991 |
| JP | 03-289715 A | 12/1991 |
| JP | 03-294918 A | 12/1991 |
| JP | 04-127314 A | 4/1992 |
| JP | 05-053726 | 3/1993 |
| JP | 05-063914 A | 3/1993 |
| JP | 05-080923 A | 4/1993 |
| JP | 05-224818 A | 9/1993 |
| JP | 06-161661 A | 6/1994 |
| JP | 07-036017 A | 2/1995 |
| JP | 07-044305 A | 2/1995 |
| JP | 07-110741 A | 4/1995 |
| JP | 07-141086 A | 6/1995 |
| JP | H07-261932 A | 10/1995 |
| JP | 08-016307 A | 1/1996 |
| JP | 08-147092 A | 6/1996 |
| JP | 08-242458 A | 9/1996 |
| JP | H-08-249406 A | 9/1996 |
| JP | 08-297267 A | 11/1996 |
| JP | 09-054650 A | 2/1997 |
| JP | 09-091079 A | 4/1997 |
| JP | 09-096792 A | 4/1997 |
| JP | 09-212302 A | 8/1997 |
| JP | 09-292950 A | 11/1997 |
| JP | 09-325852 A | 12/1997 |
| JP | 10-003349 A | 1/1998 |
| JP | H10269020 A | 10/1998 |
| JP | 11-145141 A | 5/1999 |
| JP | 11-505641 A | 5/1999 |
| JP | 11-249813 A | 9/1999 |
| JP | 2000-105670 A | 4/2000 |
| JP | 2000-112642 A | 4/2000 |
| JP | 2000-163031 A | 6/2000 |
| JP | 2000-172437 A | 6/2000 |
| JP | 2000-172447 A | 6/2000 |
| JP | 2000-221932 A | 8/2000 |
| JP | 2001-075079 A | 3/2001 |
| JP | 2001-283228 A | 10/2001 |
| JP | 2002-501271 A | 1/2002 |
| JP | 2002-116017 A | 4/2002 |
| JP | 2002-259052 A | 9/2002 |
| JP | 2002-287660 A | 10/2002 |
| JP | 2002-342014 A | 11/2002 |
| JP | 2002-366304 A | 12/2002 |
| JP | 2003-029899 A | 1/2003 |
| JP | 2003-066417 A | 3/2003 |
| JP | 2003-099192 A | 4/2003 |
| JP | 2003-516015 A | 5/2003 |
| JP | 2003-173237 A | 6/2003 |
| JP | 2003-185688 A | 7/2003 |
| JP | 2003-196023 A | 7/2003 |
| JP | 2003-249738 A | 9/2003 |
| JP | 2003-255855 A | 9/2003 |
| JP | 2004-038919 A | 2/2004 |
| JP | 2004-102985 A | 4/2004 |
| JP | 2004-186333 A | 7/2004 |
| JP | 2004-526990 A | 9/2004 |
| JP | 2005-346047 A | 12/2005 |
| JP | 2006-134915 A | 5/2006 |
| JP | 2007-533044 A | 11/2007 |
| JP | 2008-032756 A | 2/2008 |
| JP | 2009-244958 A | 10/2009 |
| JP | 2010-231773 A | 10/2010 |
| KR | 10-0226812 B1 | 7/1999 |
| KR | 10-2001-0061430 A | 10/2001 |
| KR | 10-2002-0006982 A | 2/2002 |
| KR | 10-2004-0002310 A | 1/2004 |
| KR | 10-2004-0013029 A | 2/2004 |
| KR | 10-2004-0022243 A | 3/2004 |
| KR | 10-2005-0019799 A | 3/2005 |
| KR | 10-0493921 A | 6/2005 |
| KR | 10-2006-0089645 | 8/2006 |
| KR | 10-2010-0127164 A | 12/2010 |
| TW | 200302778 A | 8/2003 |
| TW | 2004-21156 | 10/2004 |
| TW | 2005-29441 A | 9/2005 |
| TW | 201009662 A | 3/2010 |
| TW | 201030588 A | 8/2010 |
| TW | 201042315 A | 12/2010 |
| WO | WO-87/04553 A1 | 7/1987 |
| WO | WO-92/13328 A1 | 8/1992 |
| WO | WO-96/15464 A1 | 5/1996 |
| WO | WO-96/18179 A1 | 6/1996 |
| WO | WO-1996/038833 A1 | 12/1996 |
| WO | WO-97/018547 A1 | 5/1997 |
| WO | WO-1997/018528 A1 | 5/1997 |
| WO | WO-97/023738 A1 | 7/1997 |
| WO | WO-1997/023738 A1 | 7/1997 |
| WO | WO-98/14863 A1 | 4/1998 |
| WO | WO-1998/014863 A2 | 4/1998 |
| WO | WO-99/038149 A1 | 7/1999 |
| WO | WO-00/44018 A1 | 7/2000 |
| WO | WO-01/27868 A1 | 4/2001 |
| WO | WO-01/39371 | 5/2001 |
| WO | WO-2002/035461 A1 | 5/2002 |
| WO | WO-02/061721 | 8/2002 |
| WO | WO-02/103621 A2 | 12/2002 |
| WO | WO-03/079176 A2 | 9/2003 |
| WO | WO-2003/088176 A1 | 10/2003 |
| WO | WO-2004/013833 A2 | 2/2004 |
| WO | WO-2004/013833 A3 | 2/2004 |
| WO | WO-2004/023376 A2 | 3/2004 |

(56) References Cited

FOREIGN PATENT DOCUMENTS

| WO | WO-2004/023376 A3 | 3/2004 |
|---|---|---|
| WO | WO-2004/053576 A1 | 6/2004 |
| WO | WO-2004/061808 A2 | 7/2004 |
| WO | WO-2004/061808 A3 | 7/2004 |
| WO | WO-2004/114265 A2 | 12/2004 |
| WO | WO-2005/064451 A1 | 7/2005 |
| WO | WO-2005/114369 A2 | 12/2005 |
| WO | WO-2005/114369 A3 | 12/2005 |
| WO | WO-2006/023569 A1 | 3/2006 |
| WO | WO-2006/054585 A1 | 5/2006 |
| WO | WO-2007/115032 A2 | 10/2007 |
| WO | WO-2007/115032 A3 | 10/2007 |
| WO | WO-2007/146779 A2 | 12/2007 |
| WO | WO-2007/146779 A3 | 12/2007 |
| WO | WO-2007/146780 A2 | 12/2007 |
| WO | WO-2007/146780 A3 | 12/2007 |
| WO | WO-2007/146783 A2 | 12/2007 |
| WO | WO-2007/146783 A3 | 12/2007 |
| WO | WO-2007/146785 A2 | 12/2007 |
| WO | WO-2007/146785 A3 | 12/2007 |
| WO | WO-2008/085457 A2 | 7/2008 |
| WO | WO-2008/085457 A3 | 7/2008 |
| WO | WO-2009/035471 A1 | 3/2009 |
| WO | WO-2012/087639 A2 | 6/2012 |

OTHER PUBLICATIONS

"Gesture Recognition," (2006). Located at <http://www.fingerworks.com/gesture_recognition.html>, last visited Jul. 25, 2006, two pages.
3M (2002). MicroTouch Capacitive Touch Screens Datasheets, 3M Innovation, six pages.
Agrawal, R. et al. (Jul. 1986). "An Overview of Tactile Sensing," Center for Research on Integrated Manufacturing: Robot Systems Division, The University of Michigan, 47 pages.
Anonymous. (May 8, 1992). "The Sensor Frame Graphic Manipulator," *NASA Phase II Final Report*, 28 pages.
Anonymous. (Oct. 30, 2001). "Radiotelephone with Rotating Symbol Keypad and Multi-Directional Symbol Input," located at www.vitgn.com/mobile_terminal.com, 12 pages.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.
Anonymous. "A Brief Overview of Gesture Recognition" obtained from http://www. Dai. Ed. Ac.uk/Cvonline/LOCA_COPIES/COHEN/gesture_overview.Html, generated Apr. 20, 2004.
Anonymous. "Capacitive Position Sensing" obtained from http://www.synaptics.com/technology/cps.cfin generated Aug. 5, 2005.
Anonymous. "Capacitive Touchscreens" obtained from http://www.touchscreens.com/intro- touchtypes-capacitive.html generated Aug. 5, 2005.
Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip.html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2-pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint8" obtained from http://www.cirque.com/technology/technology_gp.html generated Aug. 5, 2005.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the MultiFinger USB TouchPad with Whole-Hand Gestures," obtained from http://www.fingerworks.com/igesture.html, generated Aug. 27, 2004, 2-pgs.
Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Touch Technologies Overview" 2001, 3M Touch Systems, Massachusetts.
Anonymous. "Touchscreen Technology Choices," <http://www.elotouch.com/products/detech2.asp>, downloaded Aug. 5, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Anonymous. "Op-amp Integrator Amplifier," Electronics tutorial, retrieved from http://diodetech.blogspot.nl/2013/07/op-amp-integrator.html, on Feb. 10, 2016, eight pages.
Bantz, et al. (Feb. 1979). "Keyboard Device for Upper and Lower Case Keying Without Shifting," IBM Technical Disclosure Bulletin, vol. 21, No. 9, two pages.
Baxter, L.K. (1996). *Capacitive Sensors: Design and Applications*, vol. 1 of IEEE Press Series on Electronics Technology, John Wiley & Sons: New York, NY, (Table of Contents Only) three pages.

(56) References Cited

OTHER PUBLICATIONS

Bennion, S.I. et al. (Dec. 1981). "Touch Sensitive Graphics Terminal Applied to Process Control," *Computer Graphics* 15(4):342-350.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Boie, R.A. (Mar. 1984). "Capacitive Impedance Readout Tactile Image Sensor," *Proceedings of 1984 IEEE International Conference on Robotics and Automation*, pp. 370-378.
Buxton, W.A.S. (Mar./Apr. 1994). "Combined Keyboard/Touch Tablet Input Device," *XEROX Disclosure Journal* 19 (2):109-111.
Chinese Search Report dated Feb. 2, 2015, for CN Application No. 201210568727.0, filed Jun. 8, 2007, two pages. (25098.53).
Chun, K. et al. (Jul. 1985). "A High-Performance Silicon Tactile Imager Based on a Capacitive Cell," *IEEE Transactions on Electron Devices* 32(7):1196-1201.
Cliff (Jul. 24, 2002). "Building a Pressure-Sensitive, Multi-Point TouchScreen?" Posted from the D-I-Y-Baby Department, one page.
Collberg, C. et al. (2002). "TetraTetris: A Study of Multi-User Touch-Based Interaction Using DiamondTouch," located at cs.arizona. edu, eight pages.
Dannenberg, R.B. et al. (1989). "A Gesture Based User Interface Prototyping System," *ACM*, pp. 127-132.
Davies, E.R. (Aug. 1987). "Lateral Histograms for Efficient Object Location: Speed versus Ambiguity," *Pattern Recognition Letters* 6(3):189-198.
Davies, E.R. (1990). *Machine Vision: Theory, Algorithms, Practicalities*, Academic Press, Inc..: San Diego, CA, pp. xi-xxi (Table of Contents Only.).
Davies, E.R. (1997). "Boundary Pattern Analysis," Chapter 7 in *Machine Vision: Theory, Algorithms, Practicalities*, 2nd Edition, Academic Press, Inc.: San Diego, CA, pp. 171-191.
Davies, E.R. (1997). "Ellipse Detection," Chapter 11 in *Machine Vision: Theory, Algorithms, Practicalities*, 2nd Edition, Academic Press, Inc.: San Diego, CA, pp. 271-290.
Davies, E.R. (1997). "Image Acquisition," Chapter 23 in *Machine Vision: Theory, Algorithms, Practicalities*, 2nd Edition, Academic Press, Inc.: San Diego, CA, pp. 583-601.
Diaz-Marino, R.A. et al. (2003). "Programming for Multiple Touches and Multiple Users: A Toolkit for the DiamondTouch Hardware," *Proceedings of ACM UIST'03 User Interface Software and Technology*, two pages.
Dietz, P. et al. (2001). "DiamondTouch: A Multi-User Touch Technology," *Proceedings of the 14th Annual ACM Symposium on User Interface Software and Technology*, Nov. 11-14, 2001, Orlando, FL, pp. 219-226.
Douglas et al., *The Ergonomics of Computer Pointing Devices* (1997).
Esenther, A. et al. (Nov. 2002). "DiamondTouch SDK: Support for Multi-User, Multi-Touch Applications," *Mitsubishi Electric Research Laboratories, Inc.*, five pages.
European Search Report dated Jul. 28, 2011, for EP Application No. 11159164.0, filed Jun. 8, 2007, eight pages.
European Search Report dated Oct. 21, 2011, for EP Application No. 11159166.5, filed Jun. 8, 2007, seven pages.
European Search Report dated Feb. 16, 2012, for EP Application No. 11183531.0, 11 pages.
European Search Report dated Mar. 27, 2012, for EP Application No. 10178558.2, nine pages.
European Search Report received in EP 1 621 989 (@ *Beyer Weaver & Thomas, LLP*) dated Mar. 27, 2006.
EVB Elektronik "TSOP6238 IR Receiver Modules for Infrared Remote Control Systems" dated Jan. 2004 1-pg.
Ex Parte Quayle Action dated Apr. 20, 2016, for U.S. Appl. No. 11/818,395, filed Jun. 13, 2007, four pages.
Fearing, R.S. (Jun. 1990). "Tactile Sensing Mechanisms," *The International Journal of Robotics Research* 9(3):3-23.
Final Office Action dated Jul. 6, 2010, for U.S. Appl. No. 11/760,036, filed Jun. 8, 2007, 51 pages.

Final Office Action dated Jul. 6, 2010, for U.S. Appl. No. 11/760,080, filed Jun. 8, 2007, 66 pages.
Final Office Action dated Jul. 22, 2010, for U.S. Appl. No. 11/760,049, filed Jun. 8, 2007, 52 pages.
Final Office Action dated Aug. 2, 2010, for U.S. Appl. No. 11/760,060, filed Jun. 8, 2007, 78 pages.
Final Office Action dated Sep. 1, 2011, for U.S. Appl. No. 11/650,203, filed Jan. 3, 2007, nine pages.
Final Office Action dated Oct. 17, 2011, for U.S. Appl. No. 11/818,395, filed Jun. 13, 2007, 16 pages.
Final Office Action dated Dec. 16, 2011, for U.S. Appl. No. 11/760,036, filed Jun. 8, 2007, 53 pages.
Final Office Action dated Jan. 30, 2012, for U.S. Appl. No. 11/760,049, filed Jun. 8, 2007, 64 pages.
Final Office Action dated Feb. 27, 2012, for U.S. Appl. No. 11/760,080, filed Jun. 8, 2007, 62 pages.
Final Office Action dated May 9, 2013, for U.S. Appl. No. 12/976,997 filed Dec. 22, 2010, 7 pages.
Final Office Action dated Oct. 27, 2014, for U.S. Appl. No. 11/818,395, filed Jun. 13, 2007, 17 pages.
Final Office Action dated Feb. 8, 2016, for U.S. Appl. No. 14/670,306, filed Mar. 26, 2015, five pages.
Fisher et al., "Repetitive Motion Disorders: The Design of Optimal Rate-Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," In CHI 2001 Summary, pp. 121-122, 2001.
Hardy, "Fingerworks" Mar. 7, 2002; BBC World On Line.
Hector, J. et al. (May 2002). "Low Power Driving Options for an AMLCD Mobile Display Chipset," Chapter 16.3 in *SID 02 Digest* (2002 SID International Symposium, Digest of Technical Papers), XXXIII(II):694-697.
Hillier and Gerald J. Lieberman, *Introduction to Operations Research* (1986).
Hinckley, K. et al. (1998). "Interaction and Modeling Techniques for Desktop Two-Handed Input," *Proceedings of ACM USIT'98 Symposium on User Interface Software and Technology*, pp. 49-58.
Hinckley, K. et al. (May 1999). "Touch-Sensing Input Devices," *CHI 99* pp. 223-230.
Hinckley, K. et al. (2000). "Sensing Techniques for Mobile Interaction," *CHI Letters* 2(2):91-100.
Hlady, A.M. (1969). "A Touch Sensitive X-Y Position Encoder for Computer Input," *Fall Joint Computer Conference*, pp. 545-551.
International Search Report dated Mar. 3, 2006 (PCT/US 05/03325; 119-0052W0).
International search report for International Application No. PCT/US2005/014364 dated Jan. 12, 2005.
International Search Report dated Mar. 6, 2008, for PCT Application No. PCT/2007/70733, filed Jun. 8, 2007, five pages.
International Search Report dated Mar. 7, 2008, for PCT Application No. PCT/2007/70722, filed Jun. 8, 2007, three pages.
International Search Report dated Jun. 24, 2008, for PCT Application No. PCT/US2007/026298, filed Dec. 21, 2007, two pages.
International Search Report dated Jul. 18, 2008, for PCT Application No. PCT/2007/70725, filed Jun. 8, 2007, six pages.
International Search Report dated Jul. 18, 2008, for PCT Application No. PCT/2007/70729, filed Jun. 8, 2007, five pages.
International Search Report dated Oct. 16, 2008, for PCT Application No. PCT/US2007/088749, filed Dec. 21, 2007, four pages.
International Search Report dated Jun. 15, 2012, for PCT/US2011/064455, filed Dec. 12, 2011, four pages.
International Search Report received in corresponding PCT application No. PCT/US2006/008349 dated Oct. 6, 2006.
Jacob et al., "Integrality and Separability of Input Devices," *ACM Transactions on Computer-Human Interaction*, 1:3-26 (Mar. 1994).
Kanda, E. et al. (2008). "55.2: Integrated Active Matrix Capacitive Sensors for Touch Panel LTPS-TFT LCDs," *SID 08 Digest*, pp. 834-837.
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.

(56) References Cited

OTHER PUBLICATIONS

Kirk, D.E. (1970). "Numerical Determination of Optimal Trajectories," Chapter 6 in *Optimal Control Theory: An Introduction*, Prentice Hall, Inc.: Englewood Cliffs, NY. pp. 329-413, with Table of Contents, pp. vii-ix. (90 pages total).

Kling, M. et al. (Sep. 2003). "Interface Design: LCD Touch Interface for ETRAX 100LX," Thesis Submitted in Partial Fulfillment of the Requirements for the Degree of Master of Science, UMEA University, Umea, Sweden, 79 pages.

Ko, H. (Jul. 2000). "Open Systems Advanced Workstation Transition Report," Technical Report 1822, *U.S. Navy*, SSC San Diego, CA, 82 pages.

Krein, P. et al. (May/Jun. 1990). "The Electroquasistatics of the Capacitive Touch Panel," *IEEE Transactions on Industry Applications* 26(3):529-534.

Krueger, M. et al. (Jun. 10, 1988). "Videoplace, Responsive Environment, 1972-1990," located at http://www.youtube.com/watch?v=dmmxVA5xhuo, last visited Aug. 5, 2011, two pages.

Lee, "A Fast Multiple-Touch-Sensitive Input Device," Master's Thesis, University of Toronto (1984).

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Leeper A.K. (May 21, 2002). "Integration of a clear capacitive touch screen with a 1/8-VGA FSTN-LCD to form and LCD based touchpad," Synaptics Inc., society for information display, 3 pages.

Leigh, J. et al. (2002). "Amplified Collaboration Environments," *VizGrid Symposium*, Nov. 2002, Tokyo, Japan, nine pages.

Ljungstrand, P. et al. eds. (2002). UBICOMP2002, Adjunct Proceedings, *4th International Conference on Ubiquitous Computing*, Sep. 29-Oct. 1, 2002, Goteborg, Sweden, 90 pages.

Magerkurth, C. et al. (2004). "Towards the Next Generation of Tabletop Gaming Experiences," *Graphics Interface 2004 (GI'04)*, May 17-19, 2004, Ontario, Canada, pp. 1-8.

Malik, S. et al. (2004). "Visual Touchpad: A Two-Handed Gestural Input Device," *ICMI'04 Proceedings of the 6th International Conference on Multimodal Intercases*, ACM, 8 pages.

Matsushita et al., "HoloWall: Designing a Finger, Hand, Body and Object Sensitive Wall," In Proceedings of UIST '97, Oct. 1997.

Matsushita, N. et al. (2000). "Dual Touch: A Two-Handed Interface for Pen-Based PDAs," *CHI Letters* 2(2):211-212.

McMillan, G.R. (Oct. 1998). "The Technology and Applications of Gesture-Based Control," *presented at the RTO Lecture Series on Alternative Control Technologies: Human Factor Issues*, Oct. 14-15, 1998, Ohio, USA, pp. 4-1-4-11.

Mehta, N. et al. (May 1982). "Feature Extraction as a Tool for Computer Input," *Proceedings of ICASSP '82*, May 3-5, 1982, Paris, France, pp. 818-820.

Mitchell, G. D. (Oct. 2003). "Orientation on Tabletop Displays," Thesis Submitted in Partial Fulfillment of the Requirements for the Degree of Master of Science, Simon Fraser University, 119 pages.

Noda, K. et al. (2001). "Production of Transparent Conductive Films with Inserted $SiO_2$ Anchor Layer, and Application to a Resistive Touch Panel," *Electronics and Communications in Japan* Part 2 84(7):39-45.

Non-Final Office Action dated May 14, 2008, for U.S. Appl. No. 10/840,862, filed May 6, 2004, six pages.

Non-Final Office Action dated Dec. 24, 2008, for U.S. Appl. No. 10/840,862, filed May 6, 2004, nine pages.

Non-Final Office Action dated Jun. 2, 2009, for U.S. Appl. No. 10/840,862, filed May 6, 2004, seven pages.

Non-Final Office Action dated Nov. 12, 2009, for U.S. Appl. No. 10/840,862, filed May 6, 2004, eight pages.

Non-Final Office Action dated Mar. 12, 2010, for U.S. Appl. No. 11/760,080, filed Jun. 8, 2007, 31 pages.

Non-Final Office Action dated Apr. 22, 2010, for U.S. Appl. No. 11/760,036, filed Jun. 8, 2007, 37 pages.

Non-Final Office Action dated Apr. 23, 2010, for U.S. Appl. No. 11/760,060, filed Jun. 8, 2007, 66 pages.

Non-Final Office Action dated May 5, 2010, for U.S. Appl. No. 11/760,049, filed Jun. 8, 2007, 65 pages.

Non-Final Office Action dated Jun. 21, 2010, for U.S. Appl. No. 11/650,203, filed Jan. 3, 2007, eight pages.

Non-Final Office Action dated Jan. 25, 2011, for U.S. Appl. No. 11/818,395, filed Jun. 13, 2007, 31 pages.

Non-Final Office Action dated Mar. 14, 2011, for U.S. Appl. No. 11/650,203, filed Jan. 3, 2007, nine pages.

Non-Final Office Action dated May 13, 2011, for U.S. Appl. No. 12/267,540, filed Nov. 7, 2008, seven pages.

Non-Final Office Action dated Jul. 8, 2011, for U.S. Appl. No. 12/267,532, filed Nov. 7, 2008, five pages.

Non-Final Office Action dated Jul. 14, 2011, for U.S. Appl. No. 12/267,522, filed Nov. 7, 2008, six pages.

Non-Final Office Action dated Aug. 4, 2011, for U.S. Appl. No. 11/760,036, filed Jun. 8, 2007, 45 pages.

Non-Final Office Action dated Aug. 11, 2011, for U.S. Appl. No. 11/760,049, filed Jun. 8, 2007, 60 pages.

Non-Final Office Action dated Sep. 1, 2011, for U.S. Appl. No. 11/760,060, filed Jun. 8, 2007, 76 pages.

Non-Final Office Action dated Nov. 14, 2011, for U.S. Appl. No. 11/760,080, filed Jun. 8, 2007, 60 pages.

Non-Final Office Action dated Feb. 17, 2012, for U.S. Appl. No. 13/251,099, filed Sep. 30, 2011, seven pages.

Non-Final Office Action dated Jun. 20, 2012, for U.S. Appl. No. 13/345,347, filed Jan. 6, 2012, five pages.

Non-Final Office Action dated Sep. 12, 2012, for U.S. Appl. No. 11/650,203, filed Jan. 3, 2007, nine pages.

Non-Final Office Action dated Oct. 5, 2012, for U.S. Appl. No. 12/976,997, filed Dec. 22, 2010, 6 pages.

Non-Final Office Action dated Mar. 29, 2013, for U.S. Appl. No. 13/717,573, filed Dec. 17, 2012, five pages.

Non-Final Office Action dated May 30, 2013, for U.S. Appl. No. 13/251,099, filed Sep. 30, 2011, seven pages.

Non-Final Office Action dated Jun. 27, 2013, for U.S. Appl. No. 11/760,080, filed Jun. 8, 2007, 48 pages.

Non-Final Office Action dated Dec. 24, 2013, for Ex Parte Reexamination of U.S. Pat. No. 7,663,607, 52 pages.

Non-Final Office Action dated Dec. 30, 2013, for U.S. Appl. No. 12/976,997, filed Dec. 22, 2010, six pages.

Non-Final Office Action dated May 16, 2014, for Ex Parte Reexamination of U.S. Pat. No. 7,663,607, 34 pages.

Non-Final Office Action dated Jul. 14, 2014, for U.S. Appl. No. 14/308,595, filed Jun. 18, 2014, five pages.

Non-Final Office Action dated Mar. 25, 2014, for U.S. Appl. No. 14/073,818, filed Nov. 6, 2013, six pages.

Non-Final Office Action dated Apr. 18, 2014, for U.S. Appl. No. 11/818,395, filed Jun. 13, 2007, 17 pages.

Non-Final Office Action dated Aug. 4, 2014, for U.S. Appl. No. 14/086,877 filed Nov. 21, 2013, 8 pages.

Non-Final Office Action dated Sep. 26, 2014, for U.S. Appl. No. 14/308,646, filed Jun. 18, 2013, five pages.

Non-Final Office Action dated Jan. 30, 2015, for U.S. Appl. No. 14/047,960, filed Oct. 7, 2013, 18 pages.

Non-Final Office Action dated May 7, 2015, for U.S. Appl. No. 14/174,760, filed Feb. 6, 2014, 27 pages.

Non-Final Office Action dated May 12, 2015, for U.S. Appl. No. 14/670,306, filed Mar. 26, 2015, five pages.

Non-Final Office Action dated Sep. 10, 2015, for U.S. Appl. No. 11/818,395, filed Jun. 13, 2007, 17 pages.

Non-Final Office Action dated Oct. 8, 2015, for U.S. Appl. No. 14/670,306, filed Mar. 26, 2015, four pages.

Notice of Allowability (Corrected) dated Jun. 27, 2014, for U.S. Appl. No. 12/976,997, filed Dec. 22, 2010, five pages.

Notice of Allowability (Corrected) dated Jan. 21, 2015, for U.S. Appl. No. 14/308,646, filed Jun. 18, 2014, five pages.

Notice of Allowance dated Apr. 27, 2012, for U.S. Appl. No. 11/760,036, filed Jun. 8, 2007, eight pages.

Notice of Allowance dated Oct. 25, 2011, for U.S. Appl. No. 12/267,540, filed Nov. 7, 2008, seven pages.

Notice of Allowance dated Mar. 27, 2012, for U.S. Appl. No. 11/760,060, filed Jun. 8, 2007, 17 pages.

(56) References Cited

OTHER PUBLICATIONS

Notice of Allowance dated Jul. 12, 2012, for U.S. Appl. No. 13/251,099, filed Sep. 30, 2011, seven pages.
Notice of Allowance dated Sep. 19, 2012, for U.S. Appl. No. 13/345,347, filed Jan. 6, 2012, seven pages.
Notice of Allowance dated Oct. 29, 2012, for U.S. Appl. No. 13/345,347, filed Jan. 6, 2012, eight pages.
Notice of Allowance dated Feb. 6, 2013, for U.S. Appl. No. 13/084,402, filed Apr. 11, 2011, 12 pages.
Notice of Allowance dated Feb. 19, 2013, for U.S. Appl. No. 13/538,498, filed Jun. 29, 2012, 16 pages.
Notice of Allowance dated Apr. 26, 2013, for U.S. Appl. No. 11/650,203, filed Jan. 3, 2007, 8 pages.
Notice of Allowance dated May 28, 2013, for U.S. Appl. No. 11/760,049, filed Jun. 8, 2007, 10 pages.
Notice of Allowance dated Jul. 19, 2013, for U.S. Appl. No. 13/717,573, filed Dec. 17, 2012, 9 pages.
Notice of Allowance dated Oct. 10, 2013, for U.S. Appl. No. 11/760,080, filed Jun. 8, 2007, 10 pages.
Notice of Allowance dated Mar. 3, 2014, for U.S. Appl. No. 13/251,099, filed Sep. 30, 2011, eight pages.
Notice of Allowance dated Apr. 14, 2014, for U.S. Appl. No. 12/976,997, filed Dec. 22, 2010, 8 pages.
Notice of Allowance dated Jul. 14, 2014, for U.S. Appl. No. 14/073,818, filed Nov. 6, 2013, seven pages.
Notice of Allowance dated Oct. 31, 2014, for U.S. Appl. No. 14/308,595, filed Jun. 18, 2014, eight pages.
Notice of Allowance dated Nov. 6, 2014, for U.S. Appl. No. 14/308,646, filed Jun. 18, 2014, eight pages.
Notice of Allowance dated Dec. 23, 2014, for U.S. Appl. No. 14/456,831, filed Aug. 11, 2014, eight pages.
Notice of Allowance dated Jan. 14, 2015, for U.S. Appl. No. 14/086,877, filed Nov. 21, 2013, eight pages.
Notice of Allowance dated May 28, 2015, for U.S. Appl. No. 14/666,174, filed Mar. 23, 2015, eight pages.
Notice of Allowance dated Jun. 29, 2015, for U.S. Appl. No. 14/047,960, filed Oct. 7, 2013, 11 pages. (98.11).
Notice of Allowance (corrected) dated Jul. 2, 2015, for U.S. Appl. No. 14/666,174, filed Mar. 23, 2015, five pages.
Notice of Allowance dated Sep. 14, 2015, for U.S. Appl. No. 14/174,760, filed Feb. 6, 2014, 12 pages.
Notice of Allowance dated Oct. 19, 2015, for U.S. Appl. No. 14/047,960, filed Oct. 7, 2013, eight pages.
Notice of Allowance dated May 25, 2016, for U.S. Appl. No. 14/670,306, filed Mar. 26, 2015, eight pages.
Notice of Prior and Concurrent Proceedings under 37 C.F.R. § 1.565(a) for U.S. Ex Parte Reexamination Control No. 90/012,935, filed Jul. 30, 2013 (Reexamination of U.S. Pat. No. 7,663,607), 279 pages. (submitted in four parts).
Ogawa, H. et al. (1979). "Preprocessing for Chinese Character Recognition and Global Classification of Handwritten Chinese Characters," *Pattern Recognition* 11:1-7.
Partial European Search Report dated Mar. 15, 2011, for EP Application No. 10178661.4, filed Jun. 8, 2007, six pages.
Partial European Search Report dated Oct. 21, 2011, for EP Application No. 11159165.7 filed Jun. 8, 2007, seven pages.
Partial European Search Report dated Oct. 24, 2011, for EP Application No. 11159167.3 filed Jun. 8, 2007, eight pages.
Phipps, C.A. (Spring 2003). "A Metric to Measure Whole Keyboard Index of Difficulty Based on Fitts' Law," A Dissertation Submitted in Partial Fulfillment of the Requirements for the Degree of Ph.D., 103 pages.
Quantum Research Group "QT510 / Qwhel$^{TM}$ Touch Slider IC" copyright 2004-2005, 14-pgs.
Quantum Research Group Ltd.(1997). QT9701B2 Datasheet, 30 pages.
Quantum Research Group Ltd. (1999). QProx™ QT60320 32-Key Qmatrix™ Charge-Transfer IC Datasheet, pp. 1-14.
Quantum Research Group Ltd. (2001). QT60325, QT60485, QT60645 32, 48, 64 Key QMatrix™ Keypanel Sensor Ics Datasheet, 42 pages.
Quantum Research Group Ltd. (2002). QMatrix™ QT60040 4-Key Charge-Transfer IC Datasheet, pp. 1-9.
Quantum Research Group Ltd. (Oct. 10, 2002). Quantum Research Application Note An-KD01: Qmatrix™ Panel Design Guidelines, four pages.
Quek, "Unencumbered Gestural Interaction," *IEEE Multimedia*, 3:36-47 (Winter 1996).
Rabuffetti, M. (2002). "Touch-screen System for Assessing Visuo-motor Exploratory Skills in Neuropsychological Disorders of Spatial Cognition," *Medical & Biological Engineering & Computing* 40:675-686.
Radwin, "Activation Force and Travel Effects on Overexertion in Repetitive Key Tapping," *Human Factors*, 39(1):130-140 (Mar. 1997).
Raisamo, R. (Dec. 7, 1999). "Multimodal Human-Computer Interaction: A Constructive and Empirical Study," Dissertation, University of Tampere, Finland, 86 pages.
Rekimoto et al., "ToolStone: Effective Use of the Physical Manipulation Vocabularies of Input Devices," In Proc. Of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rekimoto, J. et al. (2003). "Pre-Sense: Interaction Techniques for Finger Sensing Input Devices," *CHI Letters* 5(2):203-212.
Request for Ex Parte Reexamination of U.S. Pat. No. 7,663,607, 106 pages.
Response to Non-Final Office Action in Ex Parte Reexamination dated Mar. 24, 2014, of U.S. Pat. No. 7,663,607, 392 pages. (28042.00) (Submitted in two parts).
Rong, J. et al. (2002). "AIAA 2002-4553: Hierarchical Agent Based System for General Aviation CD&R Under Free Flight," *AIAA Guidance, Navigation, and Control Conference and Exhibit*, Aug. 5-8, 2002, Monterey, CA, pp. 1-11.
Rubine et al., "Programmable Finger-Tracking Instrument Controllers," *Computer Music Journal*, vol. 14, No. 1 (Spring 1990).
Rubine, D. (Jul. 1991). "Specifying Gestures by Example," *Computer Graphics* 25(4):329-337.
Rubine, D. et al. (1988). "The VideoHarp," *Proceedings of the 14$^{th}$ International Computer Music Conference*, Cologne, W. Germany, Sep. 20-25, 1988, pp. 49-55.
Rubine, D. et al. (1991). "The Videoharp: An Optical Scanning MIDI Controller," *Contemporary Music Review* 6(1):31-46.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Russell, D.M. et al. (2004). "The Use Patterns of Large, Interactive Display Surfaces: Case Studies of Media Design and use for BlueBoard and MERBoard," *Proceedings of the 37$^{th}$ Hawaii International Conference on System Sciences 2004, IEEE*, pp. 1-10.
Rutledge et al., "Force-To-Motion Functions for Pointing," Human-Computer Interaction—Interact (1990).
Sears, A. (Mar. 11, 1991). "Improving Touchscreen Keyboards: Design Issues and a Comparison with Other Devices," *Human-Computer Interaction Laboratory*, pp. 1-19.
Sears, A. et al. (Jun. 1990). "A New Era for High-Precision Touchscreens," *Advances in Human-Computer Interaction*, vol. 3, Tech Report HCIL-90-01, one page only.
Segen, J. et al. (1998). "Human-Computer Interaction Using Gesture Recognition and 3D Hand Tracking," *IEEE*, pp. 188-192.
Shen, C. et al. (Jan. 2004). "DiamondSpin: An Extensible Toolkit for Around-the-Table Interaction," *CHI 2004*, Apr. 24-29, 2004, Vienna, Austria, 10 pgs.
Siegel, D.M. et al. (1987). "Performance Analysis of a Tactile Sensor," *IEEE*, pp. 1493-1499.
Singapore Examination Report dated Jan. 11, 2010, for SG Patent Application No. 0607116-1, five pages.

(56) References Cited

OTHER PUBLICATIONS

Son, J.S. et al. (1996). "Comparison of Contact Sensor Localization Abilities During Manipulation," *Robotics and Autonomous System 17* pp. 217-233.
Stansfield, S.A. (Mar. 1990). "Haptic Perception With an Articulated, Sensate Robot Hand," *SANDIA Report*: SAND90-0085-UC-406, 37 pages.
Stauffer, R.N. ed. (Jun. 1983). "Progress in Tactile Sensor Development," *Robotics Today* pp. 43-49.
Stumpe, B. (Mar. 16, 1977). "A New Principle for an X-Y Touch Screen," *CERN*, 19 pages.
Stumpe, B. (Feb. 6, 1978). "Experiments to Find a Manufacturing Process for an X-Y Touch Screen: Report on a Visit to Polymer-Physik GmbH," *CERN*, five pages.
Subatai Ahmad, "A Usable Real-Time 3D Hand Tracker," Proceedings of the 28$^{th}$ Asilomar Conference on Signals, Systems and Computers—Part 2 (of2), vol. 2 (Oct. 1994).
Sugiyama, S. et al. (Mar. 1990). "Tactile Image Detection Using a 1k-element Silicon Pressure Sensor Array," *Sensors and Actuators* A21-A23(1-3):397-400.
Suzuki, K. et al. (Aug. 1990). "A 1024-Element High-Performance Silicon Tactile Imager," *IEEE Transactions on Electron Devices* 37(8):1852-1860.
Texas Instruments "TSC2003 / I2C Touch Screen Controller" Data Sheet SBAS 162, dated Oct. 2001, 20-pgs.
TW Search Report dated Jun. 27, 2011, for TW Patent Application No. 097100481, one page.
TW Search Report dated Feb. 21, 2014, for TW Patent Application No. 100145112, with English translation, two pages.
TW Search Report dated Dec. 17, 2015, for TW Patent Application No. 103130159, one page.
U.S. Appl. No. 60/072,509, filed Jan. 26, 1998, by Westerman et al. (copy not attached).
U.S. Appl. No. 60/333,770, filed Nov. 29, 2001, by Perski et al. (copy not attached).
U.S. Appl. No. 60/406,662, filed Aug. 29, 2002, filed by Morag et al. (copy not attached.).
U.S. Appl. No. 60/501,484, filed Sep. 5, 2003, by Perski et al. (copy not attached).
Van Kleek, M. (Feb. 2003). "Intelligent Environments for Informal Public Spaces: The Ki/o Kiosk Platform," Thesis Submitted in Partial Fulfillment of the Requirements for the Degree of Master of Engineering, MIT, 108 pages.
Van Oversteegen, B.G.F.A.W. (Apr. 10, 1998). "Touch Screen Based Measuring Equipment: Design and Implementation," Master's Thesis, Submitted to Technische Universiteit, Eindhoven, The Nederlands, 103 pages.
Vazquez, A.A. (Sep. 1990). "Touch Screen Use on Flight Simulator Instructor/Operator Stations," Thesis Submitted in Partial Fulfillment of the Requirements for the Degree of Master of Science in Information Systems, 78 pages.
Vernier, F. et al. (2002). "Multi-User, Multi-Finger Drag & Drop of Multiple Documents," located at http://www.edgelab.ca/CSCW/Workshop2002/fred_vernier, three pages.
Wacom Company Limited. (Nov. 12, 2003). Wacom intuos® 2 User's Manual for Windows®, English V4.1, 165 pages.
Wallergard, M. (2003). "Designing Virtual Environments for Brain Injury Rehabilitation," Thesis, Lund University, Sweden, 98 pages.
Wellner, "The Digital Desk Calculators: Tangible Manipulation on a Desk Top Display" In ACM UIST '91 Proceedings, pp. 27-34, Nov. 1991.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Westerman, W. et al. (2001). "Multi-Touch: A New Tactile 2-D Gesture Interface for Human-Computer Interaction," *Proceedings of the Human Factors and Ergonomics Societ 45$^{th}$ Annual Meeting*, pp. 632-636.
Williams, "Applications for a Switched-Capacitor Instrumentation Building Block" Linear Technology Application Note 3, Jul. 1985, pp. 1-16.
Wu, M. et al. (2003). "Multi-Finger and Whole Hand Gestural Interaction Techniques for Multi-User Tabletop Displays," *ACM* pp. 193-202.
Yamada et al., "A Switched-Capacitor Interface for Capacitive Pressure Sensors" IEEE Transactions on Instrumentation and Measurement, vol. 41, No. 1, Feb. 1992, pp. 81-86.
Yee, K.-P. (2004). "Two-Handed Interaction on a Tablet Display," CHI'04, pp. 1493-1496.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
European Search Report dated Nov. 7, 2017, for EP Application No. 17182184.6, eight pages.
Non-Final Office Action dated Nov. 7, 2017, for U.S. Appl. No. 15/593,182, filed May 11, 2017, 15 pages.
European Partial Search Report dated Mar. 13, 2017, for EP Application No. 11194616.6, filed Dec. 20, 2011, 6 pges.
Notice of Allowance dated Mar. 13, 2017, for U.S. Appl. No. 11/818,395, filed Jun. 13, 2007, 13 pages.
Notice of Allowance dated May 3, 2017, for U.S. Appl. No. 14/838,234, filed Aug. 27, 2015, ten pages.
Non-Final Office Action dated Jul. 26, 2018, for U.S. Appl. No. 15/273,487, filed Sep. 22, 2016, 23 pages.
Non-Final Office Action dated Mar. 31, 2017, for U.S. Appl. No. 15/273,487, filed Sep. 22, 2016, 24 pages.
Non-Final Office Action dated Feb. 23, 2018, for U.S. Appl. No. 15/424,712, filed Feb. 3, 2017, 25 pages.
Notice of Allowance dated Mar. 21, 2018, for U.S. Appl. No. 15/273,487, filed Sep. 22, 2016, eight pages.
Notice of Allowance dated Sep. 28, 2016, for U.S. Appl. No. 14/985,283, filed Dec. 30, 2015, ten pages.
Final Office Action dated Aug. 8, 2018, for U.S. Appl. No. 15/593,182, filed May 11, 2017, 17 pages.
Notice of Allowance dated Sep. 14, 2018, for U.S. Appl. No. 15/424,712, filed Feb. 3, 2017, ten pages.
Final Office Action dated Aug. 23, 2017, for U.S. Appl. No. 15/273,487, filed Sep. 22, 2016, 36 pages.
Chinese Search Report dated Oct. 10, 2018, for CN Application No. 201610615835.7, filed Dec. 21, 2007, two pages.
Notice of Allowance (corrected) dated Sep. 27, 2018, for U.S. Appl. No. 15/424,712, filed Feb. 3, 2017, seven pages.
Notice of Allowance dated Feb. 20, 2019, for U.S. Appl. No. 15/273,487, filed Sep. 22, 2016, nine pages.

\* cited by examiner

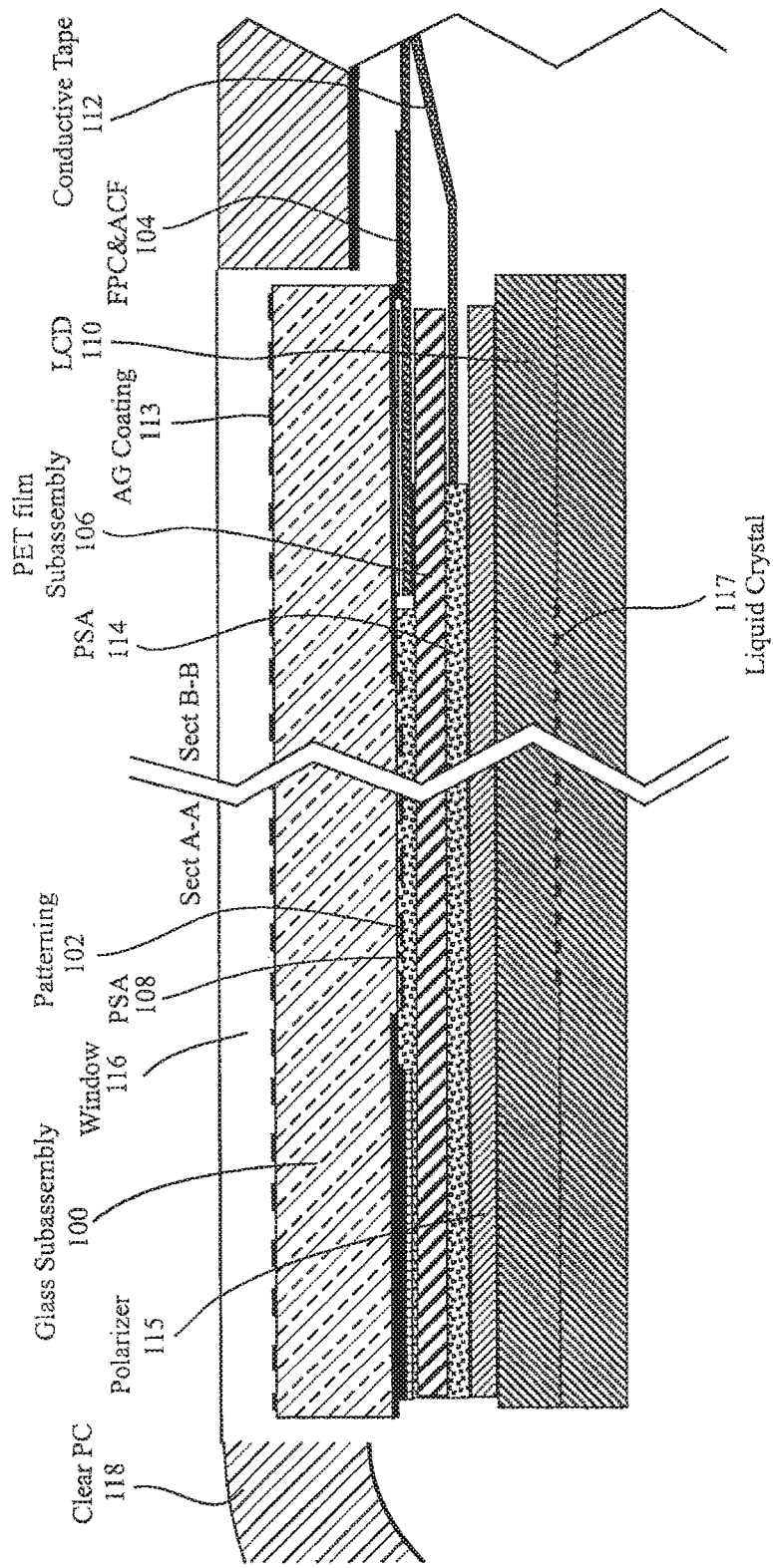
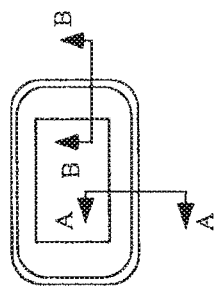
Fig. 1A

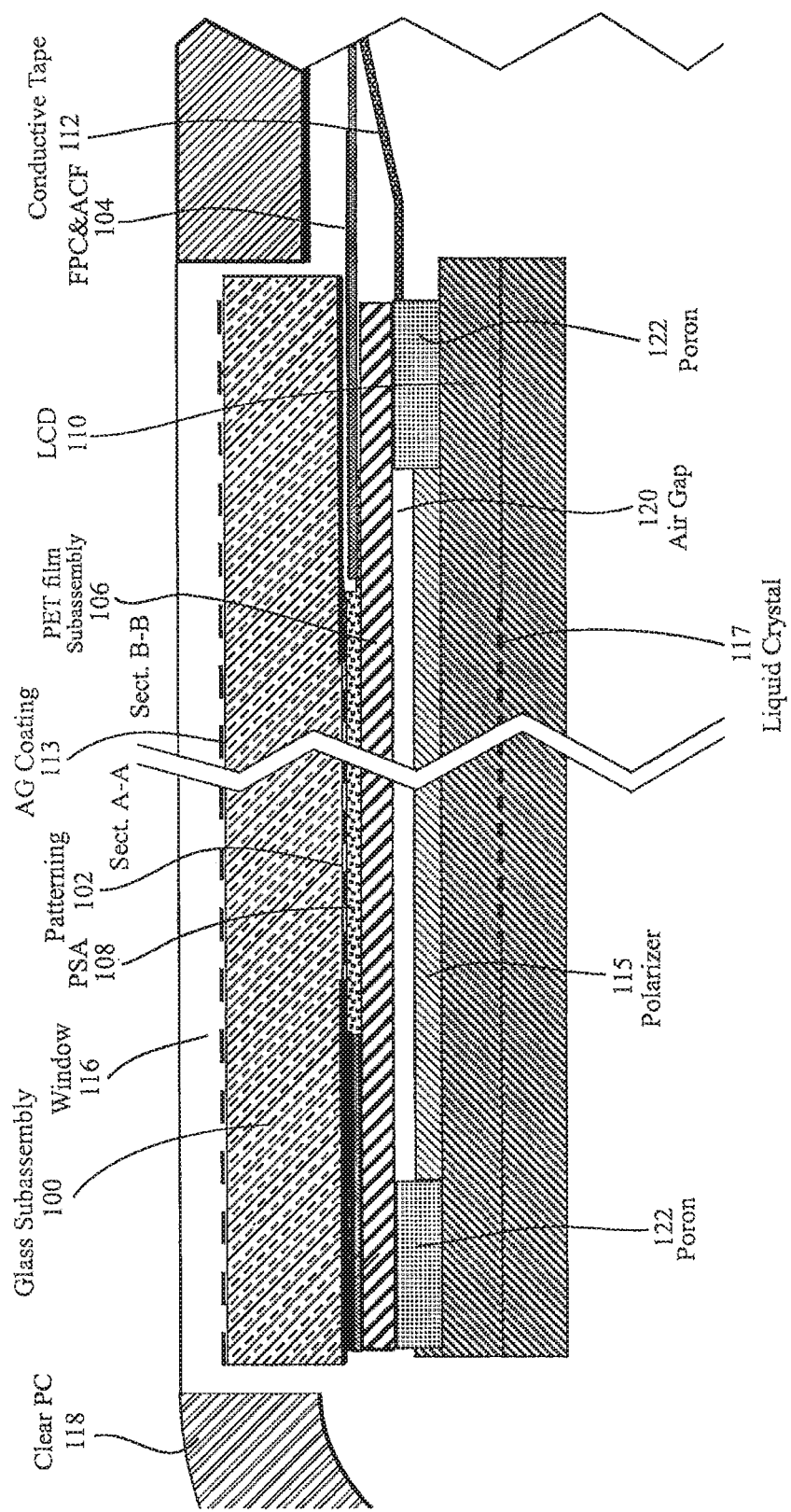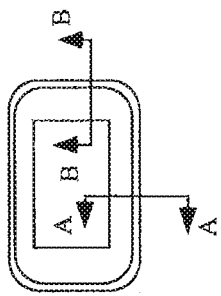
Fig. 1B

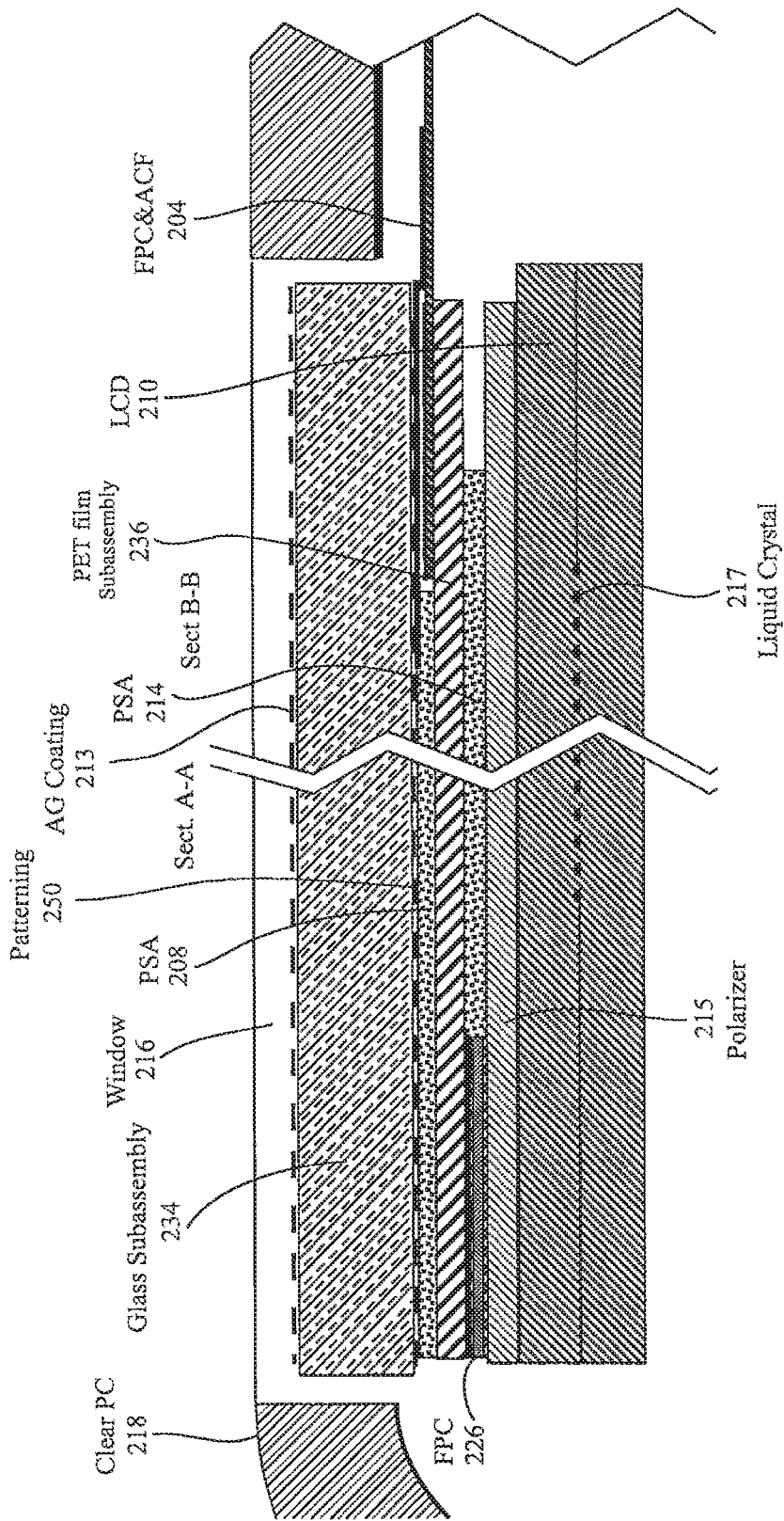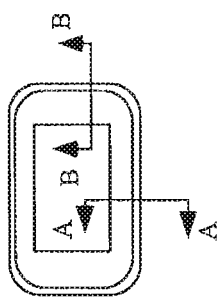
Fig. 2A

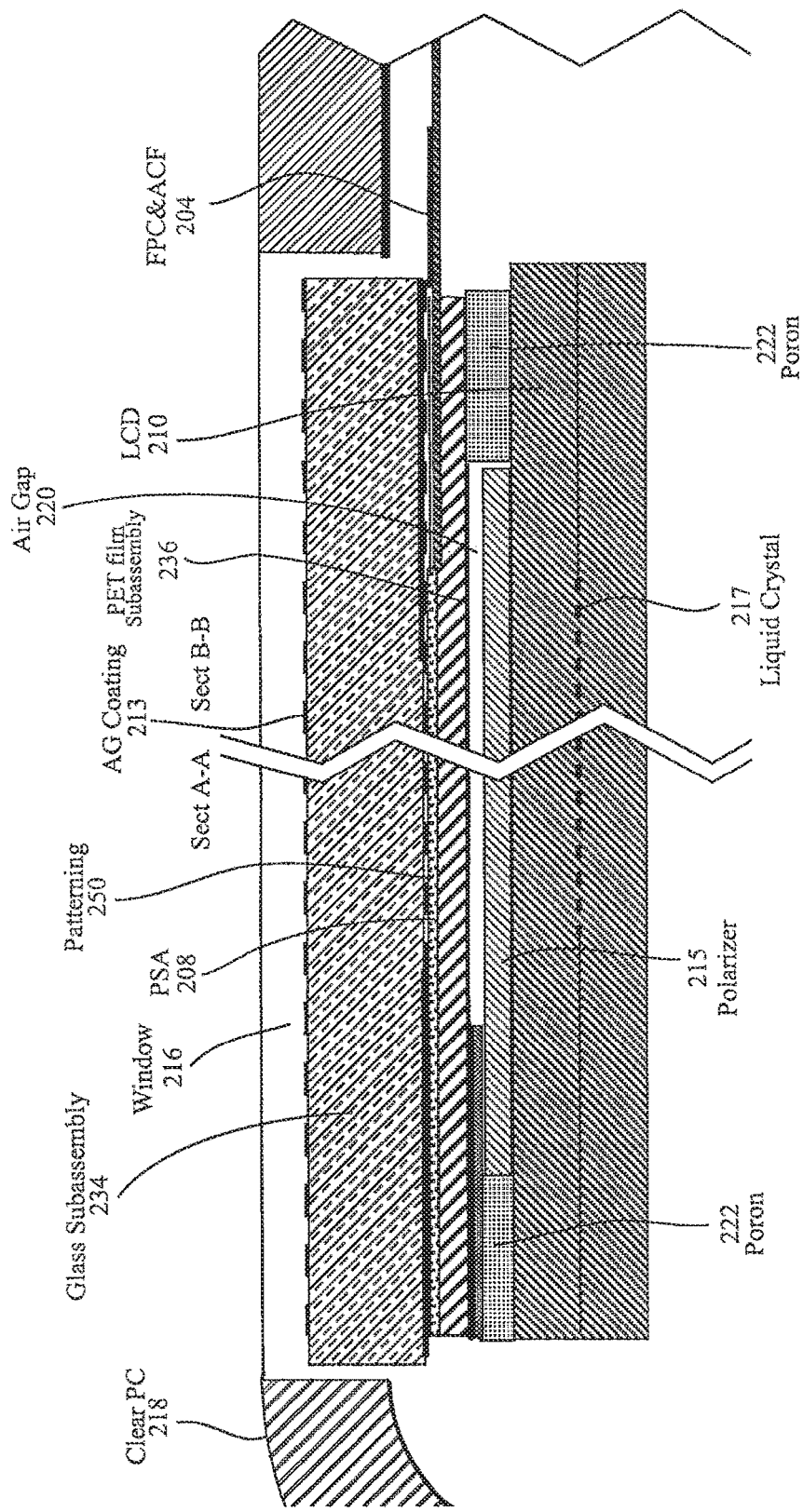
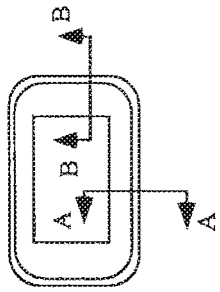
Fig. 2B

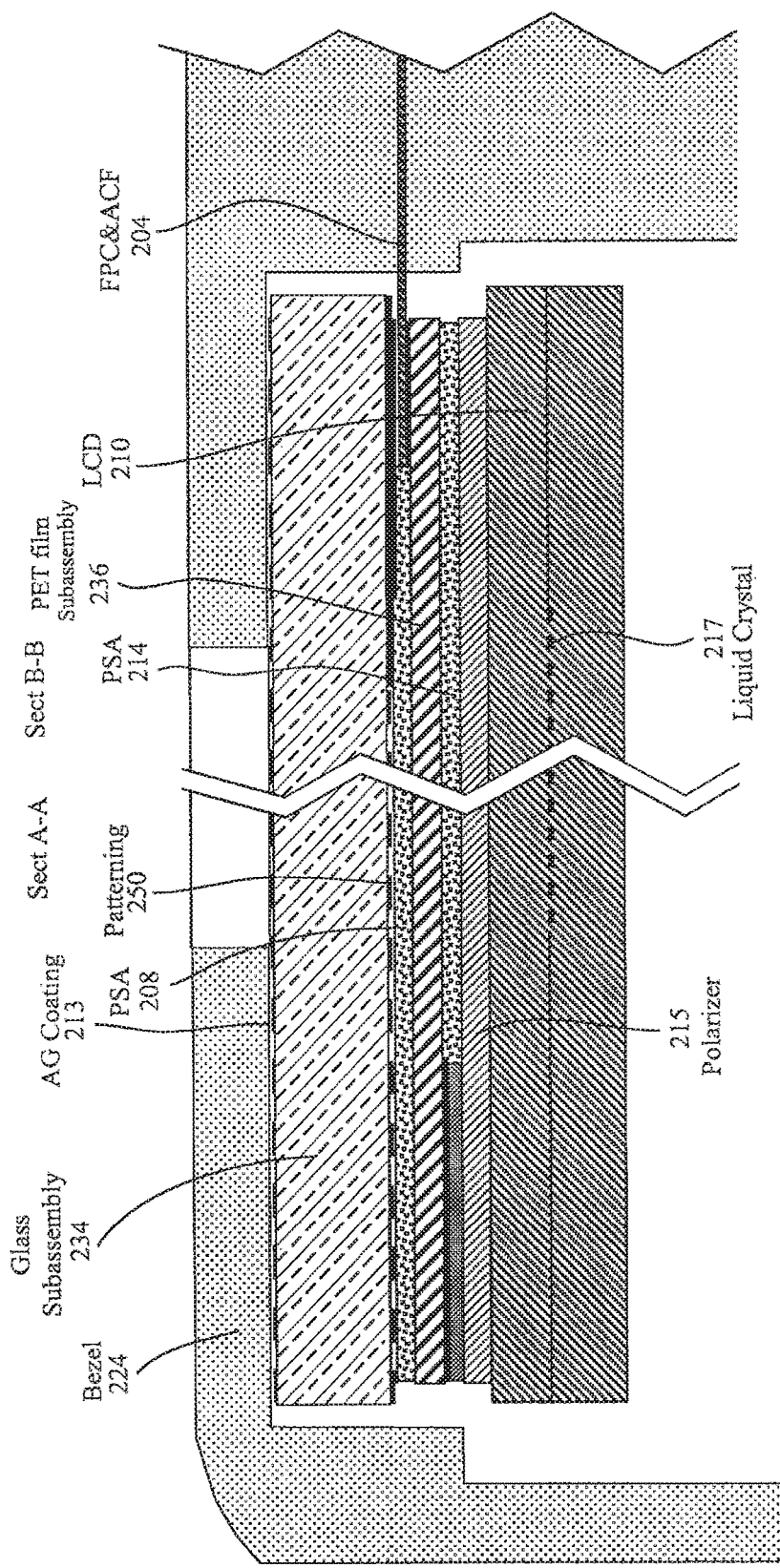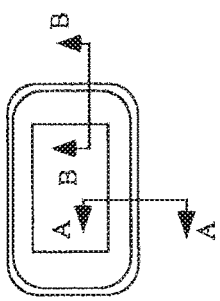
Fig. 2D

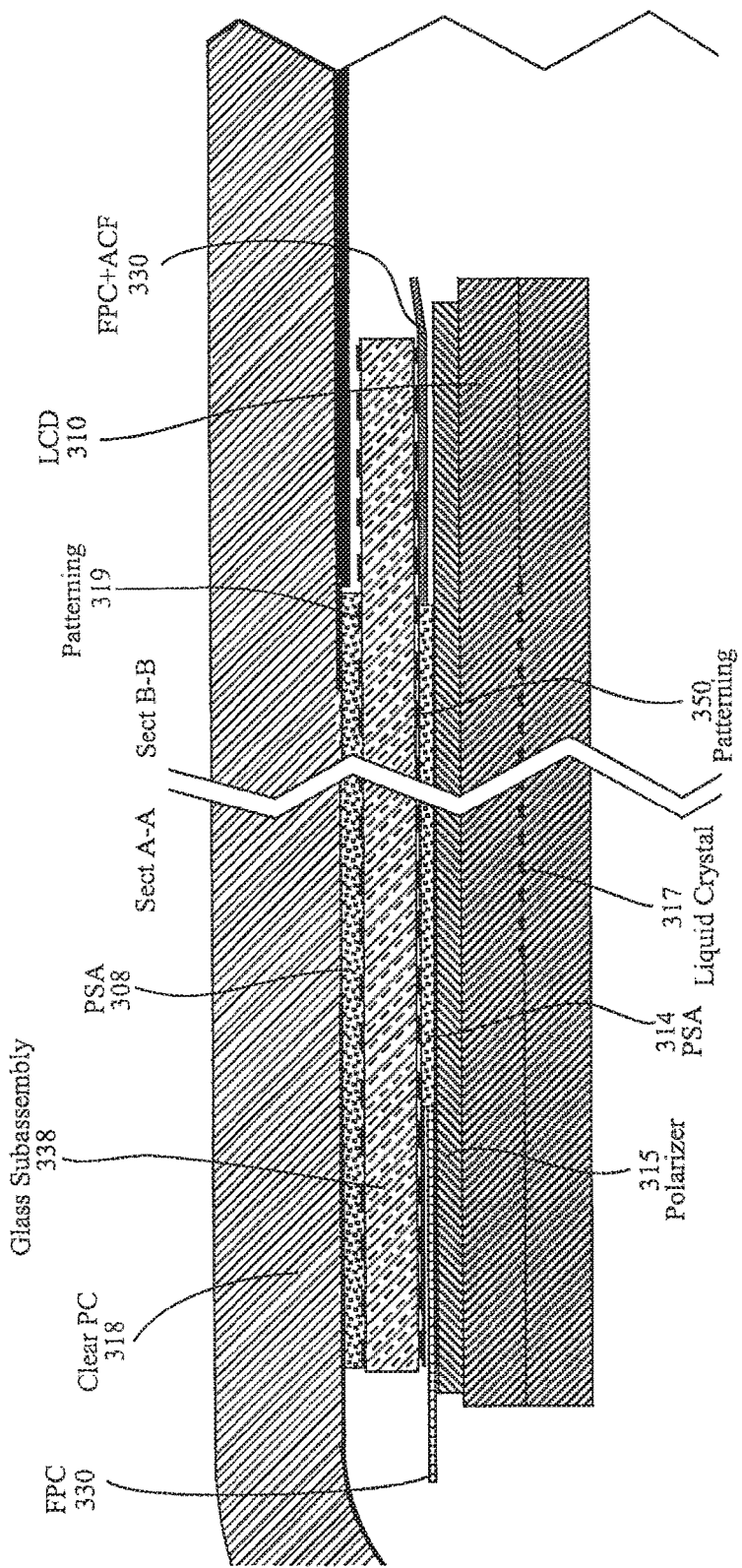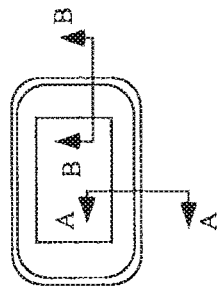
Fig. 3A

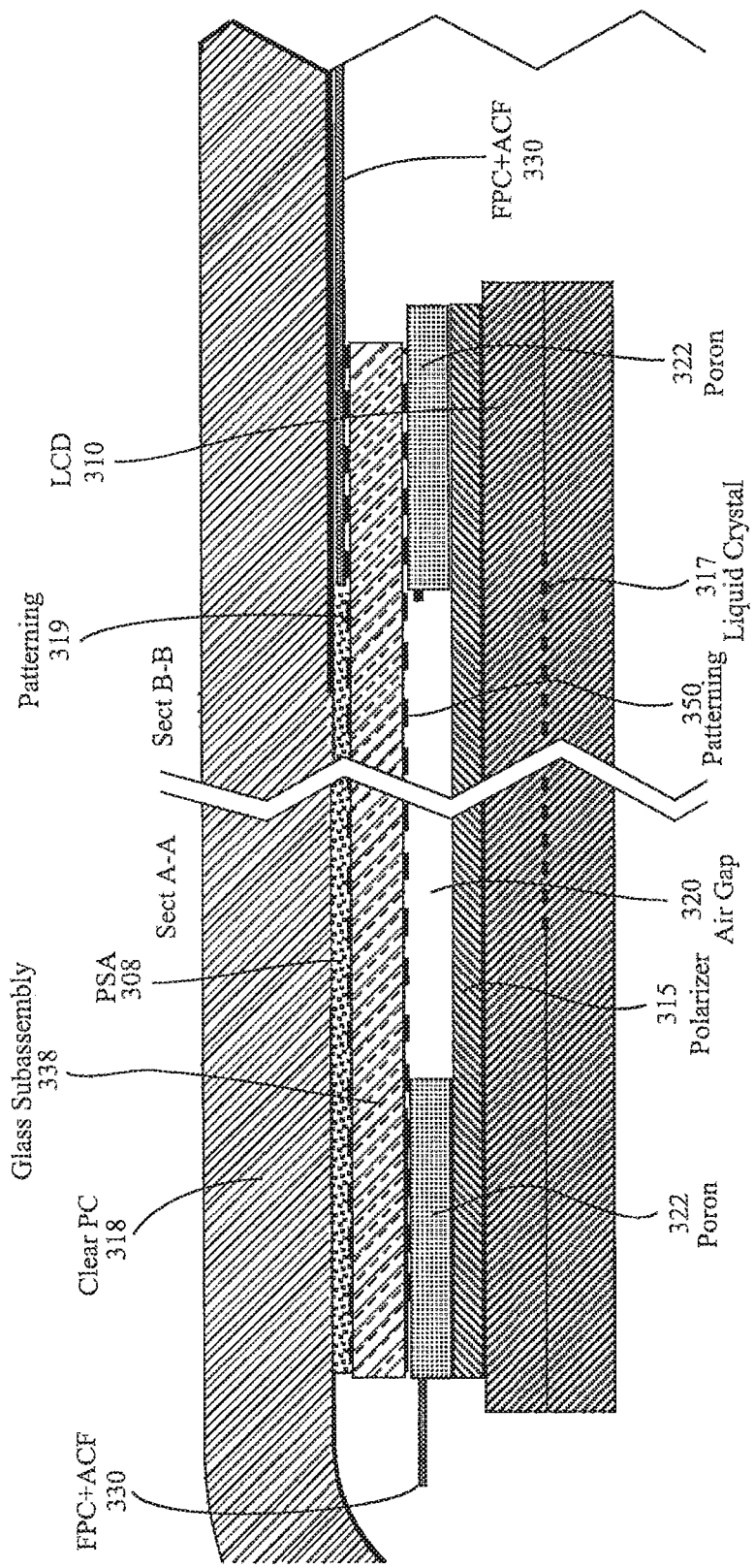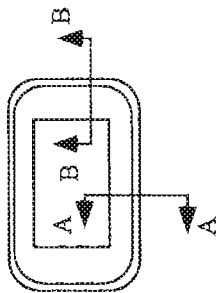
Fig. 3B

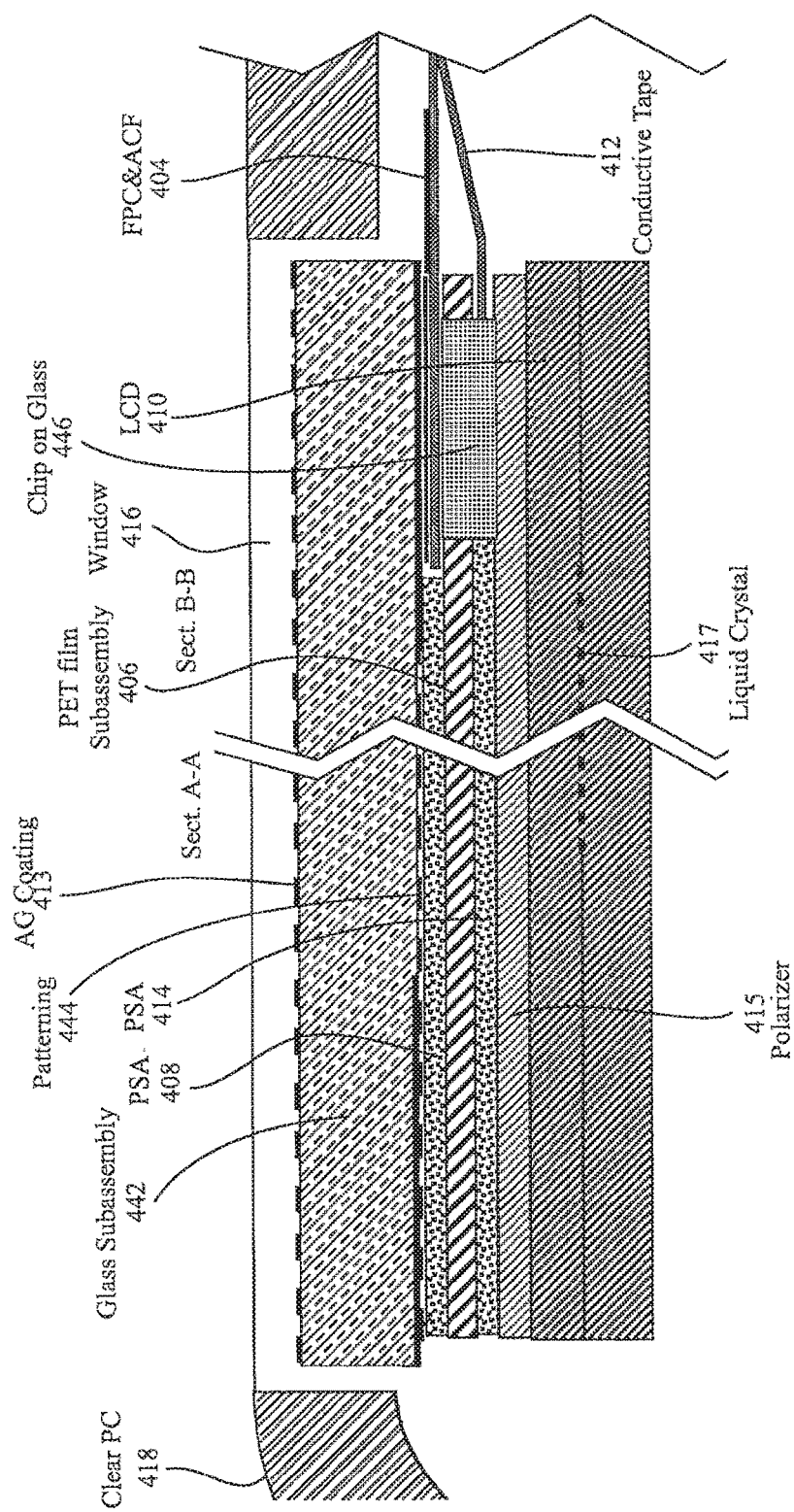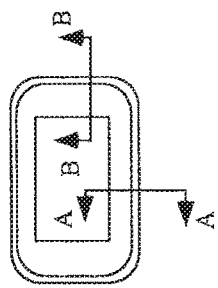
Fig. 4A

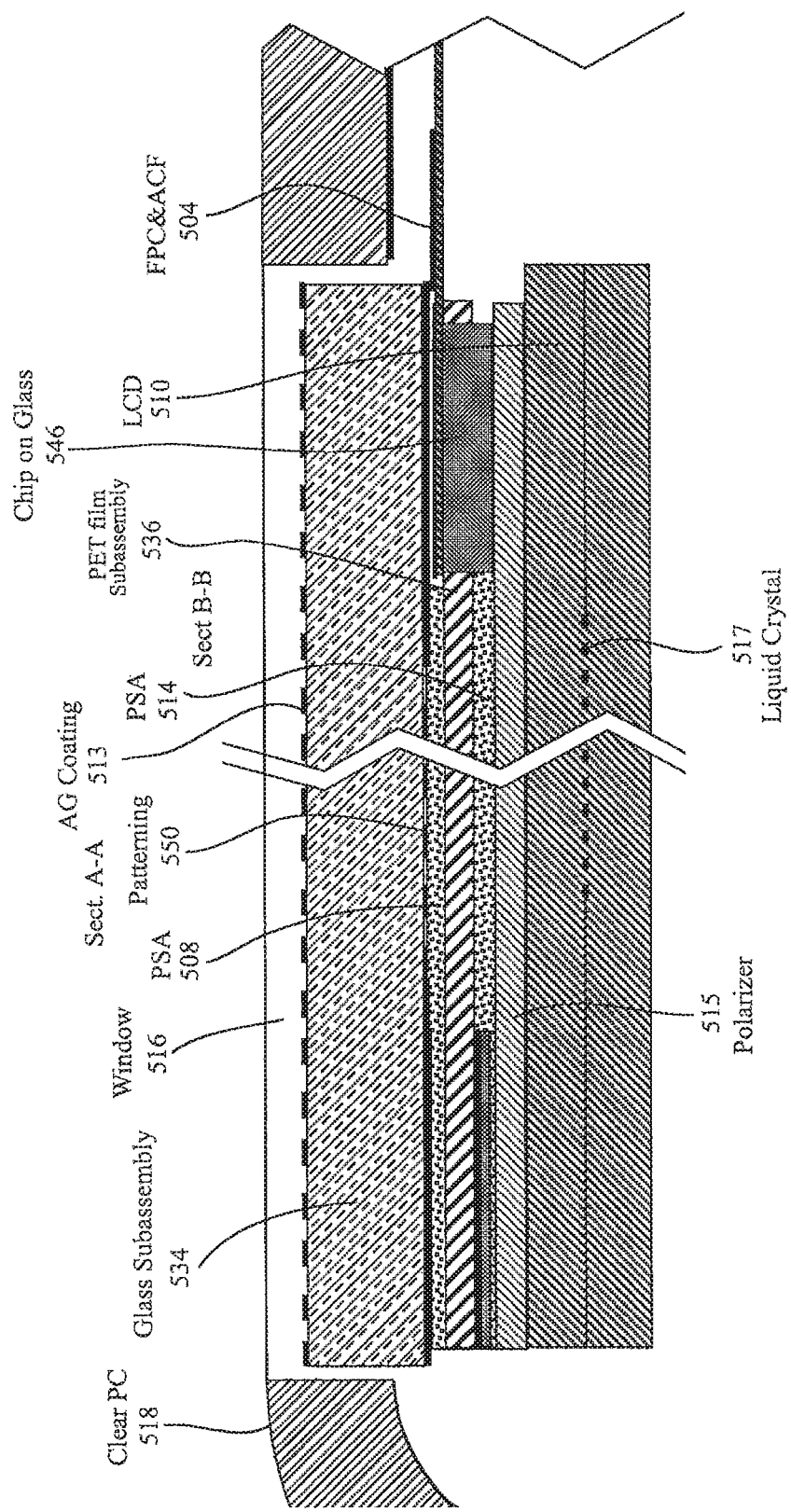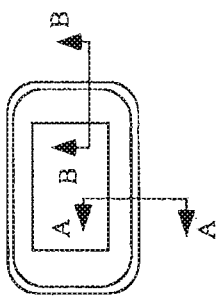
Fig. 5A

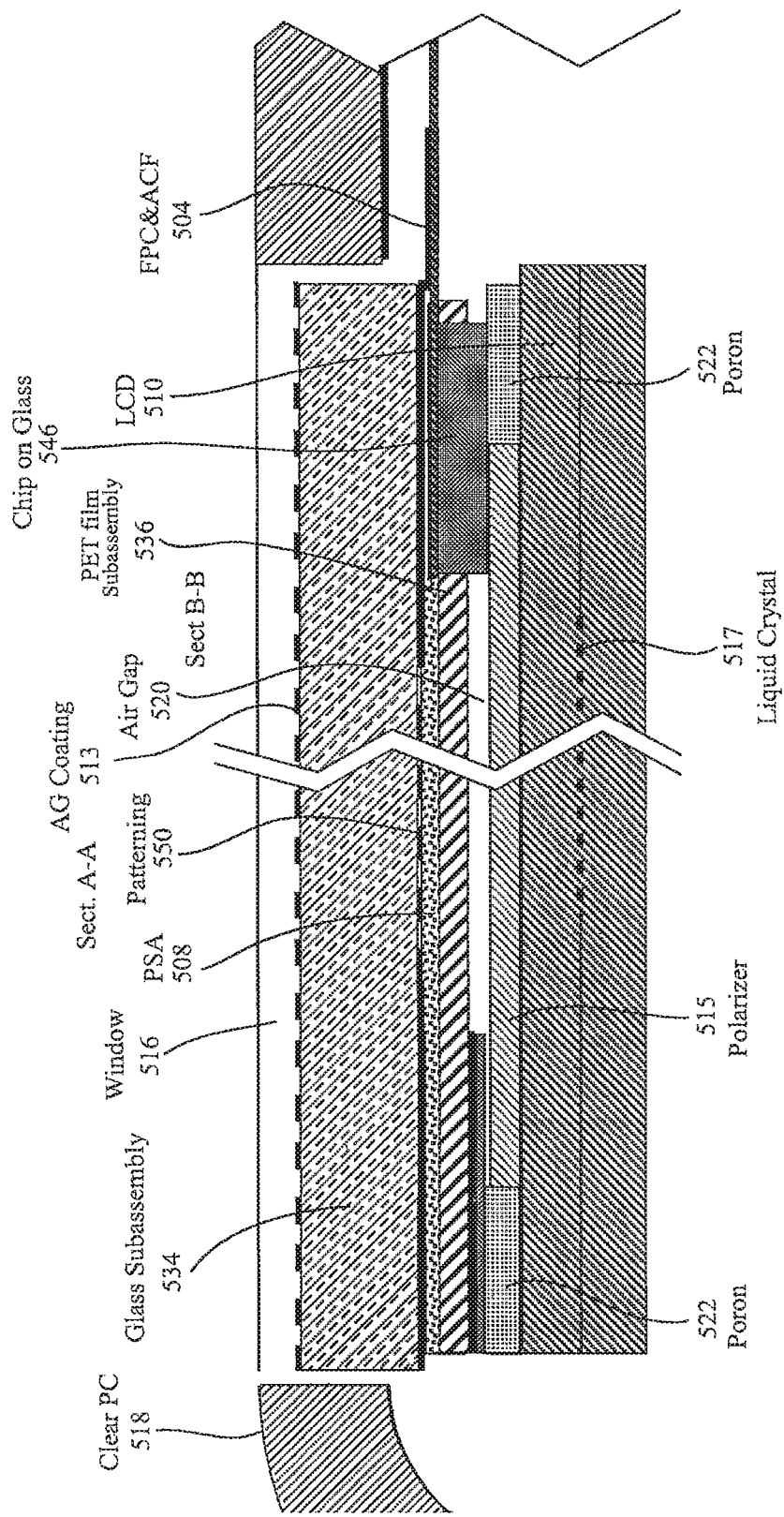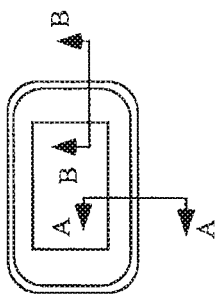
Fig. 5B

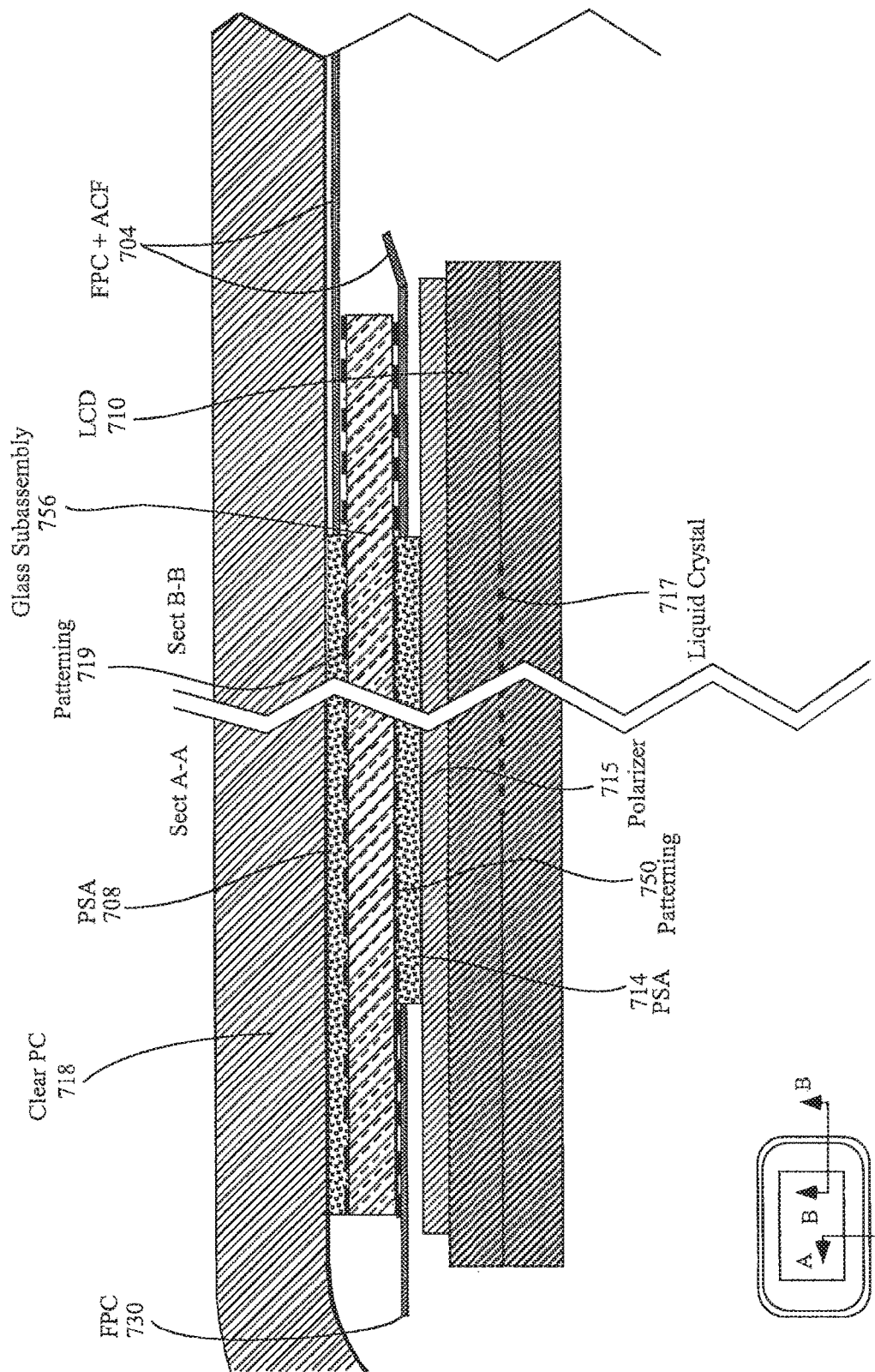

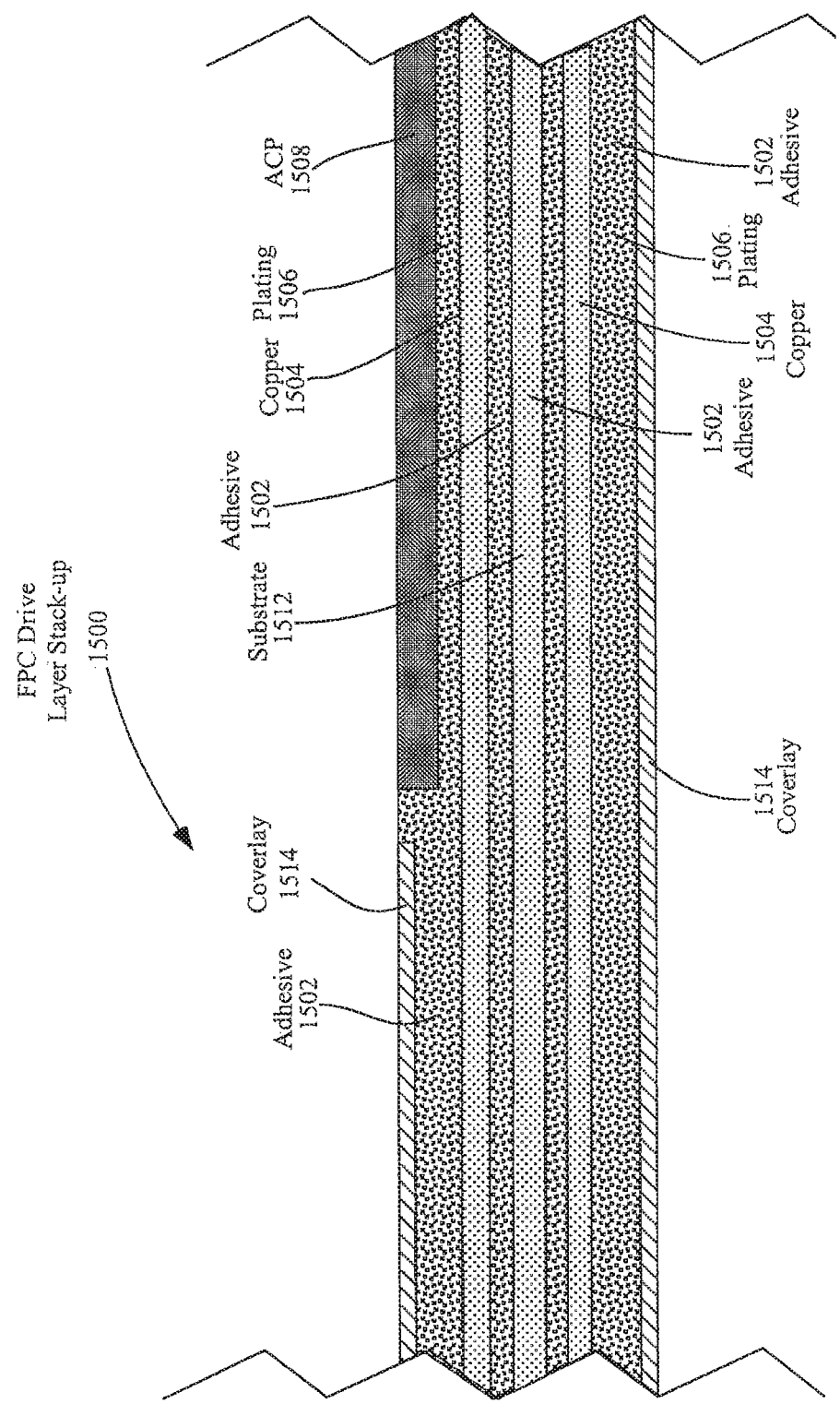

TOUCH SCREEN STACK-UPS

CROSS REFERENCES TO RELATED APPLICATIONS

This application is a divisional of U.S. patent application Ser. No. 11/818,395, filed Jun. 13, 2007, published on Jul. 10, 2008 as U.S. Patent Publication No. 2008-0165158; which claims priority to U.S. Patent Provisional Application No. 60/878,783, filed Jan. 5, 2007, now expired; the disclosures of which are herein incorporated by reference in their entirety for all intended purposes.

FIELD OF THE INVENTION

This relates to touch screens, and more particularly, to the stack-up of materials comprising the touch screens.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Various materials, adhesives, and processing steps are required to make a touch screen stackup that can be functional, cost-effective, and space-efficient.

SUMMARY OF THE INVENTION

This relates to a multi-touch sensor panel that can include a glass subassembly that can have a plurality of column traces of substantially transparent conductive material formed on the back side, the glass subassembly also acting in some embodiments as a cover that can be touched on the front side. Row traces of the same or different substantially transparent conductive material can then be located near the column traces, with a layer of dielectric material that can be coupled between the column traces and the row traces. The row and column traces can be oriented to cross over each other at crossover locations separated by the dielectric material, wherein the crossover locations can form mutual capacitance sensors for detecting one or more touches on the front side of the glass subassembly.

Alternative touch screen sensor panel embodiments can be fabricated with (1) rows and columns on the back side of a cover glass, (2) columns on the back side of a cover glass and rows on the bottom side of a separate polyethylene terephthalate (PET) film, (3) columns and rows formed on opposite sides of a single substrate, (4) columns and rows formed on two separate PET films, and (5) columns on the back side of a cover glass and rows on the top side of a separate PET film.

BRIEF DESCRIPTION OF THE DRAWINGS

FIGS. 1a-1d illustrate various exemplary touch screen sensor panel stackups with rows and columns that can be formed on the back side of a cover glass according to one embodiment of this invention.

FIGS. 2a-2d illustrate various exemplary touch screen sensor panel stackups with columns that can be formed on the back side of a cover glass and rows that can be formed on the bottom side of a separate PET film according to one embodiment of this invention.

FIGS. 3a-3c illustrate various exemplary touch screen sensor panel stackups with columns and rows that can be formed on opposite sides of a single substrate according to one embodiment of this invention.

FIGS. 4a-4d illustrate various exemplary touch screen sensor panel stackups with rows and columns that can be formed on the back side of a cover glass according to one embodiment of this invention.

FIGS. 5a and 5b illustrate various exemplary touch screen sensor panel stackups with columns that can be formed on the back side of a cover glass and rows that can be formed on the bottom side of a separate PET film according to one embodiment of this invention.

FIGS. 7a-7d illustrate various exemplary touch screen sensor panel stackups with columns and rows that can be formed on opposite sides of a single substrate according to one embodiment of this invention.

FIGS. 11a-1c illustrate various exemplary touch screen sensor panel stackups with columns and rows that can be formed on opposite sides of a single substrate according to one embodiment of this invention.

FIG. 15 illustrates a side view of an exemplary flexible printed circuit (FPC) stackup according to one embodiment of this invention.

DETAILED DESCRIPTION OF THE PREFERRED EMBODIMENT

Figure 1C:
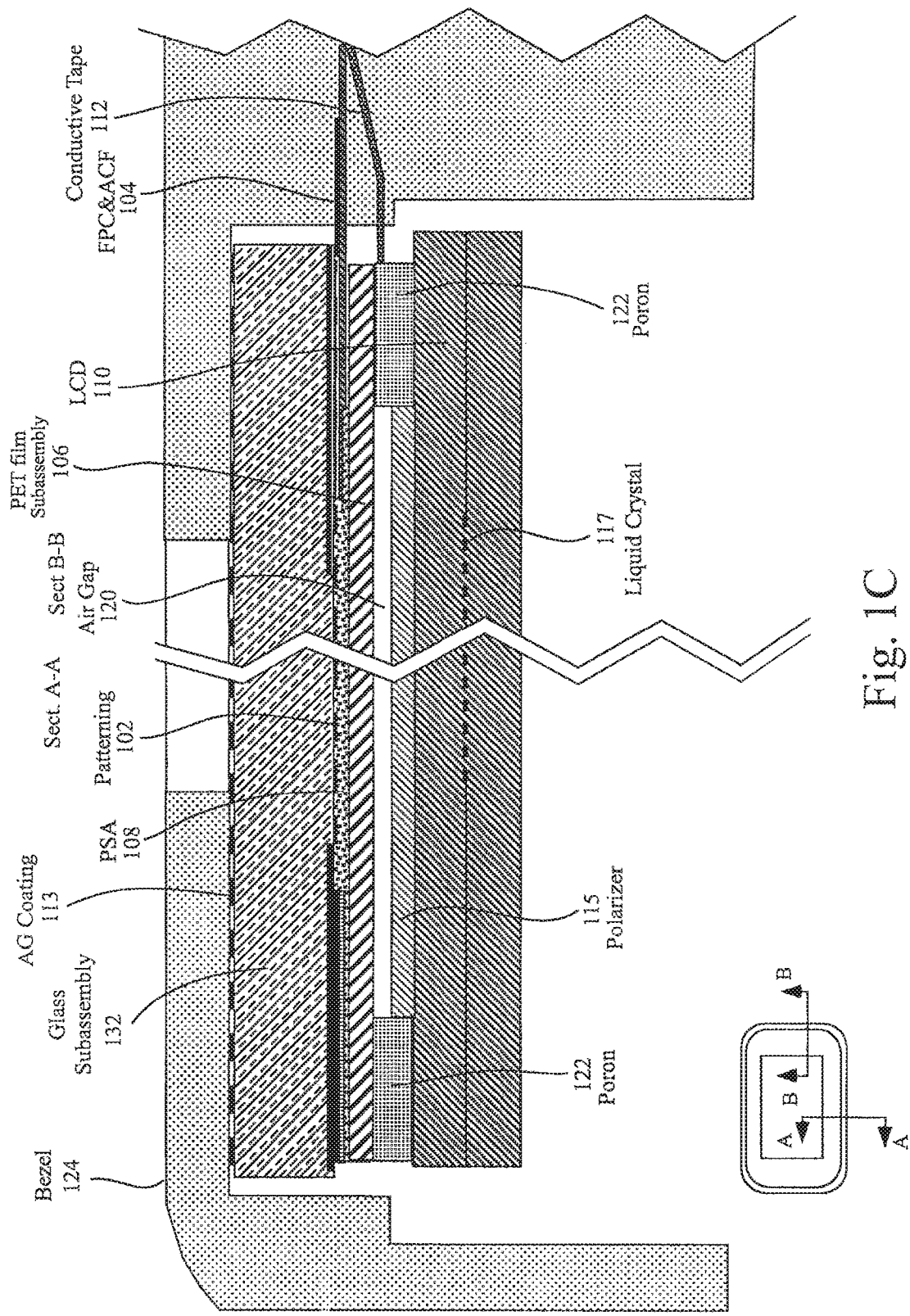

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

It should be understood that in all of the figures and descriptions that follow, the listed materials, properties and dimensions (listed in units of millimeters unless otherwise noted) are merely exemplary in nature and are not intended to limit the scope of the invention.

FIGS. 1a-1d illustrate various exemplary touchscreen sensor panel stackups with rows and columns that can be formed on the back side of a cover glass according to one embodiment of this invention.

FIG. 1a shows window 116 that can be formed in 0.8 to 1.0 polycarbonate (PC) housing 118. Within window 116 can be a stack-up in which the row and column traces can be formed on the back side of a cover glass. Substantially transparent glass subassembly 100 can have a front or top side capable of sensing when the user touches the window above it, and a back side opposite the front side. Glass subassembly 100 can have a stackup of layers that can include, in order from top to bottom, substantially transparent anti-glare (AG) coating 113 (shown as a dashed line at the top of the subassembly) (or this can be anti-reflective (AR) coating, or just plain glass or plastic surface of the window), substantially transparent 0.7 borosilicate or aluminum silicate glass, black mask (in limited areas), substantially transparent conductive material such as patterned Indium Tin Oxide (ITO) (15 to 200 ohms per square max, with 0.3 lines and 0.030 spaces) formed as columns, a substantially transparent 0.025 dielectric layer (e.g. sol-gel TIO2) with vias, and another layer of substantially transparent conductive material such as patterned ITO (15 to 200 ohm max, with 0.3 lines and 0.030 spaces) formed as rows. The two layers of patterned substantially transparent conductive material can be of the same or different composition. The black mask (or a mask of any color) can be used to hide the electrical interconnect such as metal traces located in the border areas of the touchscreen. The dielectric layer can be used as a planarization layer to enable the one layer of patterned ITO to be formed on top of another. Note that these patterned ITO layers and the dielectric layer in between are symbolically illustrated in FIG. 1a as a dashed line representing patterning 102.

Substantially transparent PET subassembly 106 can be bonded to glass subassembly 100 using pressure sensitive adhesive (PSA) 108. One purpose of PET subassembly 106 can be to support a 0.188 continuous sheet of ITO (500 ohm max) that can be formed on the bottom of the PET film which can be used to shield the glass subassembly from LCD 110, and also to provide a low capacitive spacing between the shield layer of ITO and the rows and columns. Together, glass subassembly 100 through PET film subassembly 100, and any intervening layers, can form the touchscreen.

Flexible printed circuit (FPC) 104 can be bonded using anisotropic conductive film (ACF) (0.003 after bonding) to the back side of glass subassembly 100. Conductive tape 112 can be used to ground the ITO formed on the bottom of the PET subassembly 106. Substantially transparent PSA 114 of 0.125 thickness can be used to bond PET film subassembly 106 to the LCD module, which can include a 0.2 polarizer layer 115 and liquid crystals 117. The complete assembly can then be mounted into window 116 in housing 118. Note that when the complete assembly is mounted in housing 118, glass subassembly 100 can be either even with or slightly recessed (0.3 Z step) from the top of the window.

FIG. 1b is similar to FIG. 1a, except that PET film subassembly 106 is not fully laminated to LCD module 110. Instead, air gap 120 can be formed between them, and a ring of Poron 122 can be formed around the perimeter of the touchscreen. The air gap can allow for easier separation of the touchscreen from the LCD module in case repair, replacement or upgrading is needed. Anti-reflective (AR) coating can be applied to one or both surfaces adjacent to the air-gap to minimize reflections and associated contrast ratio degradation.

FIG. 1c is similar to FIG. 1b in that it includes air gap 120, but it can be mounted into an enclosure having overhanging bezel 124. This can be less expensive because bezel 124 can hide electrical interconnect formed in the border areas of the touchscreen, which can eliminate the need for blackmask. In addition, it can be less expensive because the housing can cover the edges of the touchglass, eliminating the need for grinding and polishing steps. Glass subassembly 132 can be identical to glass subassembly 100 in FIG. 1.

Figure 1D:
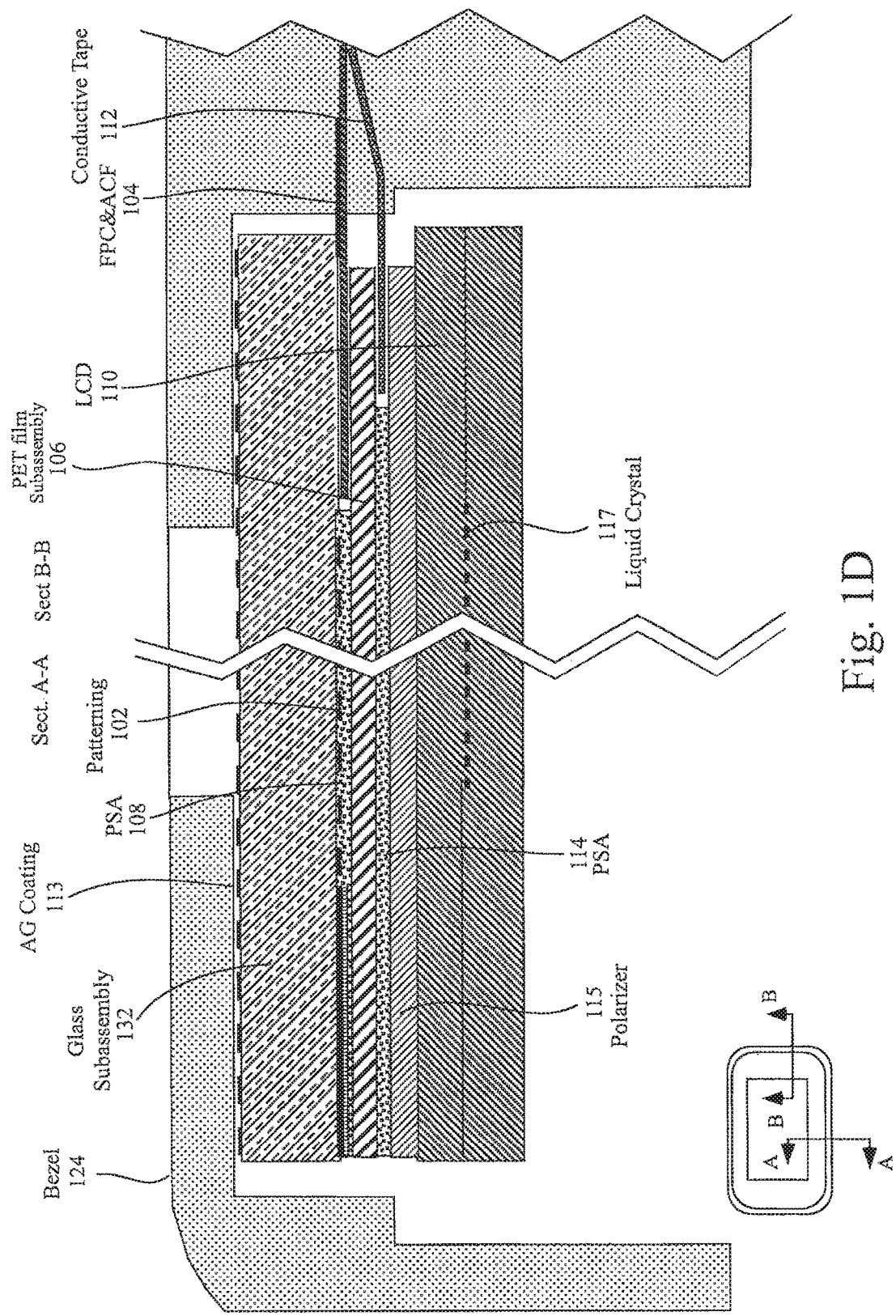

FIG. 1d is a hybrid of FIGS. 1a and 1c, wherein overhanging bezel 124 can allow the blackmask step to be eliminated, and full lamination can be used (see full layer of PSA 108). Note that full lamination can result in a mechanically stiffer and stronger stackup, but the benefit of having an air gap is that it can make the parts separable and replaceable.

FIGS. 2a-2d illustrate various exemplary touch screen sensor panel stackups with columns that can be formed on the back side of a cover glass and rows that can be formed on the bottom side of a separate PET film according to one embodiment of this invention.

FIG. 2a shows window 216 that can be formed in 0.8 to 1.0 PC housing 218. Within window 216 can be a stack-up in which the column traces can be formed on the back side of a cover glass and row traces can be formed on the bottom side of a separate PET film. Substantially transparent glass subassembly 234 can have a stackup of layers that can include, in order from top to bottom, substantially transparent AG coating 213 (shown as a dashed line at the top of the subassembly), substantially transparent 0.7 borosilicate or aluminum silicate glass, black mask (in limited areas), and substantially transparent conductive material such as patterned ITO (15 to 200 ohm max, with 0.3 lines and 0.030 spaces) formed as columns. Note that the patterned ITO layer is symbolically illustrated in FIG. 2a as a dashed line representing patterning 250. Substantially transparent PET subassembly 236 of thickness 0.188 can be bonded to glass subassembly 234 using PSA 208. One purpose of PET subassembly 236 can be to support a substantially transparent layer of conductive material such as patterned ITO (75 to 500 ohm max, with 5.0 lines and 0.050 spaces) formed as rows, and also to provide a low capacitive layer between the rows and columns. The two layers of patterned substantially transparent conductive material can be of the same or different composition. Together, glass subassembly 234 through PET film subassembly 236, and any intervening layers, can form the touchscreen.

FPC 204 can be bonded using ACF (0.003 after bonding) to the back side of glass subassembly 234. FPC 226 can be also bonded using ACF to the rows that can be formed on the bottom of PET subassembly 236. Substantially transparent PSA 214 of 0.125 thickness can be used to bond PET film subassembly 236 to LCD module 210, which can include a 0.2 polarizer layer 215 and liquid crystals 217. The complete assembly can then be mounted into window 216 in housing 218. Note that when the complete assembly is mounted in housing 218, glass subassembly 234 can be either even with or slightly recessed (0.3 Z step) from the top of the window.

FIG. 2b is similar to FIG. 2a, except that PET film subassembly 236 is not fully laminated to LCD module 210. Instead, air gap 220 can be formed between them, and a ring of Poron 222 can be formed around the perimeter of the touchscreen.

Figure 2C:
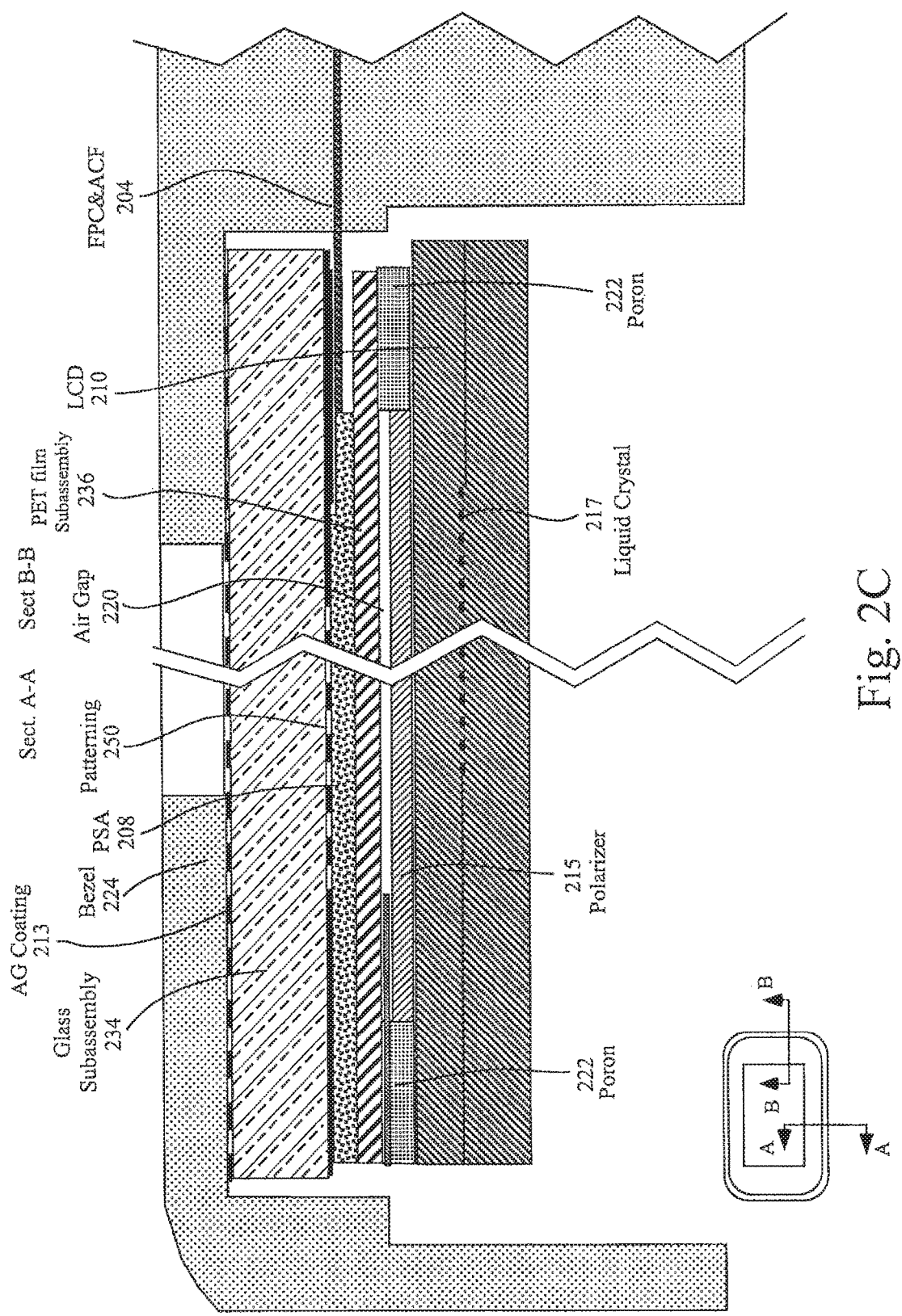

FIG. 2c is similar to FIG. 2b in that it includes air gap 220, but it can be mounted into an enclosure having overhanging bezel 224.

FIG. 2d is a hybrid of FIGS. 2a and 2c, wherein overhanging bezel 224 can allow the blackmask step to be eliminated, and full lamination can be used (see full layer of PSA 208).

FIGS. 3a and 3b illustrate various exemplary touch screen sensor panel stackups with columns and rows that can be formed on opposite sides of a single substrate according to one embodiment of this invention.

FIG. 3a shows an approximately 0.9 substantially transparent PC (or glass) housing 318. Bonded to housing 318 using 0.100 substantially transparent PSA 308 can be a stack-up in which the column traces and row traces can be formed on opposite sides of a single substrate. Substantially transparent glass subassembly 338 can have a stackup of layers that can include, in order from top to bottom, for example, substantially transparent conductive material such as patterned ITO (15 to 200 ohm max, with 0.3 lines and 0.030 spaces) formed as columns, substantially transparent 0.7 borosilicate or aluminum silicate or chemically strengthened soda lime glass, and substantially transparent conductive material such as patterned ITO (75 to 200 ohm max, with 5.0 lines and 0.050 spaces) formed as rows. The two layers of patterned substantially transparent conductive material can be of the same or different composition. Note that the patterned ITO layers are symbolically illustrated in FIG. 3a as dashed lines representing patterning 319 and 350.

FPC 330 can be bonded using ACF (0.003 after bonding) to the rows on the back side of glass subassembly 338, and also another FPC (not shown in FIG. 3a) can be bonded to the columns which are on the front or top side of the glass. Clear PSA 314 of 0.100 thickness can be used to bond glass subassembly 338 to LCD module 310, which can include polarizer layer 315 and liquid crystals 317.

FIG. 3b is similar to FIG. 3a, except that glass subassembly 338 is not fully laminated to LCD module 310. Instead, air gap 320 can be formed between them, and a ring of Poron 322 can be formed around the perimeter of glass subassembly 338. AR films or coatings can be applied to the back of the touch glass, and the front of the polarizer, to minimize optical losses.

Figure 3C:
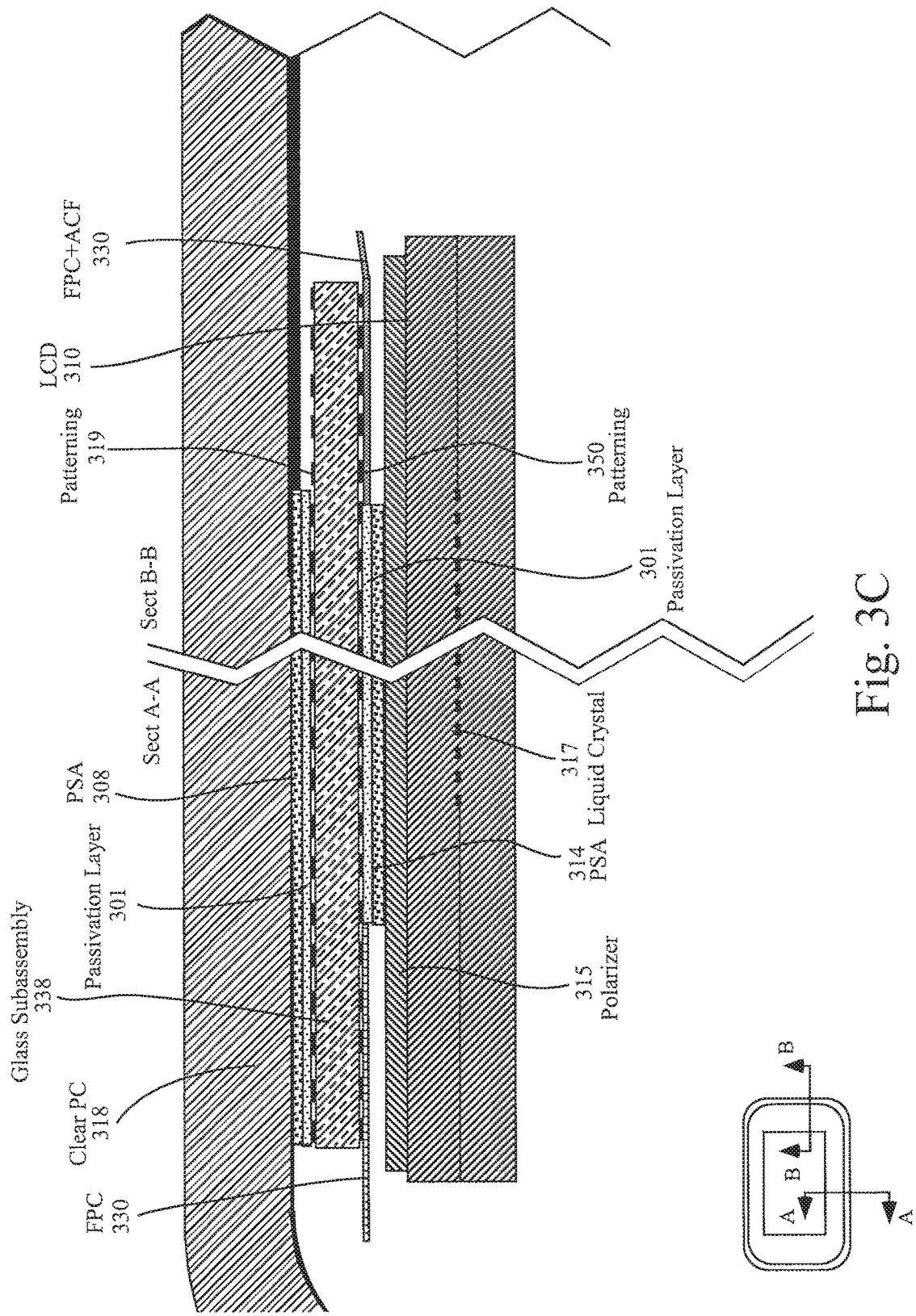

FIG. 3c is similar to FIG. 3a, except that passivation layers 301 are formed between patterning 319 and PSA 309, and between patterning 350 and PSA 314. Passivation layers 301 can be formed from silicon oxide, and can serve to prevent acid in the PSA from attacking the patterned ITO. Passivation layers 301 can also physically protect the ITO and metal layers from other corrosive agents, such as sweat from an assembly operator during the manufacturing process, and can physically protect the ITO and metal layers from scratches during assembly. It should be understood that although the use of passivation layers between ITO patterning and the PSA is only shown in FIG. 3c, a passivation layer can be formed between the ITO or metal and the PSA in any of the embodiments described and shown herein.

FIGS. 4a-4d illustrate various exemplary touch screen sensor panel stackups with rows and columns that can be formed on the back side of a cover glass according to one embodiment of this invention.

FIG. 4a shows window 416 that can be formed in 0.8 to 1.0 substantially transparent PC housing 418. Within window 416 can be a stack-up in which the column and row traces can be formed on the back side of a cover glass. Substantially transparent glass subassembly 442 can have a stackup of layers that can include, in order from top to bottom, for example, substantially transparent AG coating 413 (shown as a dashed line at the top of the subassembly), substantially transparent 0.7 borosilicate or aluminum silicate glass, black mask (in limited areas), substantially transparent conductive material such as patterned ITO (15 to 200 ohm max, with 0.3 lines and 0.030 spaces) formed as columns, 0.025 mm substantially transparent dielectric (sol-gel TIO2) with vias, patterned metal (0.025 ohm max, 0.030 lines and 0.030 spaces), and a 0.188 layer of substantially transparent conductive material such as patterned ITO (75 to 200 ohm max, with 0.3 lines and 0.030 spaces) formed as rows. The patterned metal can be formed in the border areas of the touchscreen to connect to the rows and/or columns and route them to an edge of the touchscreen. The two layers of patterned substantially transparent conductive material can be of the same or different composition. Note that the patterned ITO layers, dielectric and metal are symbolically illustrated in FIG. 4a as a dashed line representing patterning 444. Substantially transparent PET subassembly 406 can be bonded to glass subassembly 442 using substantially transparent PSA 408. One purpose of PET subassembly 406 can be to support a 0.188 continuous sheet of ITO (500 ohm). Together, glass subassembly 442 through PET film subassembly 406, and any intervening layers, can form the touchscreen.

FPC 404 can be bonded using ACF (0.003 after bonding) to the back side of glass subassembly 442. Conductive tape 412 can also be bonded using ACF to PET subassembly 406 to ground the continuous sheet of ITO. Substantially transparent PSA 414 of 0.125 thickness can be used to bond PET film subassembly 406 to LCD module 410, which can include a 0.2 polarizer layer 415 and liquid crystals 417. The complete assembly can then be mounted into window 416 in housing 418. Note that when the complete assembly is mounted in housing 418, glass subassembly 442 can be either even with or slightly recessed (0.3 Z step) from the top of the window.

Chip on glass 446 can be connected to metal border traces, rows and column traces on glass subassembly 442. Chip on glass 446 can be supported in a hole or cutout on PET film subassembly 406, and can contain one or more components of a sensor panel subsystem, including one or more processors, drivers, analog channels, and the like. The polarizer may also have a hole or cutout to allow the presence of the chip on glass. Chip on glass 446 can enable only a very small flex connector to be attached to the touchscreen to communicate with the system processor, because now most of the circuitry can be contained on the touchscreen.

Figure 4B:
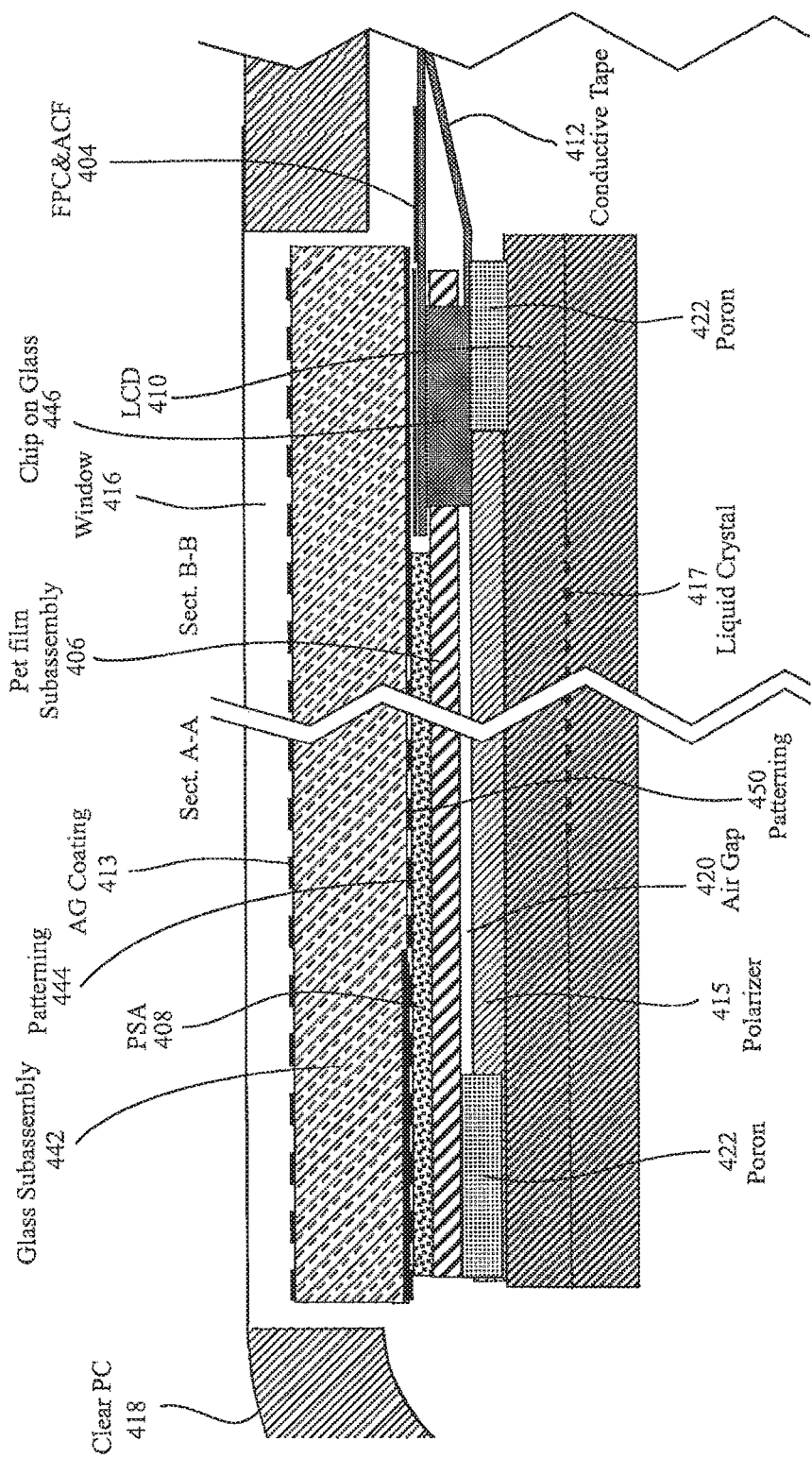

FIG. 4b is similar to FIG. 4a, except that PET film subassembly 406 is not fully laminated to LCD module 410. Instead, air gap 420 can be formed between them, and a ring of Poron 422 can be formed around the perimeter of the touchscreen. AR coating can also be used to minimize losses.

Figure 4C:
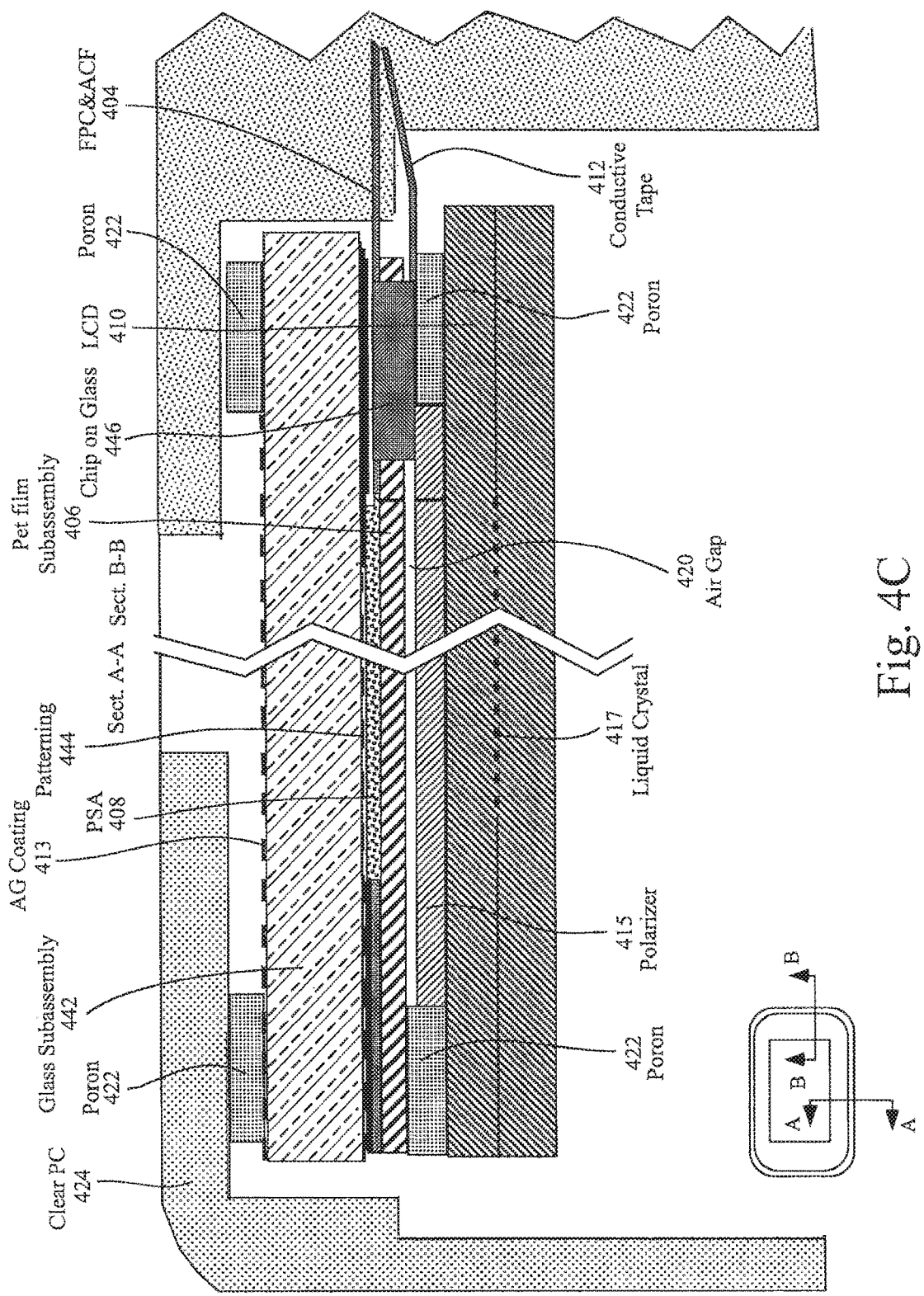

FIG. 4c is similar to FIG. 4b in that it includes air gap 420, but it is mounted into clear PC housing 424 having overhanging bezel. A sealing ring of Poron 422 can be formed between the bezel and glass subassembly 442.

Figure 4D:
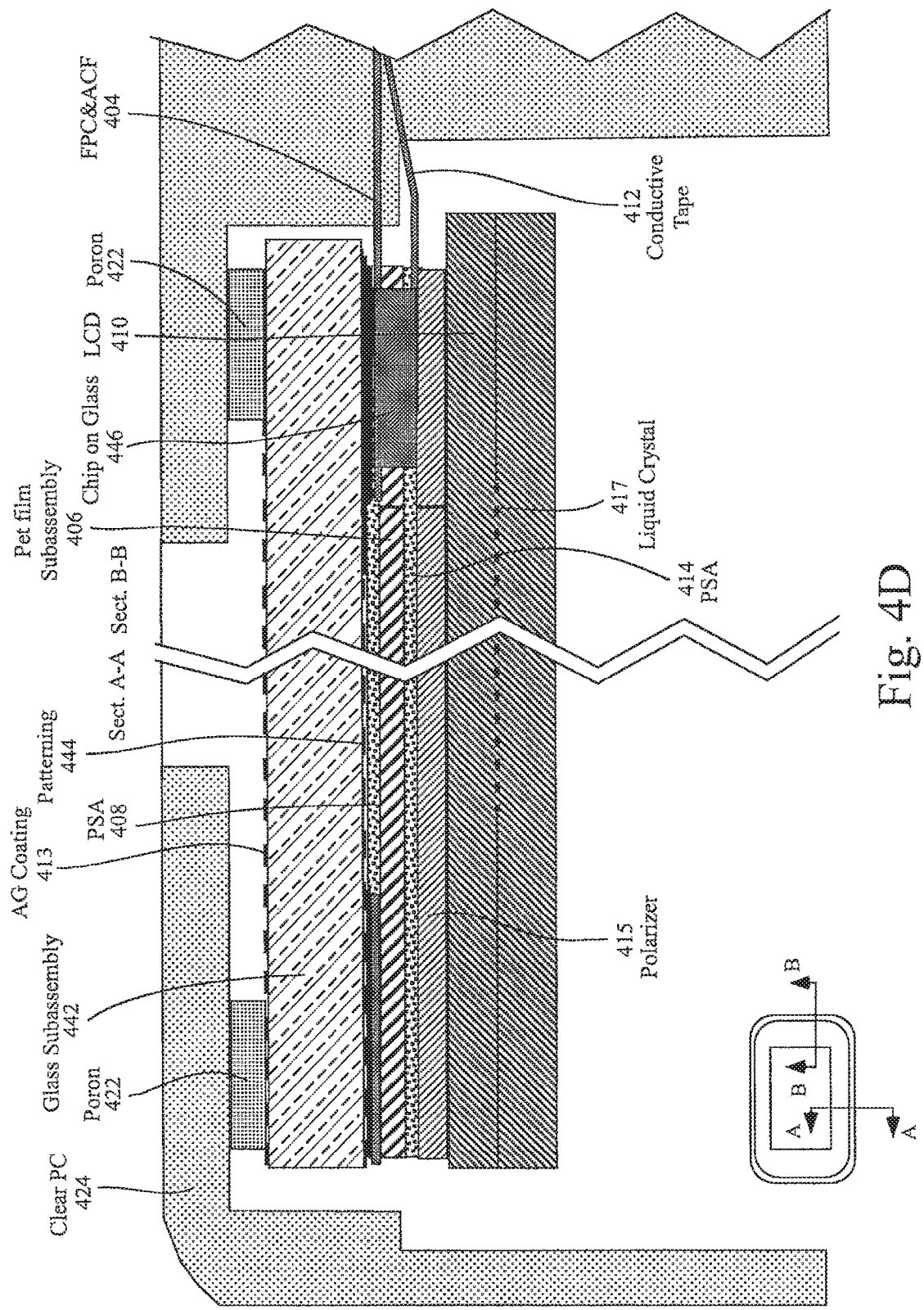

FIG. 4d is a hybrid of FIGS. 4a and 4c, wherein an overhanging bezel can allow the blackmask on glass subassembly 442 to be eliminated, and full lamination can be used (see full layer of PSA 414).

FIGS. 5a and 5b illustrate various exemplary touch screen sensor panel stackups with columns that can be formed on the back side of a cover glass and rows that can be formed on the bottom side of a separate PET film according to one embodiment of this invention.

FIG. 5a shows window 516 that can be formed in 0.8 to 1.0 PC housing 518. Within window 516 can be a stack-up in which the column traces can be formed on the back side of a cover glass and row traces can be formed on the bottom side of a separate PET film. Substantially transparent glass subassembly 534 can have a stackup of layers that can include, in order from top to bottom, substantially transparent AG coating 513 (shown as a dashed line at the top of the subassembly), substantially transparent 0.7 borosilicate or aluminum silicate glass, black mask (in limited areas), and substantially transparent conductive material such as patterned ITO (15 ohm max, with 0.3 lines and 0.030 spaces) formed as columns. Note that the patterned ITO layer is symbolically illustrated in FIG. 5a as a dashed line representing patterning 550. Substantially transparent PET subassembly 536 can be bonded to glass subassembly 534 using substantially transparent PSA 508. One purpose of PET subassembly 536 can be to support a 0.188 layer of substantially transparent conductive material such as patterned ITO (150 ohm max, with 5.0 lines and 0.050 spaces) formed as rows, and also to provide a low capacitive layer between the rows and columns. The two layers of patterned substantially transparent conductive material can be of the same or different composition. Chip on glass 546 can be connected to column traces on glass subassembly 534, and to row traces on PET film subassembly 536. Chip on glass 546 can be supported in a hole on PET film subassembly 536, and can contain one or more components of a sensor panel subsystem, including one or more processors, drivers, analog channels, and the like. Together, glass subassembly 534 through PET film subassembly 536, chip on glass 546 and any intervening layers, can form the touchscreen.

FPC 504 can be bonded using 0.125 thick (max) ACF to the back side of glass subassembly 534. FPC can also be bonded using ACF to the rows formed on the bottom of PET subassembly 536. Substantially transparent PSA 514 of 0.125 thickness can be used to bond PET film subassembly 536 to LCD module 510, which can include a 0.2 polarizer layer 515 and liquid crystals 517. The complete assembly can then be mounted into window 516 in housing 518. Note that when the complete assembly is mounted in housing 518, glass subassembly 534 can be either even with or slightly recessed (0.3 Z step) from the top of the window.

FIG. 5b is similar to FIG. 5a, except that PET film subassembly 536 is not fully laminated to LCD module 510. Instead, air gap 520 can be formed between them, and a ring of Poron 522 can be formed around the perimeter of the touchscreen.

Figure 6A:
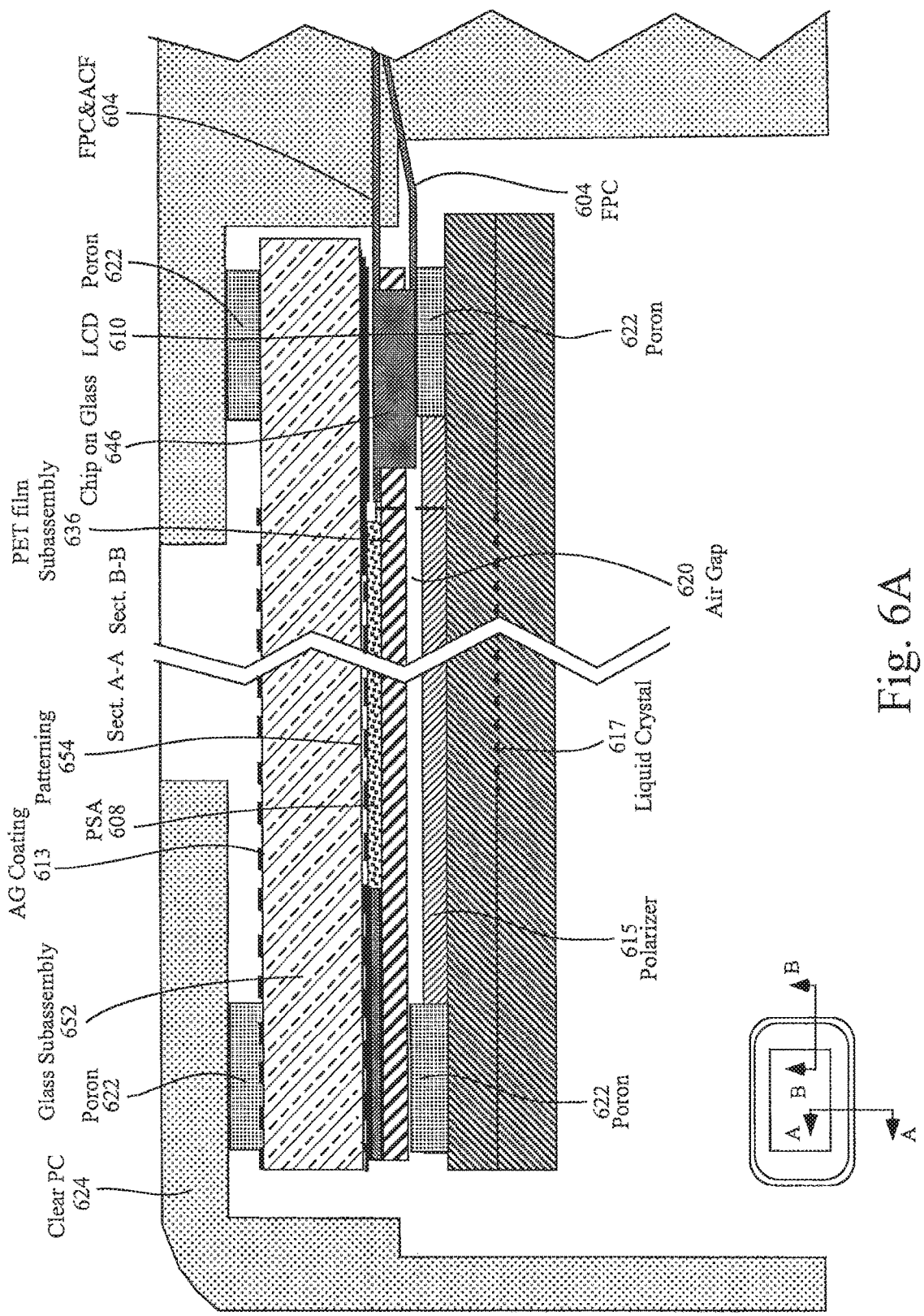
FIGS. 6a and 6b illustrate various exemplary touch screen sensor panel stackups with columns that can be formed on the back side of a cover glass and rows that can be formed on the bottom side of a separate PET film according to one embodiment of this invention.
Figure 6B:
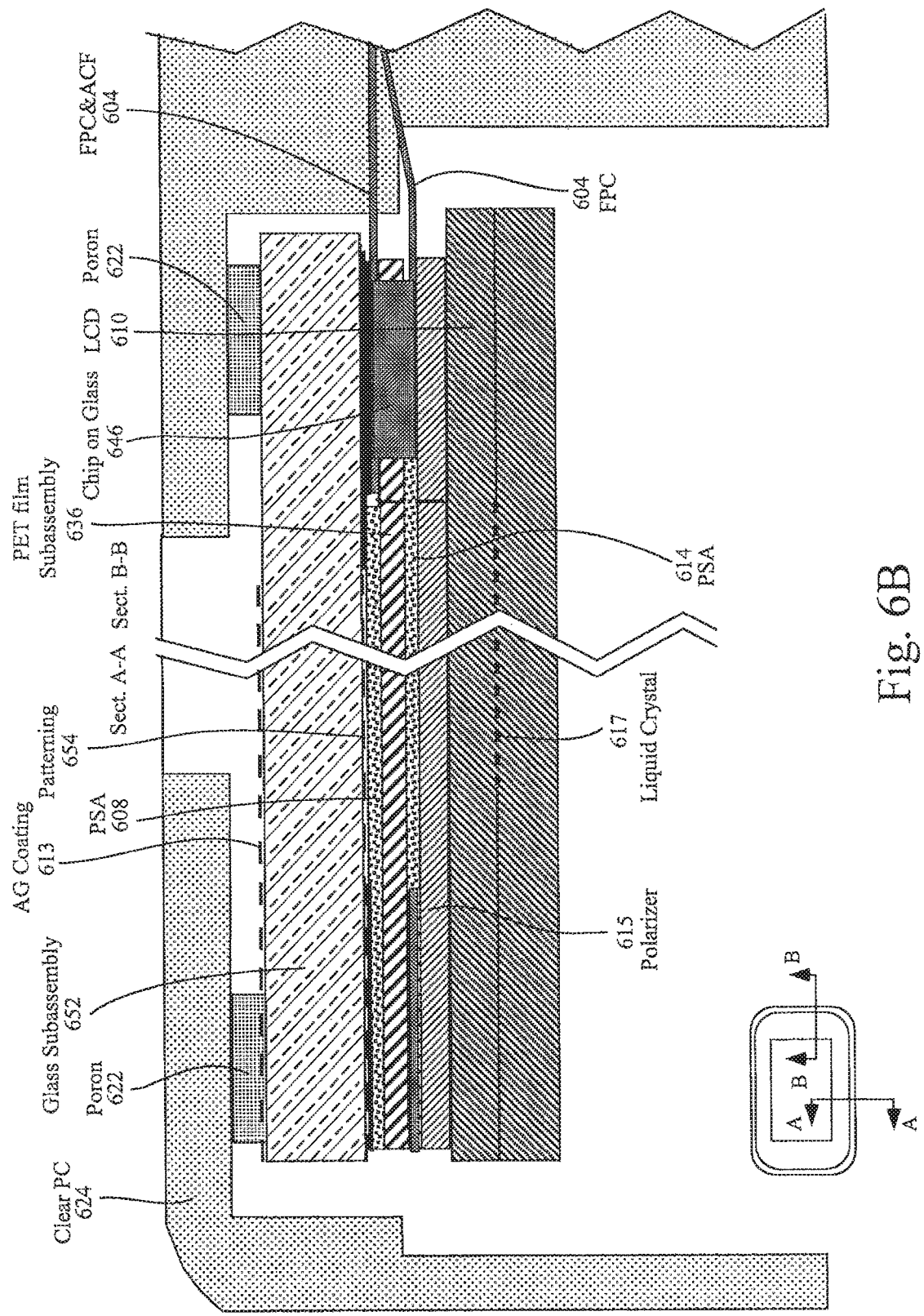

FIGS. 6a and 6b illustrate various exemplary touch screen sensor panel stackups with columns that can be formed on the back side of a cover glass and rows that can be formed on the bottom side of a separate PET film according to one embodiment of this invention.

FIG. 6a shows PC housing 624 having an overhanging bezel. A sealing ring of Poron 622 can be formed between the bezel and substantially transparent glass subassembly 652. Glass subassembly 652 can be part of a stack-up in which the column traces can be formed on the back side of the glass subassembly and row traces can be formed on the bottom side of a separate PET film. Glass subassembly 652 has a stackup of layers that can include, in order from top to bottom, substantially transparent AG coating 613 (shown as a dashed line at the top of the subassembly), substantially transparent 0.7 borosilicate or aluminum silicate glass, black mask (in limited areas), substantially transparent conductive material such as patterned ITO (15 ohm max, with 0.3 lines and 0.030 spaces) formed as columns, and patterned metal (0.025 ohm max, with 0.030 lines and 0.030 spaces). Note that the patterned ITO and metal layer is symbolically illustrated in FIG. 6a as a dashed line representing patterning 654. Substantially transparent PET subassembly 636 can be bonded to glass subassembly 652 using substantially transparent PSA 608. One purpose of PET subassembly 636 can be to support a 0.188 layer of substantially transparent conductive material such as patterned ITO (150 ohm max, with 5.0 lines and 0.050 spaces) formed as rows, and also to provide a low capacitive layer between the rows and columns. The two layers of patterned substantially transparent conductive material can be of the same or different composition. Chip on glass 646 can be connected to column traces on glass subassembly 652, and to row traces on PET film subassembly 636. Chip on glass 646 can be supported in a hole on PET film subassembly 636, and can contain one or more components of a sensor panel subsystem, including one or more processors, drivers, analog channels, and the like. Together, glass subassembly 652 through PET film subassembly 636, chip on glass 646 and any intervening layers, can form the touchscreen.

FPC 604 can be bonded using 0.125 thick (max) ACF to the back side of glass subassembly 652. FPC 604 can also be bonded using ACF to the rows formed on the bottom of PET subassembly 636. Air gap 620 can be formed between PET film subassembly 636 and LCD module 610, which can include a 0.2 polarizer layer 615 and liquid crystals 617, and a ring of Poron 622 can be formed around the perimeter of the touchscreen.

FIG. 6b is similar to FIG. 6a, except that PET film subassembly 636 can be fully laminated to LCD module 610 using PSA 614.

FIGS. 7a-7d illustrate various exemplary touch screen sensor panel stackups with columns and rows that can be formed on opposite sides of a single substrate according to one embodiment of this invention.

FIG. 7a shows 0.9 substantially transparent PC (or glass) housing 718. Bonded to housing 718 using 0.100 substantially transparent PSA 708 can be a stack-up in which the column traces and row traces can be formed on opposite sides of a single substrate. Substantially transparent glass subassembly 756 can have a stackup of layers that can include, in order from top to bottom, substantially transparent conductive material such as patterned ITO (15 to 200 ohm max, with 0.3 lines and 0.030 spaces) formed as columns, substantially transparent 0.5 borosilicate or aluminum silicate glass, and substantially transparent conductive material such as patterned ITO (75 ohm max, with 0.5 lines and 0.050 spaces) formed as rows. The two layers of patterned substantially transparent conductive material can be of the same or different composition. Note that the patterned ITO layers are symbolically illustrated in FIG. 7a as dashed lines representing patterning 719 and 750.

FPC 730 and 704 can be bonded using 0.125 thick (max) ACF to the columns and rows on either side of glass subassembly 756. Substantially transparent PSA 714 of 0.100 thickness can be used to bond glass subassembly 756 to LCD module 710, which can include polarizer layer 715 and liquid crystals 717.

Figure 7B:
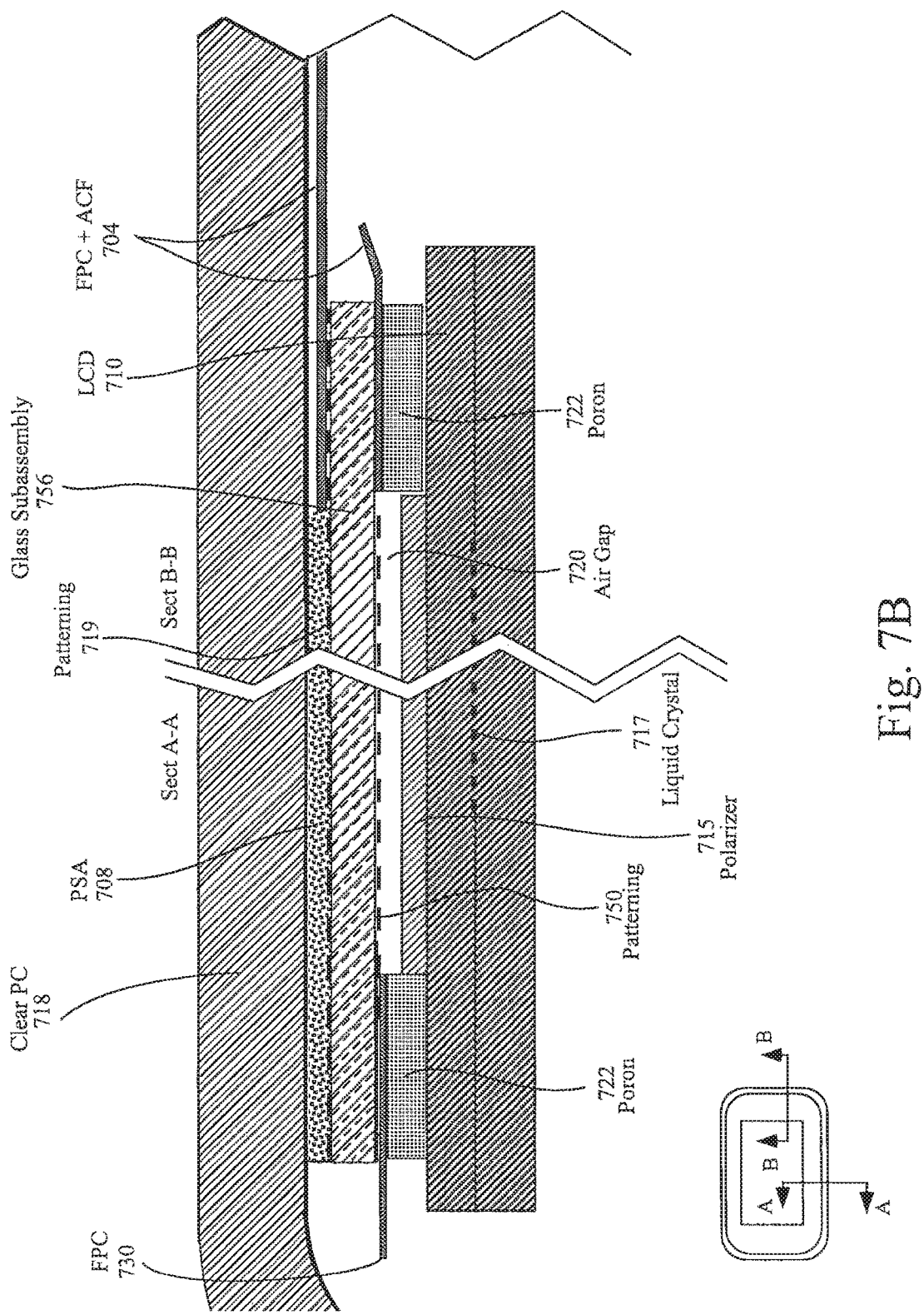

FIG. 7b is similar to FIG. 7a, except that glass subassembly 756 is not fully laminated to LCD module 710. Instead, air gap 720 can be formed between them, and a ring of Poron 722 can be formed around the perimeter of glass subassembly 756.

Figure 7C:
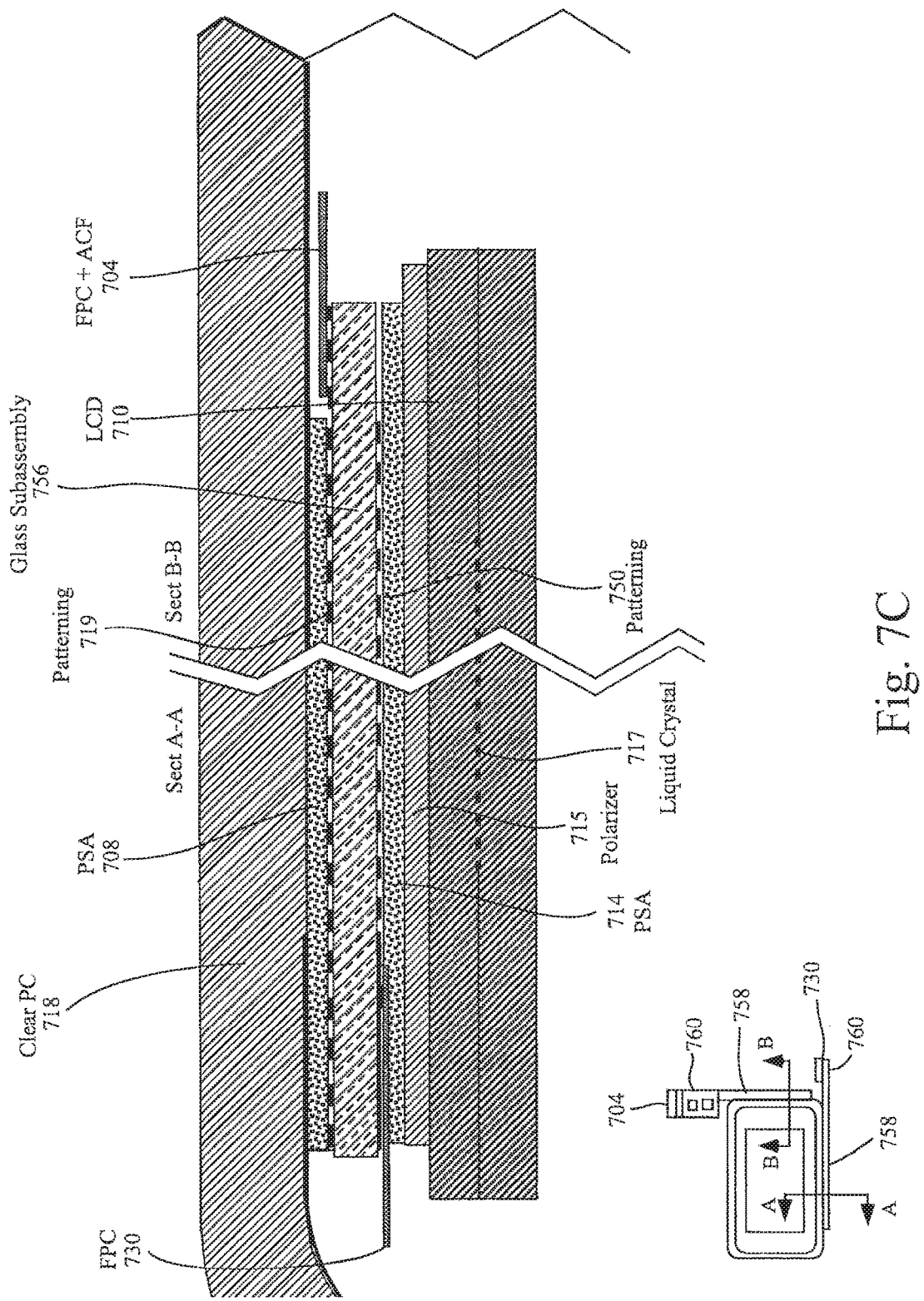

FIG. 7c is similar to FIG. 7a, but additionally shows an implementation of wings 758 on FPC 760 (see thumbnail at lower left corner). Each FPC 760 can be generally long and slender to provide maximum panel utilization. In the thumbnail of FIG. 7c, the upper FPC 704 can get folded back, as can the lower FPC 730, and they can be connected together behind the panel.

Figure 7D:
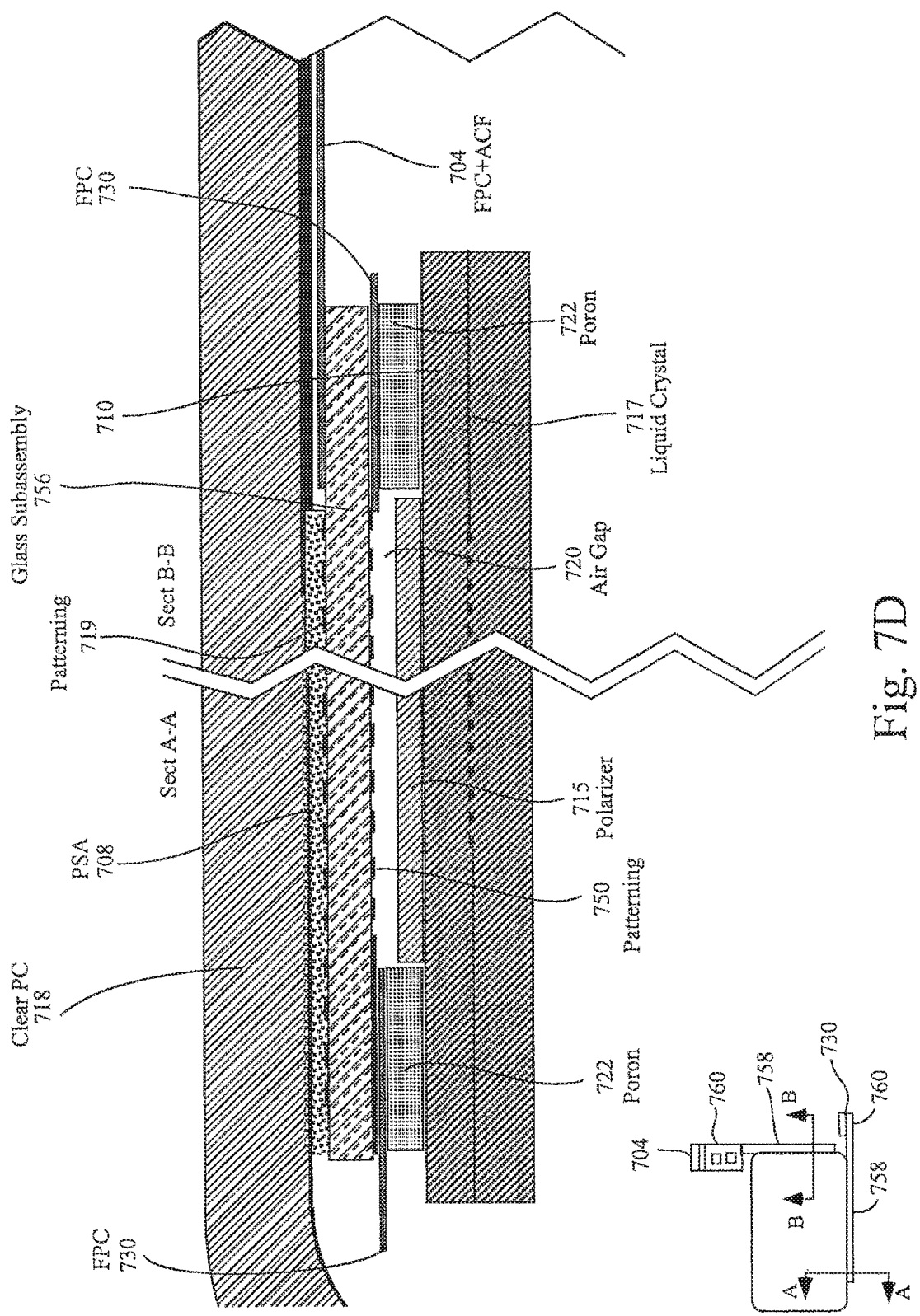

FIG. 7d is similar to FIG. 7b, but additionally shows an implementation of wings 758 on FPC 760 (see thumbnail at lower left corner). Each FPC 760 can be generally long and slender to provide maximum panel utilization. In the thumbnail of FIG. 7c, the upper FPC 704 can get folded back, as can the lower FPC 730, and they can be connected together behind the panel.

Figure 8:
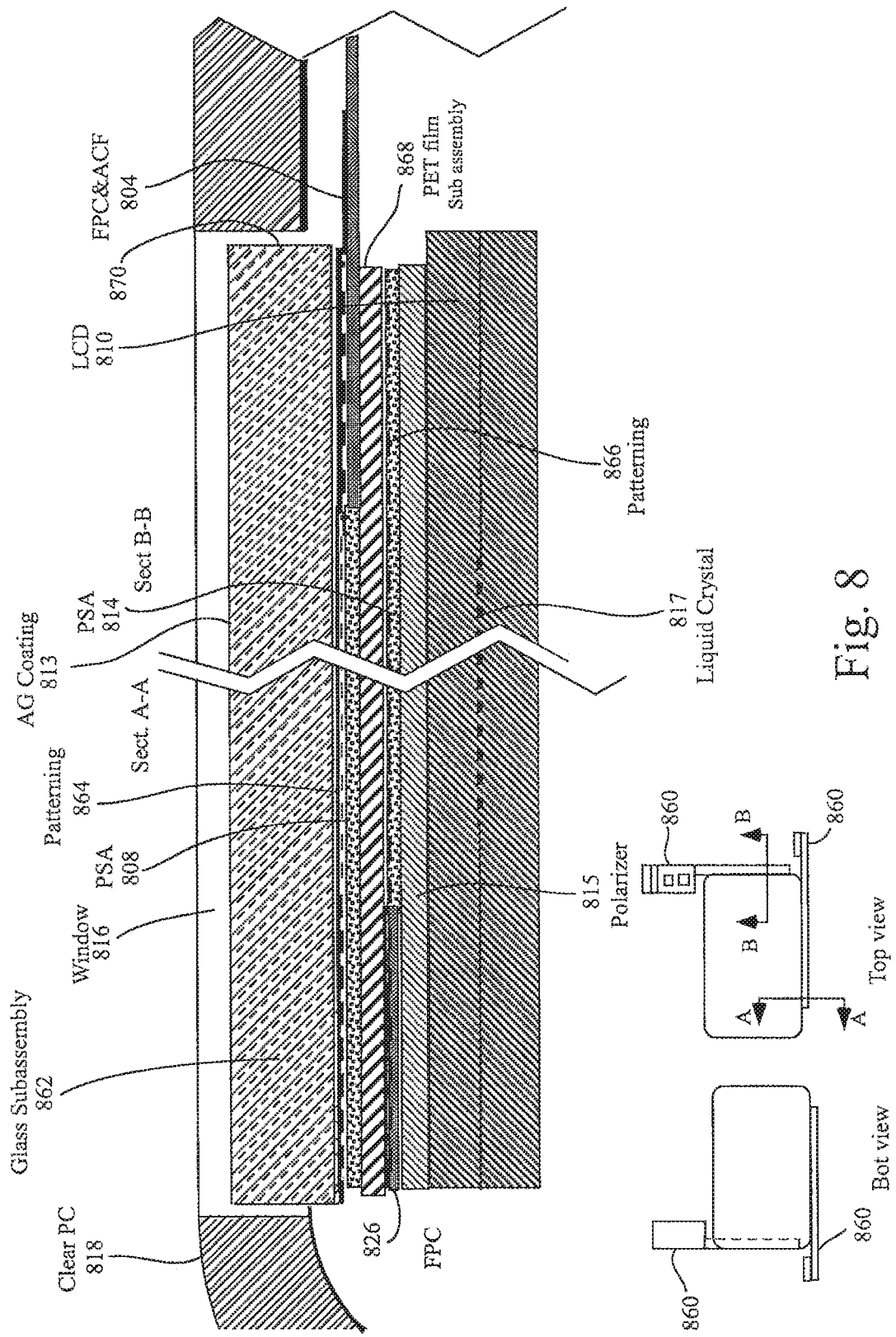
FIG. 8 illustrates an exemplary touch screen sensor panel stackup with columns that can be formed on the back side of a cover glass and rows that can be formed on the bottom side of a separate PET film according to one embodiment of this invention.

FIG. 8 illustrates an exemplary touch screen sensor panel stackup with columns that can be formed on the back side of a cover glass and rows that can be formed on the bottom side of a separate PET film according to one embodiment of this invention.

FIG. 8 shows window 816 formed in 0.9 PC housing 818. Within window 816 can be a stack-up in which the column traces can be formed on the back side of a cover glass and row traces can be formed on the bottom side of a separate PET film. Substantially transparent glass subassembly 862 can have a stackup of layers that can include, in order from top to bottom, for example, substantially transparent AG coating 813 (shown as a dashed line at the top of the subassembly), substantially transparent 0.7 borosilicate or aluminum silicate glass, black mask (in limited areas), and substantially transparent conductive material such as patterned ITO (15 ohm max, with 0.3 lines and 0.030 spaces) formed as columns. Note that the patterned ITO layer is symbolically illustrated in FIG. 8 as a dashed line representing patterning 864. Substantially transparent PET subassembly 868 of thickness 0.188 can be bonded to glass subassembly 862 using PSA 808. One purpose of PET subassembly 868 can be to support a layer of substantially transparent conductive material such as patterned ITO (75 ohm max, with 5.0 lines and 0.050 spaces) that can be formed as rows, and also to provide a low capacitive layer between the rows and columns. The two layers of patterned substantially transparent conductive material can be of the same or different composition. Together, glass subassembly 862 through PET film subassembly 868, and any intervening layers, can form the touchscreen.

FPC 804 can be bonded using 0.125 thick (max) ACF to the back side of glass subassembly 862. FPC 826 can also be bonded using ACF to the rows that can be formed on the bottom of PET subassembly 868. Substantially transparent PSA 814 of 0.125 thickness can be used to bond PET film subassembly 868 to LCD module 810, which can include a 0.2 polarizer layer 815 and liquid crystals 817. The complete assembly can then be mounted into window 816 in housing 818. Note that when the complete assembly is mounted in housing 818, glass subassembly 862 can be either even with or slightly recessed (0.3 Z step) from the top of the window. FIG. 8 also shows additional detail in the thumbnails (at the bottom left of FIG. 8) on how the FPCs 860 can be connected to the sensor panel.

Figure 9:
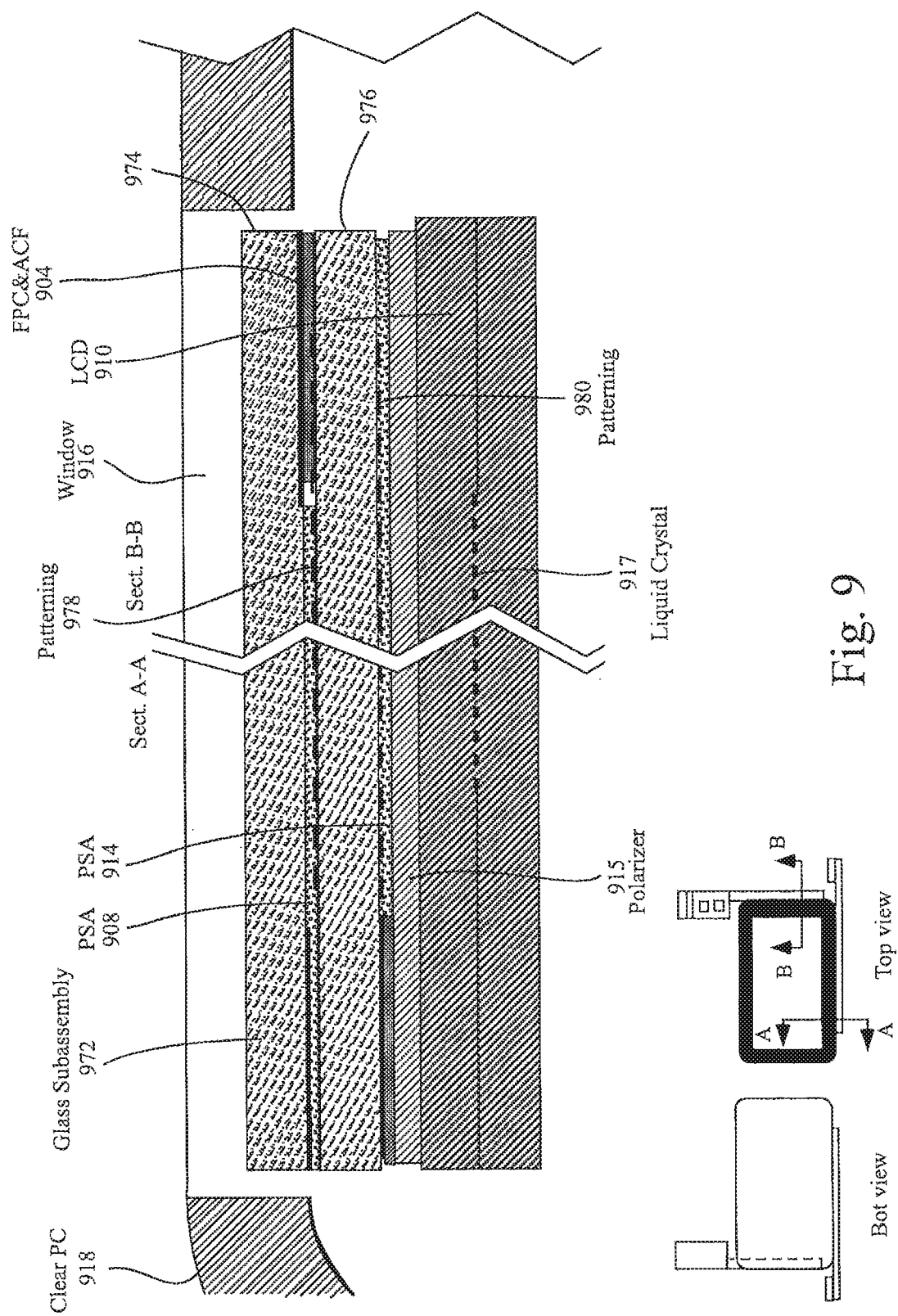
FIG. 9 illustrates an exemplary touch screen sensor panel stackup with columns and rows that can be formed on opposite sides of a single substrate according to one embodiment of this invention.

FIG. 9 illustrates an exemplary touch screen sensor panel stackup with columns and rows that can be formed on opposite sides of a single substrate according to one embodiment of this invention.

FIG. 9 shows window 916 that can be formed in 0.9 PC housing 918. Within window 916 can be a stack-up in which the column traces and row traces can be formed on opposite sides of a single substrate. Substantially transparent glass subassembly 972 can have a stackup of layers that can include, in order from top to bottom, substantially transparent AG coating, substantially transparent 0.5 borosilicate or aluminum silicate glass, and black mask (in limited areas). Substantially transparent glass subassembly 976 can have a stackup of layers that can include, in order from top to bottom, substantially transparent conductive material such as patterned ITO (15 ohm max, with 0.3 lines and 0.030 spaces) formed as columns, substantially transparent 0.5 borosilicate or aluminum silicate glass, and substantially transparent conductive material such as patterned ITO (75 ohm max, with 0.5 lines and 0.050 spaces) formed as rows. The two layers of patterned substantially transparent conductive material can be of the same or different composition. PSA 908 can be used to bond glass subassemblies 972 and 976 together. Note that the patterned ITO layers are symbolically illustrated in FIG. 9 as dashed lines representing patterning 978 and 980.

FPC can be bonded using 0.125 thick (max) ACF to the columns and rows on either side of glass subassembly 976. Substantially transparent PSA 914 of 0.125 thickness can be used to bond glass subassembly 976 to LCD module 910, which can include polarizer layer 915 and liquid crystals 917.

Figure 10:
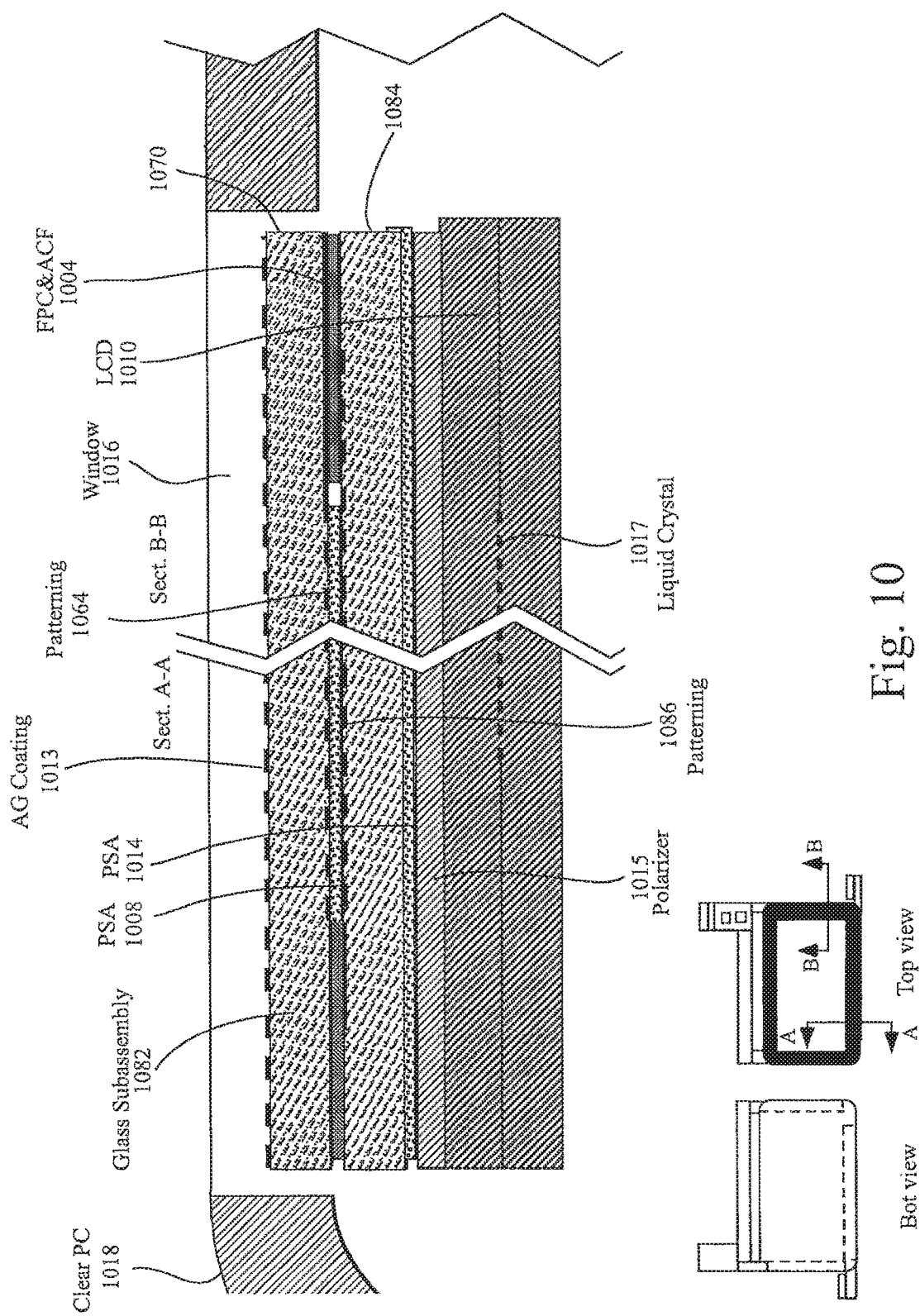
FIG. 10 illustrates an exemplary touch screen sensor panel stackup with columns that can be formed on the back side of a cover glass and rows that can be formed on the top side of a separate glass substrate according to one embodiment of this invention.

FIG. 10 illustrates an exemplary touch screen sensor panel stackup with columns that can be formed on the back side of a cover glass and rows that can be formed on the top side of a separate glass substrate according to one embodiment of this invention.

FIG. 10 shows window 1016 that can be formed in 0.9 PC housing 1018. Within window 1016 can be a stack-up in which the column traces can be formed on the back side of a cover glass and row traces can be formed on the top side of a separate PET film. Substantially transparent glass subassembly 1082 can have a stackup of layers that can include, in order from top to bottom, substantially transparent AG coating 1013 (shown as a dashed line at the top of the subassembly), substantially transparent 0.5 borosilicate or aluminum silicate glass, black mask (in limited areas), and substantially transparent conductive material such as patterned ITO (15 ohm max, with 0.3 lines and 0.030 spaces) that can be formed as columns. Substantially transparent glass subassembly 1084 can have a stackup of layers that can include, in order from top to bottom, substantially transparent conductive material such as patterned ITO (15 ohm max, with 0.3 lines and 0.030 spaces) formed as columns, substantially transparent 0.5 borosilicate or aluminum silicate glass, and a continuous sheet of substantially transparent ITO (500 ohm max). The two layers of patterned substantially transparent conductive material can be of the same or different composition. Glass subassemblies 1082 and 1084 can be bonded together with substantially transparent PSA 1008. Note that the patterned ITO layers are symbolically illustrated in FIG. 10 as dashed lines representing patterning 1064 and 1086. Together, glass subassembly 1082 through glass subassembly 1084, and any intervening layers, can form the touchscreen.

FPCs can be bonded using 0.125 thick (max) ACF to the back side of glass subassembly 1082 and the top side of glass subassembly 1084. Substantially transparent PSA 1014 of 0.125 thickness can be used to bond glass subassembly 1084 to LCD module 1010, which can include a 0.2 polarizer layer 1015 and liquid crystals 1017. The complete assembly can then be mounted into window 1016 in housing 1018. Note that when the complete assembly is mounted in housing 1018, glass subassembly 1082 can be either even with or slightly recessed (0.3 Z step) from the top of the window.

Figure 11A:
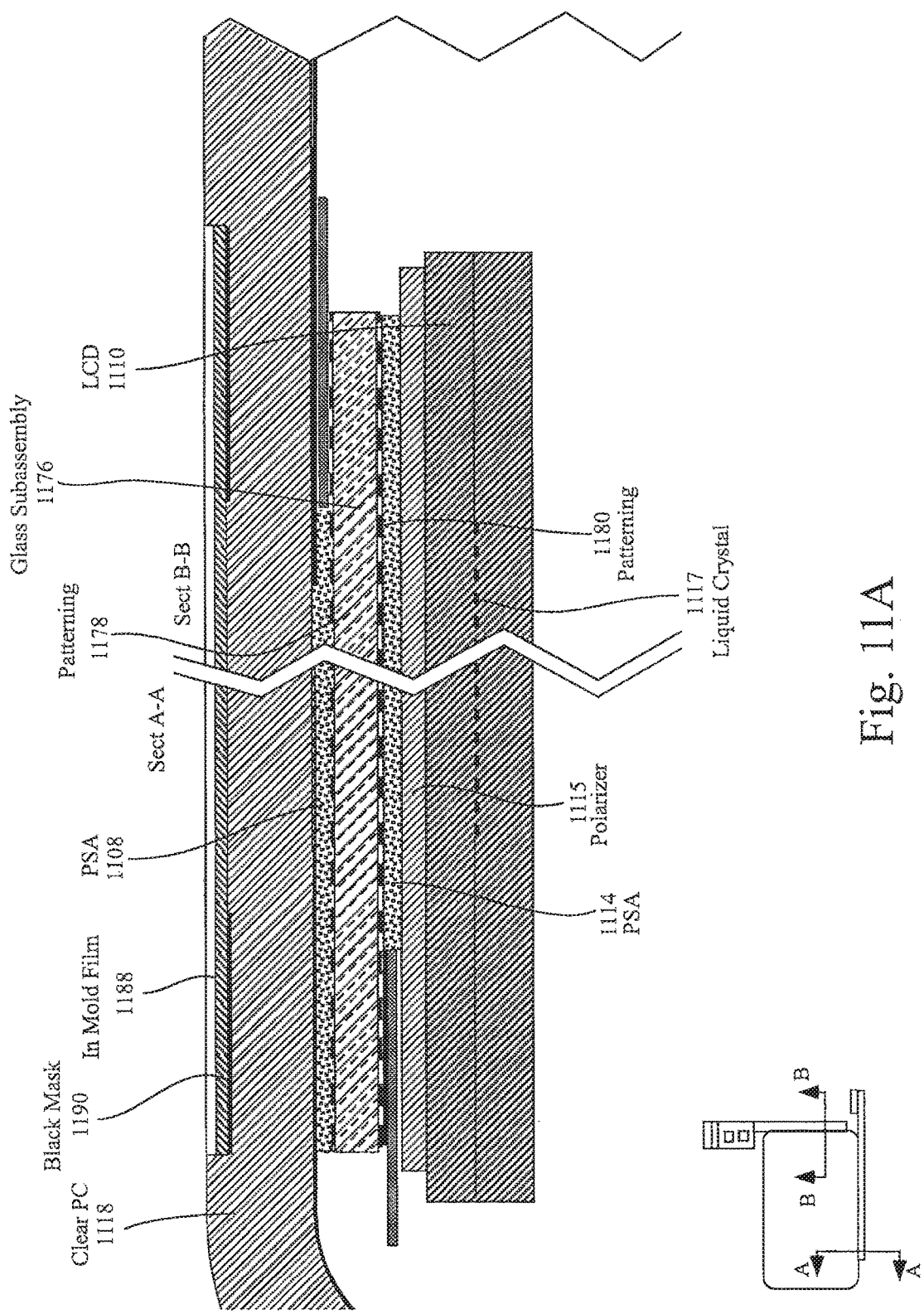
Figure 11B:
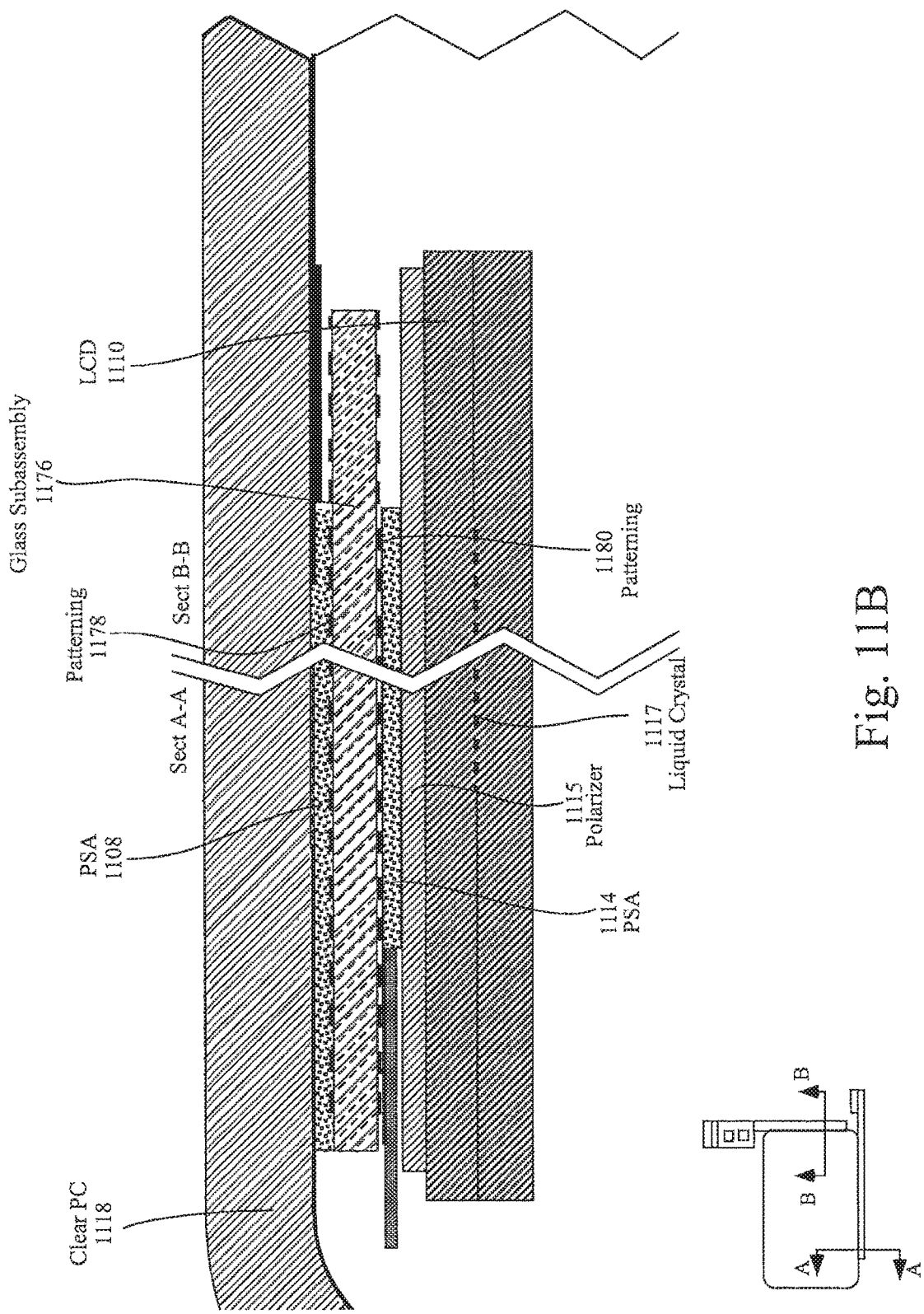
Figure 11C:
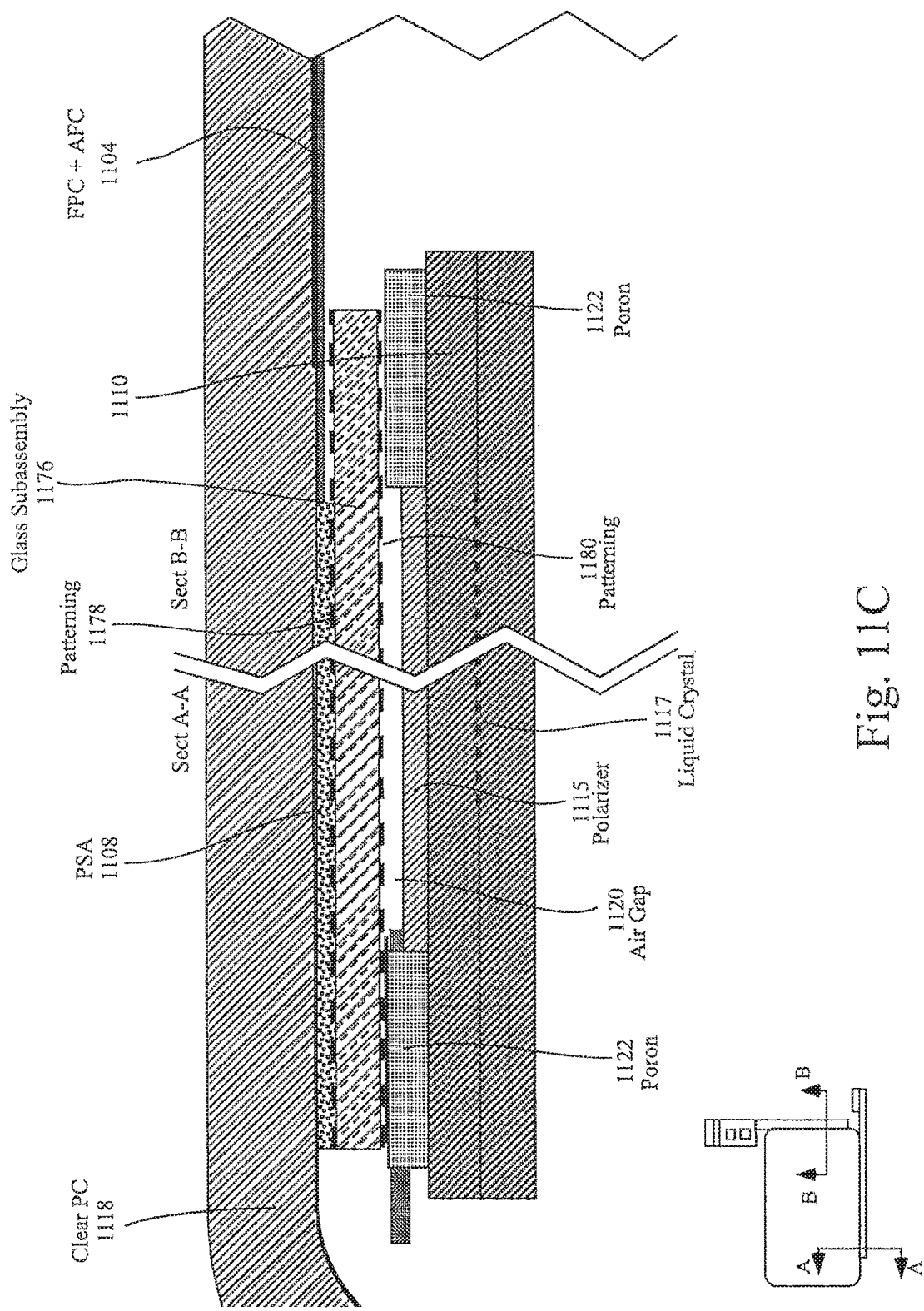

FIGS. 11a-11c illustrate various exemplary touch screen sensor panel stackups with columns and rows that can be formed on opposite sides of a single substrate according to one embodiment of this invention.

FIG. 11a shows an approximately 0.9 substantially transparent PC housing 1118. Substantially transparent hard film or glass 1188 and blackmask 1190 (in limited areas) can be inserted into the mold when the housing 1118 is being injection-molded to provide a hard surface and hiding properties (where the blackmask is placed). Bonded to housing 1118 using 0.100 substantially transparent PSA 1108 can be a stack-up in which the column traces and row traces can be formed on opposite sides of a single substrate. Substantially transparent glass subassembly 1176 can have a stackup of layers that can include, in order from top to bottom, substantially transparent conductive material such as patterned ITO (15 ohm max, with 0.3 lines and 0.030 spaces) formed as columns, substantially transparent 0.5 borosilicate or aluminum silicate glass, and substantially transparent conductive material such as patterned ITO (75 ohm max, with 5.0 lines and 0.050 spaces) formed as rows. The two layers of patterned substantially transparent conductive material can be of the same or different composition. Note that the patterned ITO layers are symbolically illustrated in FIG. 11a as dashed lines representing patterning 1178 and 1180.

FPCs can be bonded using 0.125 thick (max) ACF to the columns and rows on either side of glass subassembly 1176. Substantially transparent PSA 1114 of 0.100 thickness can be used to bond glass subassembly 1176 to LCD module 1110, which can include polarizer layer 1115 and liquid crystals 1117.

FIG. 11b is similar to FIG. 11a, except that hard film or glass and blackmask are not formed in the housing 1118.

FIG. 11c is similar to FIG. 11b, except that glass subassembly 1176 is not fully laminated to LCD module 1110. Instead, air gap 1120 can be formed between them, and a ring of Poron 1122 can be formed around the perimeter of glass subassembly 1176.

Figure 12:
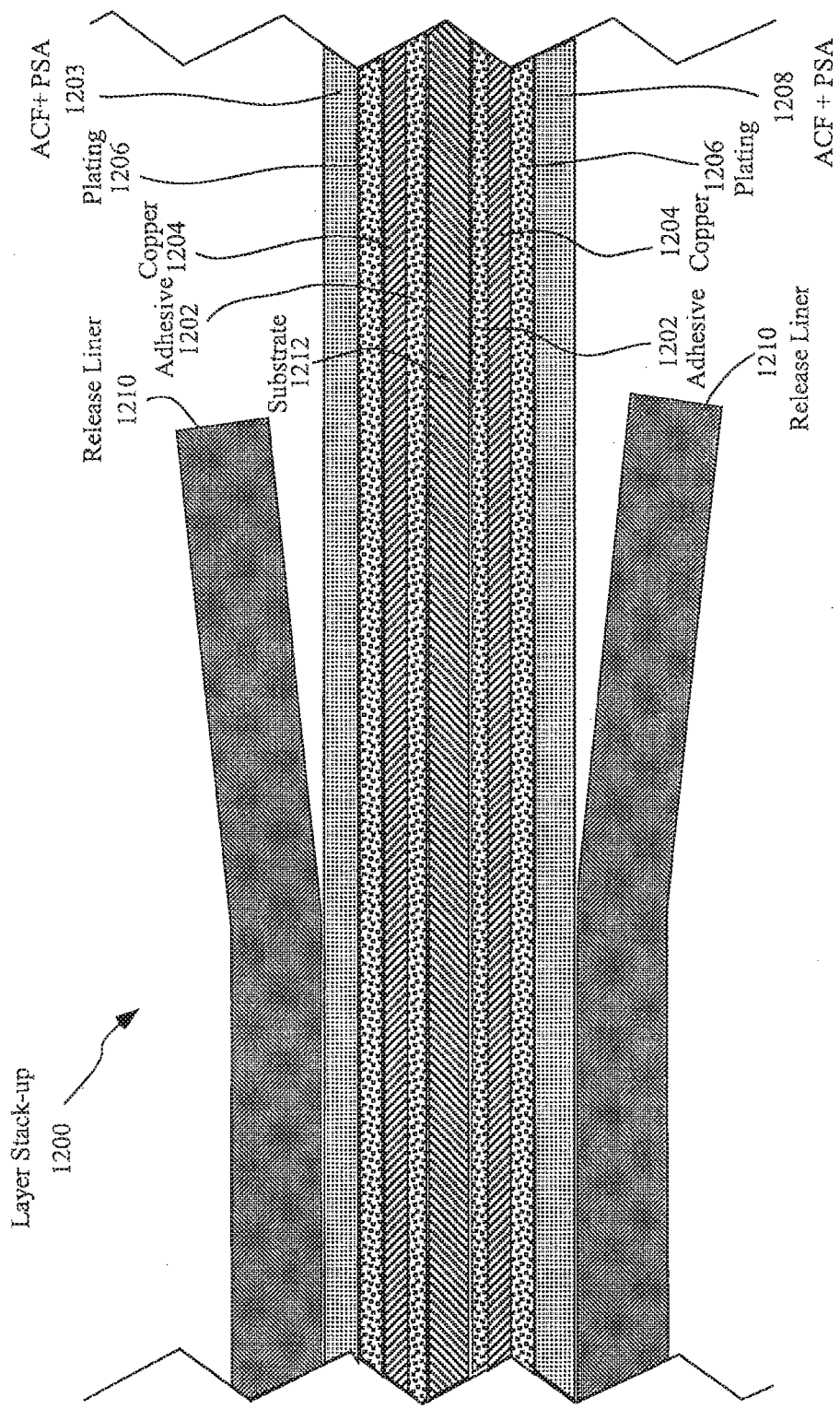
FIG. 12 illustrates a side view of an exemplary flexible printed circuit (FPC) stackup according to one embodiment of this invention.

FIG. 12 illustrates a side view of an exemplary FPC stackup according to one embodiment of this invention. FIG. 12 shows an FPC stackup for the thin wings or strips on the FPCs that can include release liner 1210, 0.025 ACF and PSA 1208, 0.012 via plating 1206, 0.018 copper 1204, 0.012 adhesive for the copper 1202, 0.025 polyamide substrate 1212, 0.012 adhesive for the copper 1202, 0.018 copper 1204, 0.012 via plating 1206, 0.025 ACF and PSA 1208, and release liner 1210.

Figure 13A:
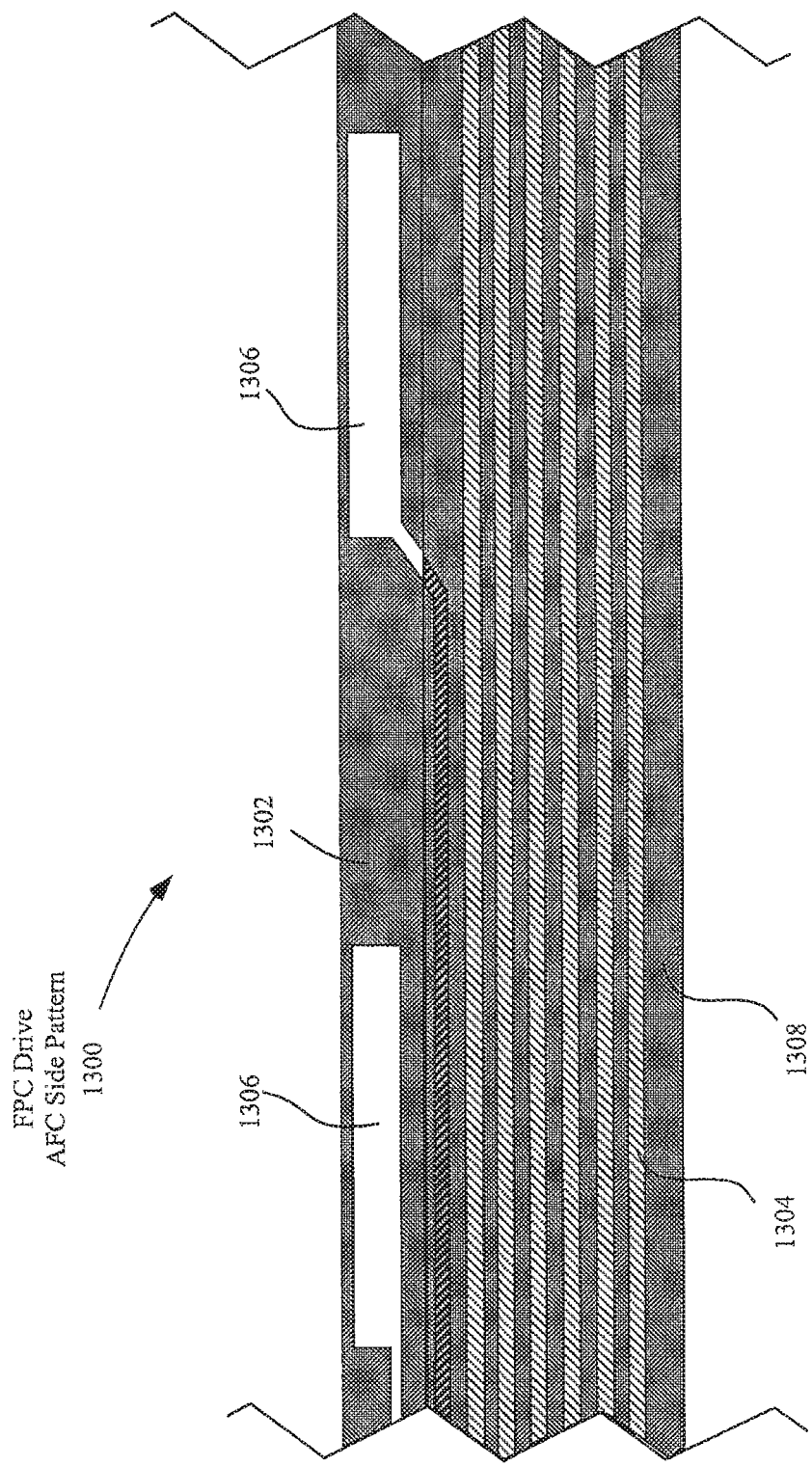
FIGS. 13a and 13b illustrate top views of an exemplary FPC design according to one embodiment of this invention.
Figure 13B:
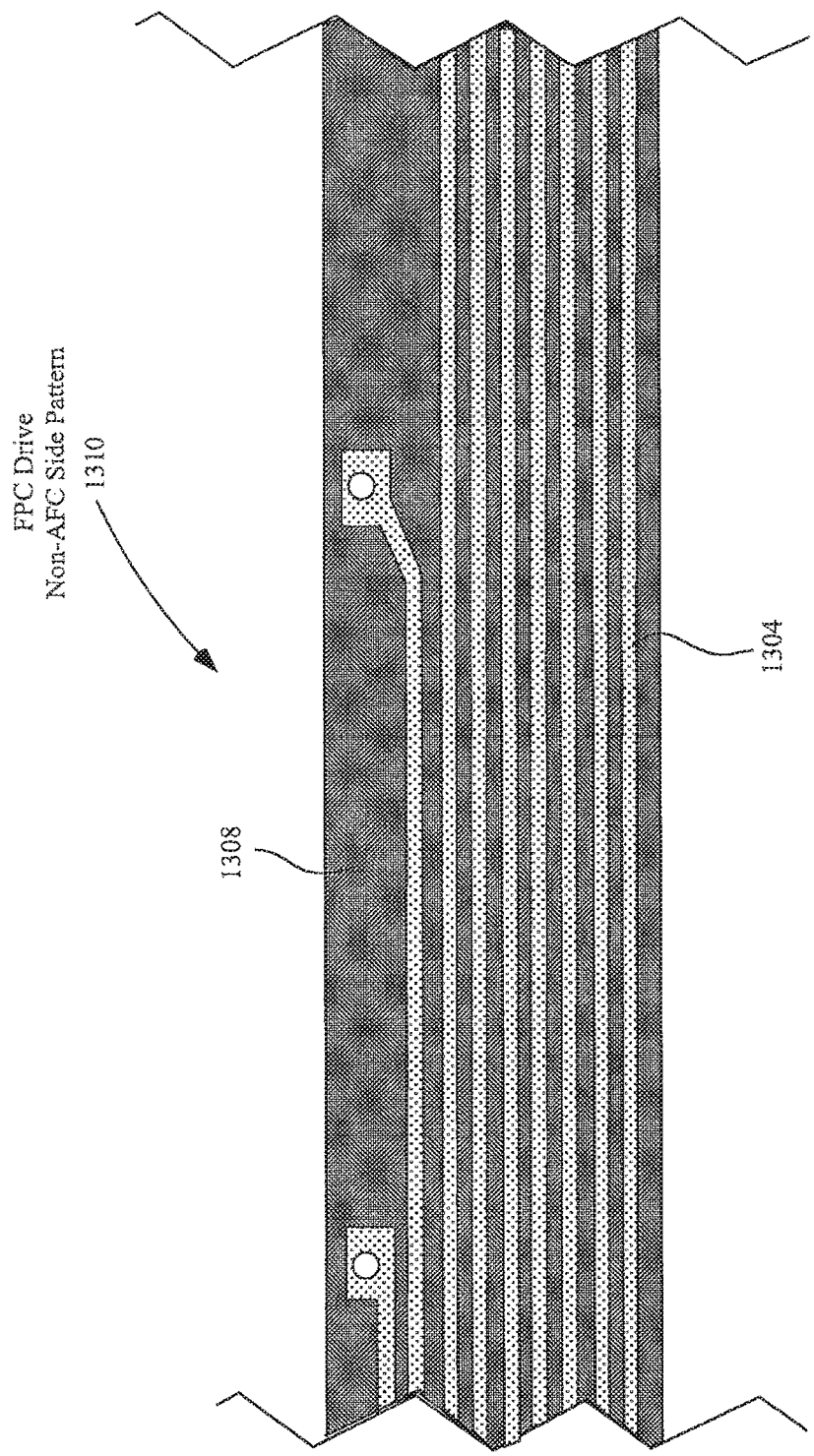

FIGS. 13a and 13b illustrate top views of an exemplary FPC design according to one embodiment of this invention. FIG. 13a shows an ACF-side view of the FPC that connects to the drive rows, including ACF pads 1306 at which the FPC can be bonded to the glass substrate using ACF 1302 that can be 0.5 wide and 0.025 thick. However, traces 1304 having 0.100 widths and 0.100 spacing can be bonded to the glass substrate using insulating PSA 1308 that can be 1.3 wide and 0.025 thick. FIG. 13b shows the non-ACF-side top view of the FPC traces that can connect to the drive rows, including traces 1304 that can be covered by insulating PSA 1308, 0.018 thick.

Figure 14:
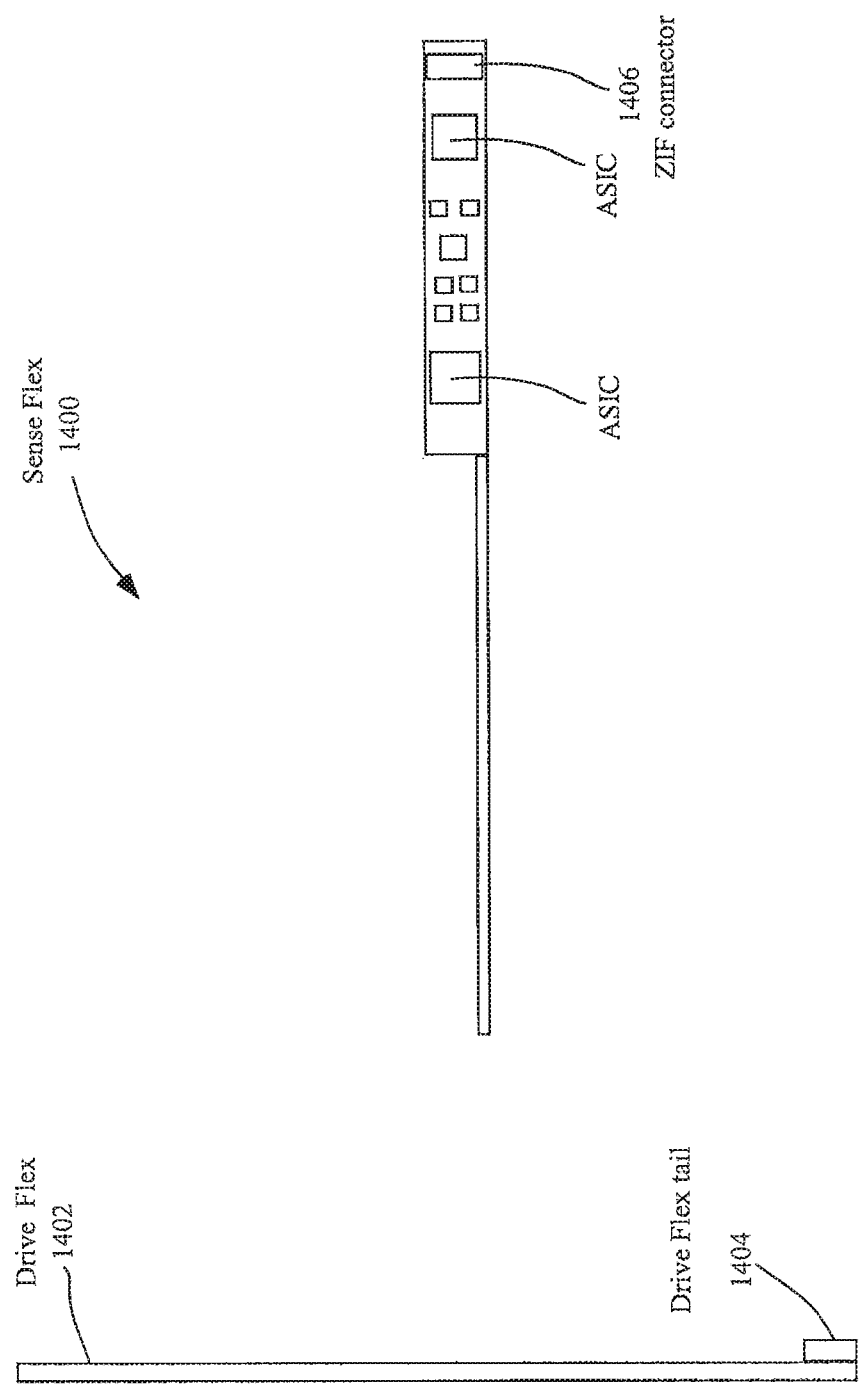
FIG. 14 illustrates top views of exemplary FPC designs that can connect to the rows and columns of the sensor panel according to one embodiment of this invention.

FIG. 14 illustrates top views of exemplary FPC designs for connecting to the rows and columns of the sensor panel according to one embodiment of this invention. FIG. 14 shows detail of drive FPC 1402 and sense FPC 1400, including drive flex tail 1404 and zero insertion force (ZIF) connector 1406.

FIG. 15 illustrates a side view of an exemplary FPC stackup according to one embodiment of this invention. FIG. 15 shows FPC drive layer stackup 1500 for the thin wings or strips on the FPCs that can include 0.012 coverlay 1514, 0.012 adhesive 1502, 0.025 ACP 1508, 0.012 via plating 1506, 0.018 copper 1504, 0.012 adhesive for the copper 1502, 0.025 polyamide substrate 1512, 0.012 adhesive for the copper 1502, 0.018 copper 1504, 0.012 via plating 1506, 0.012 adhesive 1502, and 0.012 coverlay 1514.

Figure 16A:
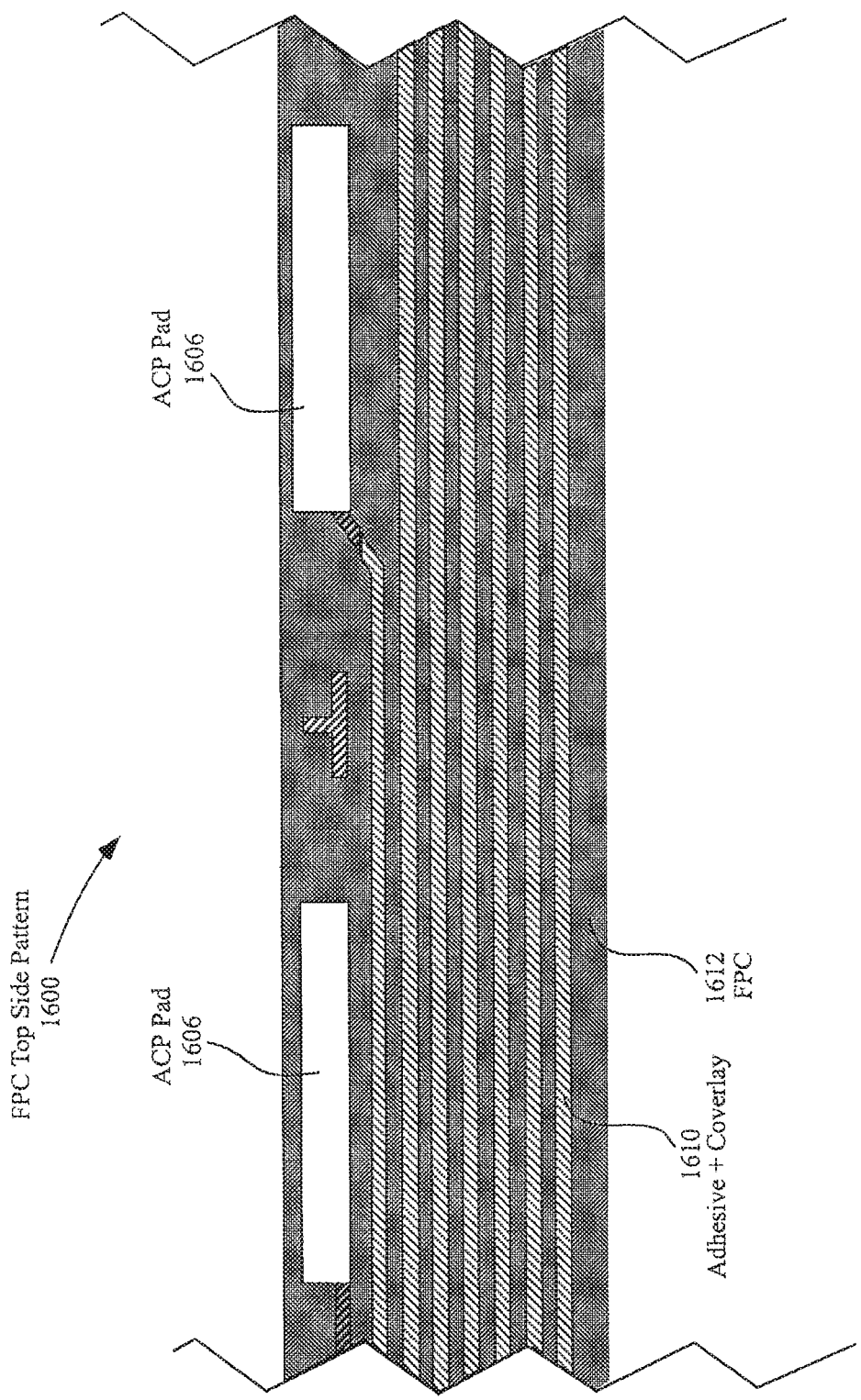
FIGS. 16a-16c illustrate top views of an exemplary FPC design according to one embodiment of this invention.
Figure 16B:
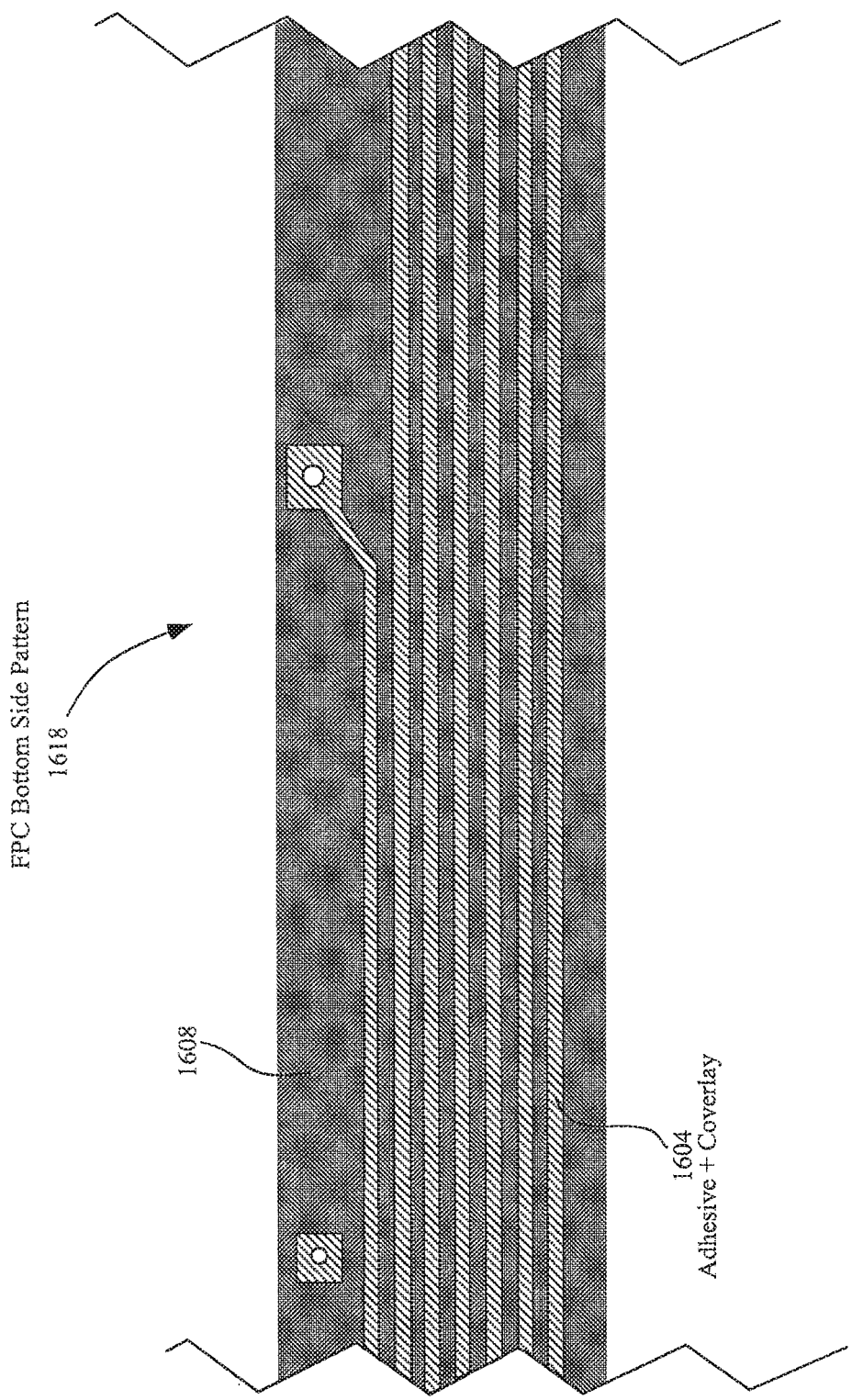
Figure 16C:
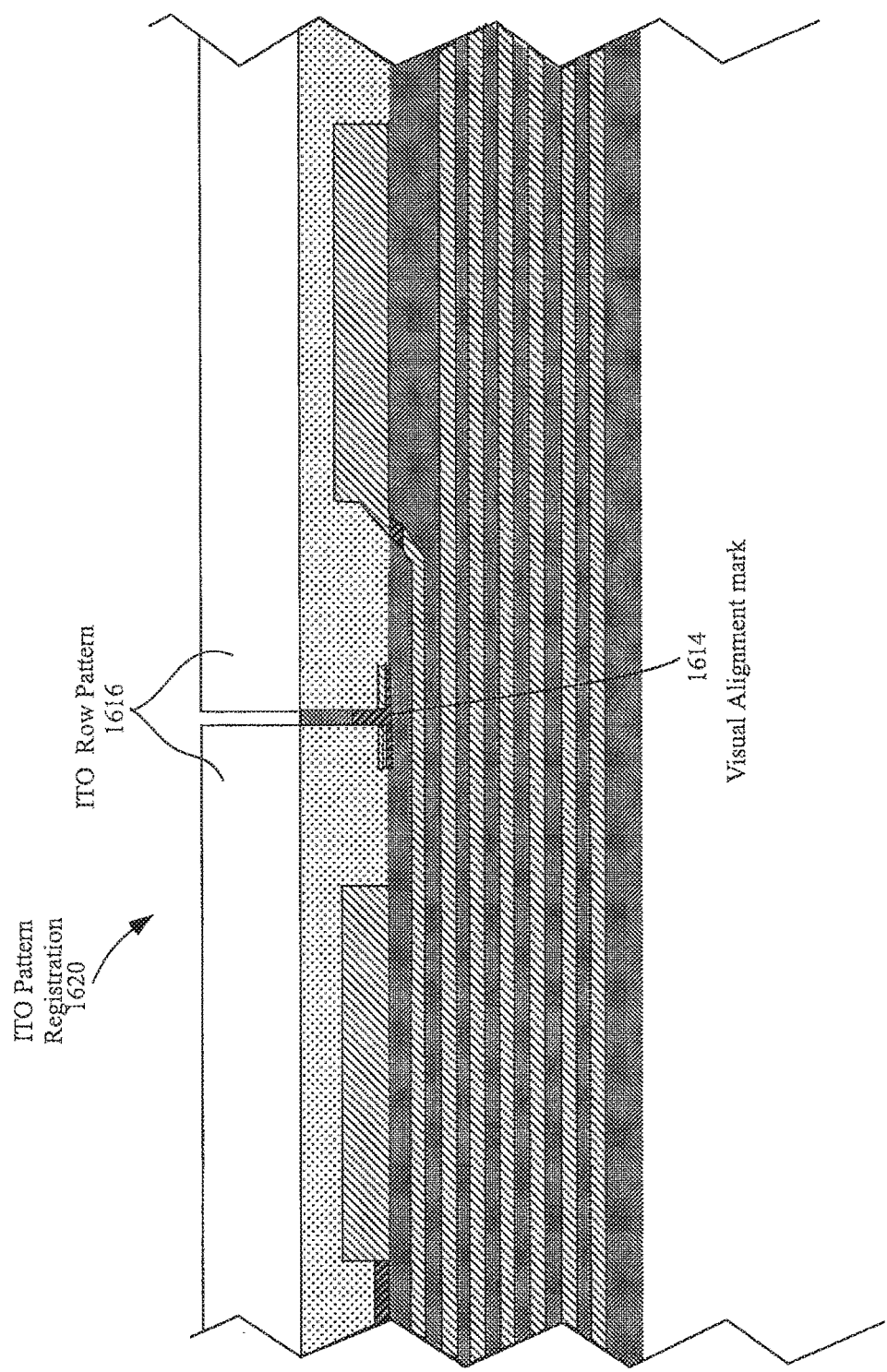

FIGS. 16a-16c illustrate top views of an exemplary FPC design according to one embodiment of this invention. FIG. 16a shows a non-ACF-side view 1600 of the FPC that can connect to the drive rows, including ACF pads 1606 having ACP of 0.025 thickness at which the FPC can be bonded to the glass substrate. However, traces 1610 having 0.075 widths and 0.075 spacing can be bonded to the glass substrate using insulating PSA 1612 that can be 0.025 thick. FIG. 16b shows the ACF-side top view 1618 of the FPC traces that can connect to the drive rows, including traces 1604 that can have 0.075 widths and 0.075 spacing, covered by insulating PSA 1608, 0.025 thick. FIG. 16c shows ITO pattern registration 1620 with visual alignment mark 1614 separating ITO row patterns 1616.

Figure 17A:
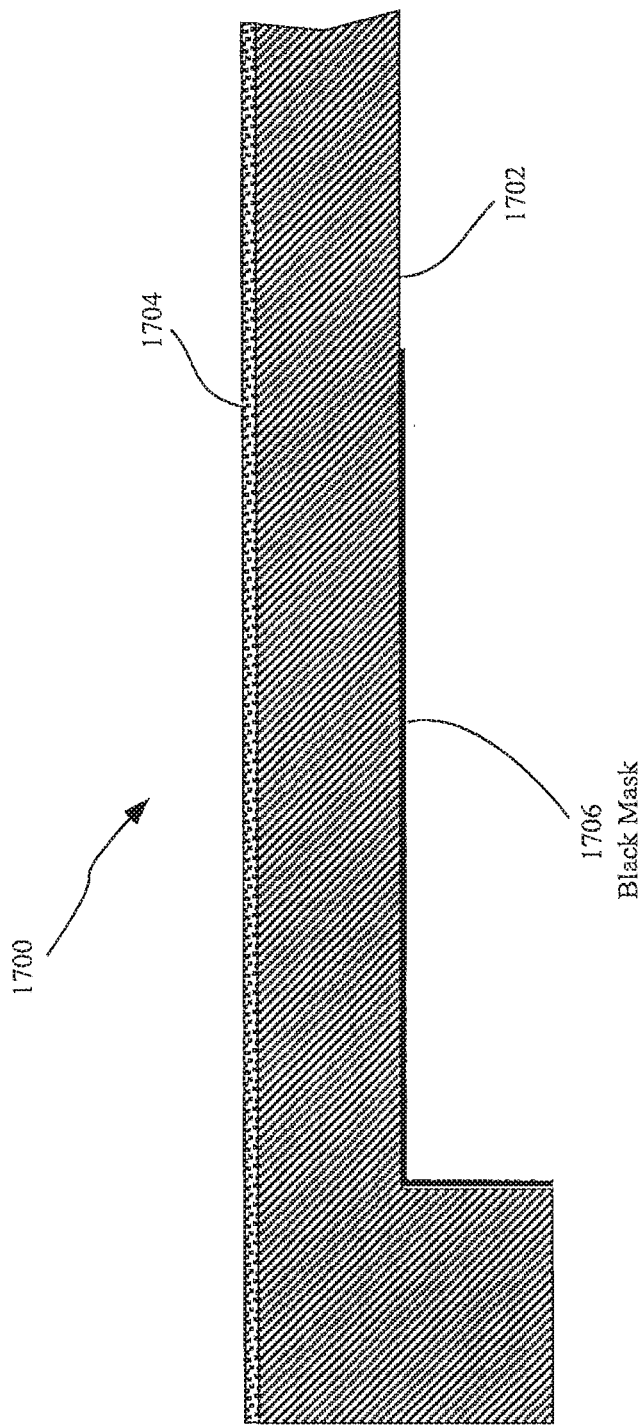
FIG. 17a illustrates an exemplary partially fabricated cover for a touch screen sensor panel according to one embodiment of this invention.

FIG. 17a illustrates an exemplary partially fabricated cover for a touch screen sensor panel according to one embodiment of this invention. FIG. 17a shows plastic top housing 1700 (e.g., injection molded polycarbonate or acrylic of 0.80 thickness) for an individual part with a corner, with hard coat/anti-glare coating 1704 that can be formed on top and black mask 1706 that can be selectively applied to the inside of housing 1702.

Figure 17B:
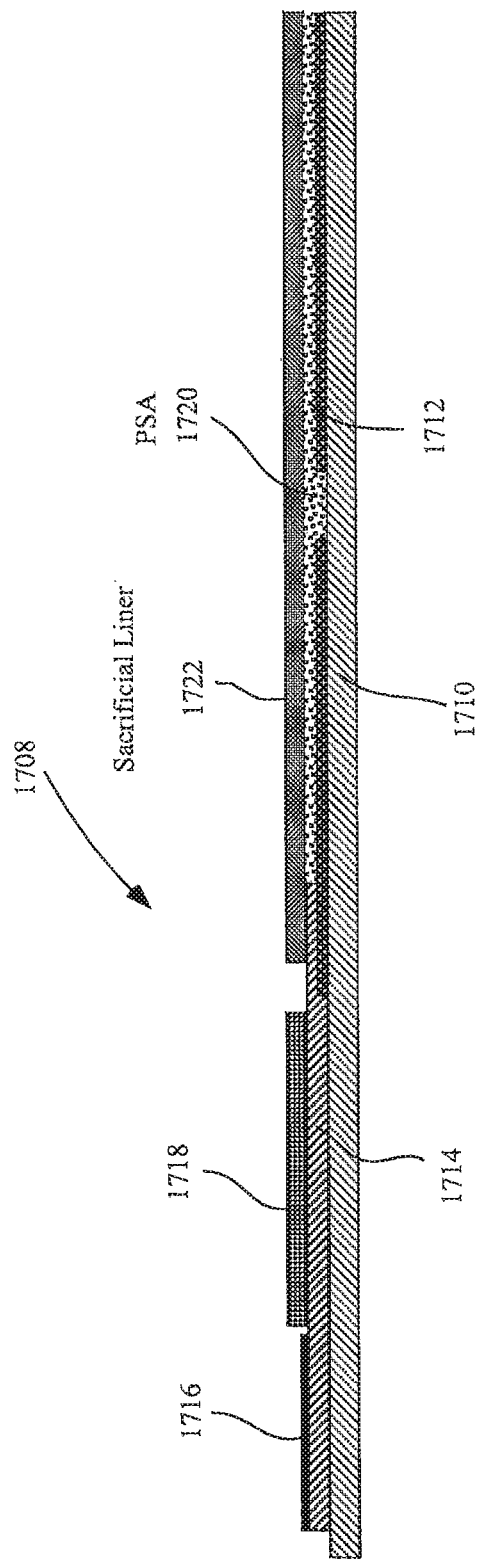
FIG. 17b illustrates an exemplary top PET film according to one embodiment of this invention.

FIG. 17b illustrates an exemplary top PET film according to one embodiment of this invention. First, ITO 1712 (e.g., having a resistivity of 40 to 500 ohms per square) can be sputtered onto PET film 1710 (e.g. PET or polymer having a dielectric constant of 3 to 4 and a thickness of about 25 to 75 microns) and patterned (e.g. into 100 micron lines and spaces) using standard photolithography and etching techniques, or laser oblation. Next, a layer of metal (silkscreened silver ink) 1714 (e.g., silver ink having a resistivity of 1 ohm per square max) can be applied over the ITO and patterned (e.g. into 200 micron lines and spaces). A protective sheet of black carbon 1716 (e.g. having 0.25 lines and spaces) can then be printed over the silver ink traces to serve as a protective coating for connector contacts. A tail coverlay 1718 (e.g., PET having a thickness of 25 to 75 microns) can then be formed over the silver ink traces for protection. A sheet of PSA 1720 (e.g., having a thickness of 25 microns) and a sacrificial liner can then be formed over the PET film and ITO. A bottom PET film can be formed using the same process.

Figure 17C:
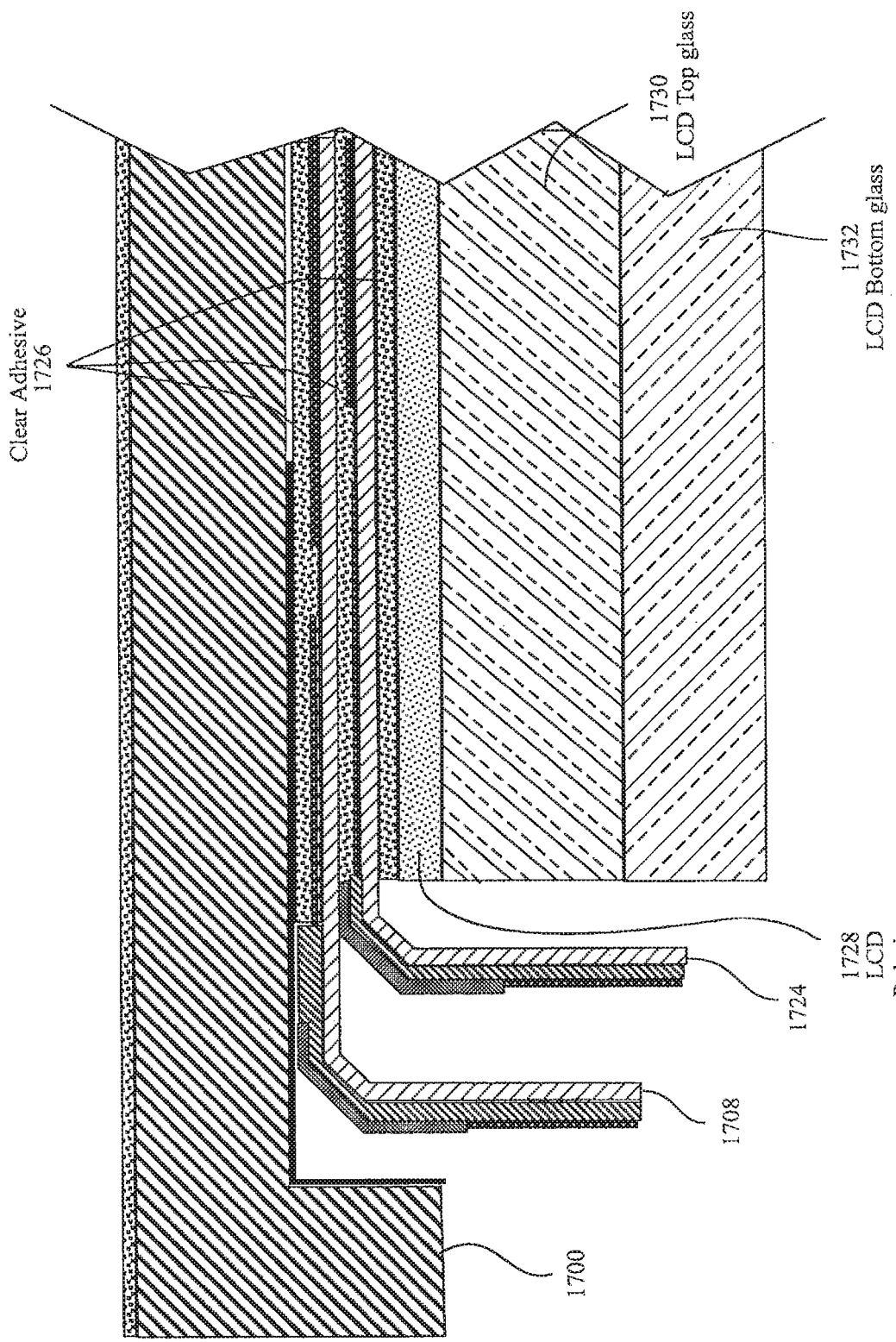
FIG. 17c illustrates an exemplary touch screen sensor panel stackup with columns and rows that can be formed on two separate PET films according to one embodiment of this invention.

FIG. 17c illustrates an exemplary touch screen sensor panel stackup with columns and rows that can be formed on two separate top and bottom PET films 1708 and 1724 according to one embodiment of this invention. Optically clear adhesive 1726 can be used to bond the top and bottom PET films between a cover 1700 and an LCD module that can include LCD polarizer 1728, LCD top glass 1730, and LCD bottom glass 1732.

Figure 18:
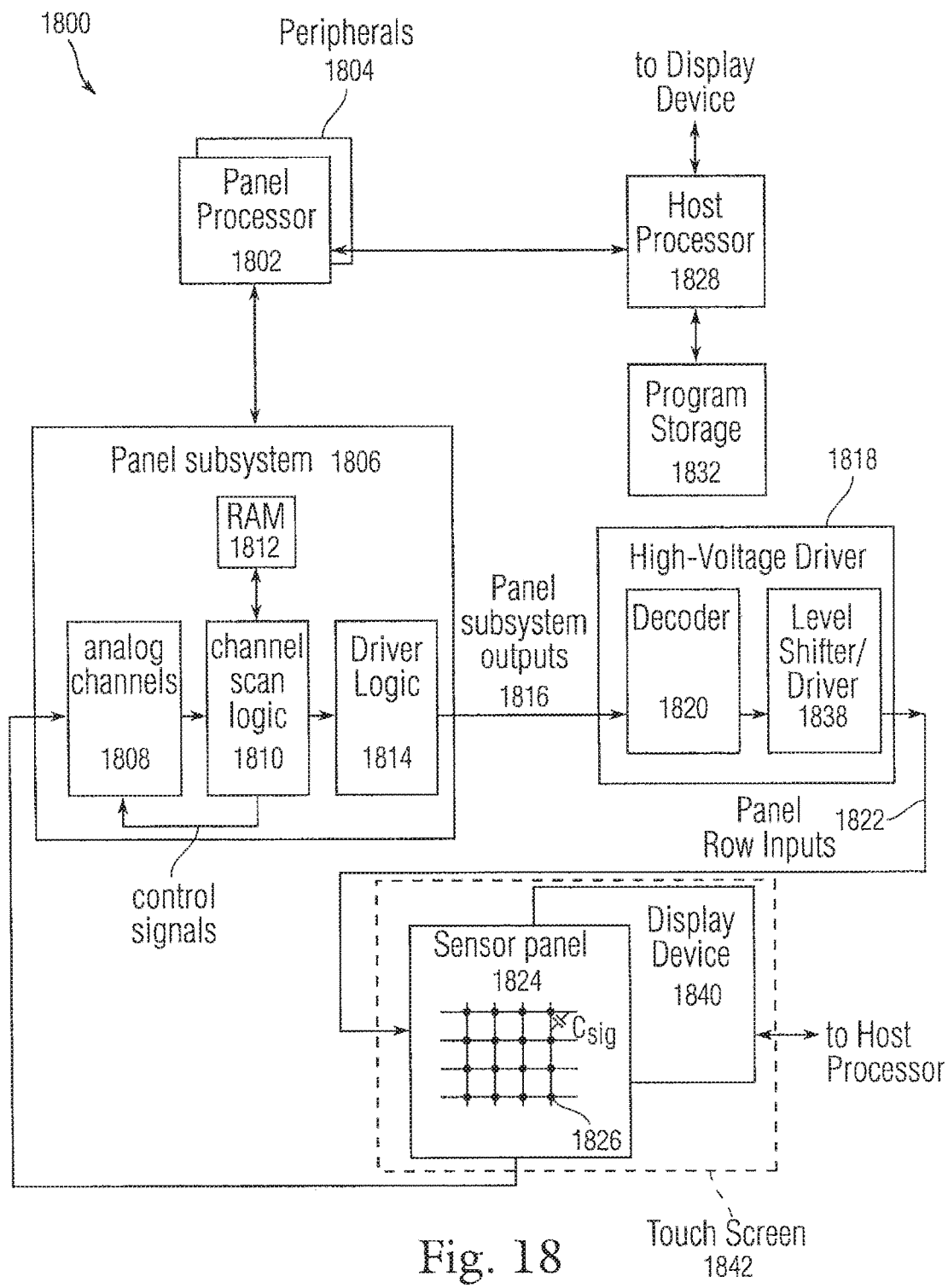
FIG. 18 illustrates an exemplary computing system that can be operable with the touchscreen stackups according to one embodiment of this invention.

FIG. 18 illustrates exemplary computing system 1800 operable with the touchscreen stackups described above according to embodiments of this invention. Touchscreen 1842, which can include sensor panel 1824 and display device 1840, can be connected to other components in computing system 1800 through connectors integrally formed on the sensor panel, or using flex circuits. Computing system 1800 can include one or more panel processors 1802 and peripherals 1804, and panel subsystem 1806. The one or more processors 1802 can include, for example, ARM968 processors or other processors with similar functionality and capabilities. However, in other embodiments, the panel processor functionality can be implemented instead by dedicated logic such as a state machine. Peripherals 1804 can include, but are not limited to, random access memory (RAM) or other types of memory or storage, watchdog timers and the like.

Panel subsystem 1806 can include, but is not limited to, one or more analog channels 1808, channel scan logic 1810 and driver logic 1814. Channel scan logic 1810 can access RAM 1812, autonomously read data from the analog channels and provide control for the analog channels. This control can include multiplexing columns of multi-touch panel 1824 to analog channels 1808. In addition, channel scan logic 1810 can control the driver logic and stimulation signals being selectively applied to rows of multi-touch panel 1824. In some embodiments, panel subsystem 1806, panel processor 1802 and peripherals 1804 can be integrated into a single application specific integrated circuit (ASIC).

Driver logic 1814 can provide multiple panel subsystem outputs 1816 and can present a proprietary interface that drives high voltage driver 1818. High voltage driver 1818 can provide level shifting from a low voltage level (e.g. complementary metal oxide semiconductor (CMOS) levels) to a higher voltage level, providing a better signal-to-noise (S/N) ratio for noise reduction purposes. Panel subsystem outputs 1816 can be sent to decoder 1820 and level shifter/driver 1838, which can selectively connect one or more high voltage driver outputs to one or more panel row inputs 1822 through a proprietary interface and enable the use of fewer high voltage driver circuits in the high voltage driver 1818. Each panel row input 1822 can drive one or more rows in a multi-touch panel 1824. In some embodiments, high voltage driver 1818 and decoder 1820 can be integrated into a single ASIC. However, in other embodiments high voltage driver 1818 and decoder 1820 can be integrated into driver logic 1814, and in still other embodiments high voltage driver 1818 and decoder 1820 can be eliminated entirely.

Computing system 1800 can also include host processor 1828 for receiving outputs from panel processor 1802 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1828 can also perform additional functions that may not be related to panel processing, and can be coupled to program storage 1832 and display device 1840 such as an LCD for providing a user interface (UI) to a user of the device.

As mentioned above, multi-touch panel 1824 can in some embodiments include a capacitive sensing medium that can have a plurality of row traces or driving lines and a plurality of column traces or sensing lines separated by a dielectric. In some embodiments, the dielectric material can be transparent, such as PET or glass. The row and column traces can be formed from a transparent conductive medium such as ITO or antimony tin oxide (ATO), although other non-transparent materials such as copper can also be used. In some embodiments, the row and column traces can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as may be used herein are intended to encompass not only orthogonal grids, but the intersecting traces of other geometric configurations having first and second dimensions (e.g. the concentric and radial lines of a polar-coordinate arrangement).

At the "intersections" of the traces, where the traces can pass above and below each other (but do not make direct electrical contact with each other), the traces can essentially form two electrodes. Each intersection of row and column traces can represent a capacitive sensing node and can be viewed as picture element (pixel) 1826, which can be particularly useful when multi-touch panel 1824 is viewed as capturing an "image" of touch. (In other words, after panel subsystem 1806 has determined whether a touch event has been detected at each touch sensor in multi-touch panel 1824, the pattern of touch sensors in the multi-touch panel at which a touch event occurred can be viewed as an "image" of touch (e.g. a pattern of fingers touching the panel).) When the two electrodes are at different potentials, each pixel can have an inherent self or mutual capacitance formed between the row and column electrodes of the pixel. If an AC signal is applied to one of the electrodes, such as by exciting the row electrode with an AC voltage at a particular frequency, an electric field and an AC or signal capacitance can be formed between the electrodes, referred to as Csig. The presence of a finger or other object near or on multi-touch panel 1824 can be detected by measuring changes to Csig. The columns of multi-touch panel 1824 can drive one or more analog channels 1808 in panel subsystem 1806. In some embodiments, each column can be coupled to one dedicated analog channel 1808. However, in other embodiments, the columns can be couplable via an analog switch to a fewer number of analog channels 1808.

The touchscreen stackups described above can be advantageously used in the system of FIG. 18 to provide a space-efficient touch sensor panel and UI.

Figure 19A:
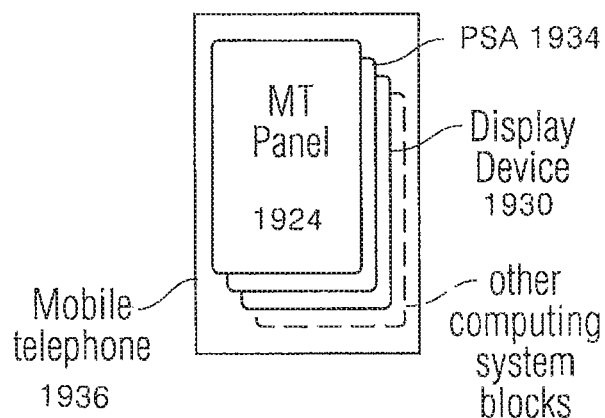
FIG. 19a illustrates an exemplary mobile telephone that can include the touchscreen stackups and computing system according to embodiments of the invention.
Figure 19B:
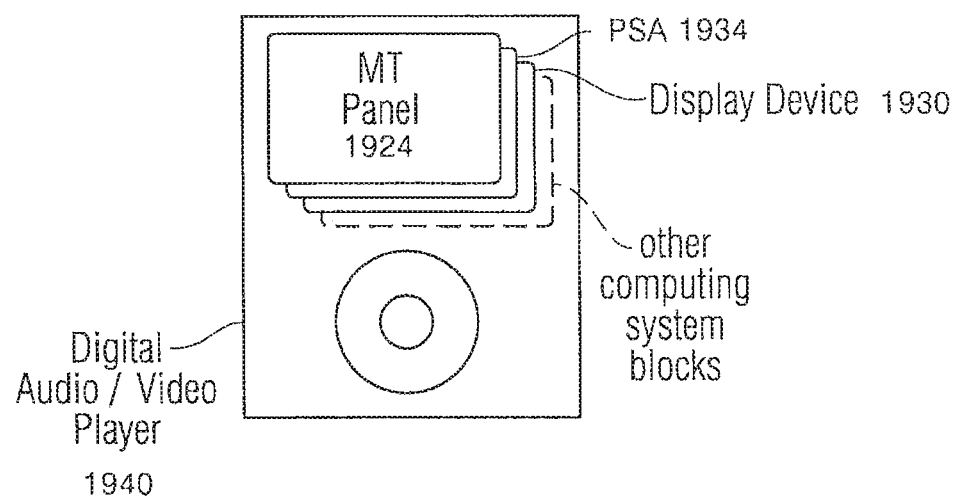
FIG. 19b illustrates an exemplary digital audio/video player that can include the touchscreen stackups and computing system according to embodiments of the invention.

FIG. 19a illustrates exemplary mobile telephone 1936 that can include the touchscreen stackups and computing system described above according to embodiments of the invention. PSA 1934 can be used to bond sensor panel 1924 to display device (e.g. LCD module) 1930. FIG. 19b illustrates exemplary digital audio/video player 1940 that can include the touchscreen stackups and computing system described above according to embodiments of the invention. The mobile telephone and digital audio/video player of FIGS. 19a and 19b can advantageously benefit from the touchscreen stackups described above because the touchscreen stackups can allow these devices to be smaller and less expensive, which are important consumer factors that can have a significant effect on consumer desirability and commercial success.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A multi-touch sensor panel, comprising:
a first subassembly having a front side capable of being touched, and a back side opposite the front side;
a plurality of first traces of a first substantially transparent conductive material formed on the back side of the first subassembly;
a plurality of second traces of a second substantially transparent conductive material;
a second subassembly different from the first subassembly, the second subassembly having a front side bonded to the first subassembly and disposed between the first traces and the second traces such that the plurality of second traces are formed on a back side of the second subassembly; and
an adhesive provided to bond the first subassembly to the second subassembly; and
wherein the plurality of second and the plurality of first traces are oriented to cross over each other at crossover locations separated by the dielectric material, the crossover locations forming mutual capacitance sensors for detecting one or more touches on the front side of the first subassembly.

2. The multi-touch sensor panel of claim 1, wherein the first and second substantially transparent conductive materials are the same.

3. The multi-touch sensor panel of claim 1, wherein the second subassembly comprises a polyethylene terephthalate (PET) material.

4. The multi-touch sensor panel of claim 1, further comprising a passivation layer disposed over the plurality of first traces, wherein the adhesive comprises a pressure sensitive adhesive and the passivation layer prevents acid in the pressure sensitive adhesive from damaging the plurality of first traces.

5. The multi-touch sensor panel of claim 1, further comprising:
a second passivation layer disposed over at least a portion of the plurality of second traces;
a second adhesive disposed over the second passivation layer; and
a display device coupled to the second subassembly with the second adhesive.

6. The multi-touch sensor panel of claim 1, the multi-touch sensor panel incorporated into a computing system.

7. The multi-touch sensor panel of claim 6, the computing system incorporated into a mobile telephone.

8. The multi-touch sensor panel of claim 6, the computing system incorporated into a digital audio player.

9. The multi-touch sensor panel of claim 1, further comprising a liquid crystal display coupled to the second subassembly.

10. The multi-touch sensor panel of claim 9, wherein an air gap is disposed between at least a portion of the second subassembly and the LCD display.

11. A space-efficient touch sensor panel, comprising:
a cover having a front side capable of being touched, and a back side with a plurality of first traces of a first substantially transparent conductive material formed thereon; and
a polyethylene terephthalate (PET) substrate having a top side bonded to the back side of the cover and a bottom side with a plurality of second traces of a second substantially transparent conductive material formed thereon;
wherein the plurality of first traces and the plurality of second traces are oriented to cross over each other at crossover locations separated by the PET substrate, the crossover locations forming mutual capacitance sensors for detecting one or more touches on the front side of the first subassembly.

12. The sensor panel of claim 11, further comprising a passivation layer disposed at least over the plurality of first traces on the back side of the cover.

13. The sensor panel of claim 11, further comprising a passivation layer disposed at least over the plurality of second traces on the bottom side of the PET substrate.

14. A method of forming a space-efficient touch sensor panel, comprising:
forming a plurality of first traces of a first substantially transparent conductive material on a back side of a first subassembly having a front side capable of being touched;
forming a plurality of second traces of a second substantially transpatent conductive material on a back side of a second subassembly;
bonding a front side of the second subassembly to the first subassembly such that the second subassembly is disposed between the plurality of first traces and the plurality of second traces; and orienting the plurality of first traces and the plurality of second traces to cross over each other at crossover locations separated by the second subassembly, the crossover locations forming mutual capacitance sensors for detecting one or more touches on the front side of the first subassembly.

15. The method of claim 14, further comprising using a polyethylene terephthalate (PET) material for the second subassembly.

16. The method of claim 14, further comprising forming a passivation layer at least over the plurality of first traces on the back side of the first subassembly.

17. The method of claim 14, further comprising forming a passivation layer at least over the plurality of second traces on the back side of the second assembly.

18. The method of claim 14, further comprising bonding the front side of the second subassembly to the first subassembly using a pressure sensitive adhesive.

* * * * *